(12) United States Patent
Cary

(10) Patent No.: US 7,370,282 B2
(45) Date of Patent: May 6, 2008

(54) GROUPING AND DISPLAYING MULTIPLE TASKS WITHIN AN EVENT OBJECT OF AN ELECTRONIC CALENDAR

(76) Inventor: James C. Cary, 7716 Shadow Lakes St., Wichita, KS (US) 67205

( * ) Notice: Subject to any disclaimer, the term of this patent is extended or adjusted under 35 U.S.C. 154(b) by 119 days.

(21) Appl. No.: 11/098,341

(22) Filed: Apr. 4, 2005

(65) Prior Publication Data

US 2005/0222971 A1    Oct. 6, 2005

Related U.S. Application Data

(60) Provisional application No. 60/560,439, filed on Apr. 6, 2004.

(51) Int. Cl.
*G06F 3/48* (2006.01)
(52) U.S. Cl. ...................... 715/772; 715/963
(58) Field of Classification Search ............... 715/772, 715/963
See application file for complete search history.

(56) References Cited

U.S. PATENT DOCUMENTS

| | | | |
|---|---|---|---|
| 5,659,768 A | 8/1997 | Forbes et al. | |
| 5,692,125 A | 11/1997 | Schloss et al. | 395/209 |
| 5,899,979 A | 5/1999 | Miller et al. | 705/9 |
| 5,936,625 A | 8/1999 | Kahl et al. | 345/351 |
| 5,970,466 A * | 10/1999 | Detjen et al. | 705/8 |
| 6,073,110 A * | 6/2000 | Rhodes et al. | 705/8 |
| 6,147,685 A | 11/2000 | Bliss et al. | 345/347 |
| 6,313,852 B1 | 11/2001 | Ishizaki et al. | 345/751 |
| 6,369,840 B1 * | 4/2002 | Barnett et al. | 715/853 |
| 6,370,554 B1 | 4/2002 | Sun-Woo | 708/112 |
| 6,442,527 B1 | 8/2002 | Worthington | 705/8 |
| 6,745,200 B2 | 6/2004 | Starkey | 707/102 |
| 7,027,996 B2 * | 4/2006 | Levinson | 705/8 |
| 2002/0054118 A1 | 5/2002 | Ishizaki et al. | |
| 2004/0109025 A1 * | 6/2004 | Hullot et al. | 345/764 |
| 2005/0228677 A1 * | 10/2005 | McCabe et al. | 705/1 |

* cited by examiner

*Primary Examiner*—Ba Huynh
*Assistant Examiner*—Shashi K. Becker
(74) *Attorney, Agent, or Firm*—Kory D. Christensen; Stoel Rives LLP

(57) ABSTRACT

A system for the display and editing of scheduled tasks and timeslots represented in the form of user interface elements embedded in the calendar regions of the graphical user interface of electronic calendaring systems. It provides structures and methods for editing schedule data in the form of individual tasks and timeslots, sub-groups of tasks and timeslots, and related collections of scheduled tasks and timeslots. It provides for the automated generation of scheduled tasks and timeslots information using a template structure, thereby reducing the amount of decisions and key strokes required for the user to generate and load into their personal calendars a predefined program of recurring tasks and timeslots. Methods are employed to minimize routine program maintenance requirements. In particular, a structure is provided which allows scheduled tasks information to be defined in such a way that particular tasks may be added or removed from a user's schedule either after predefined intervals of time, or, dynamically in response to changes in a predefined metric such as might be used to measure a user's skill level or efficiency.

31 Claims, 24 Drawing Sheets

| Item No | Scheduled TaskID | Occurrence Number | User ID | Task | Pattern StartDate | Pattern EndDate | Is Recurring | Has Exceptions | Item Date | Start Time | End Time | Timeslot Type | Day of Week | Day of Month | Week of Month | Month of Year | Interval | ... | Time slot | Timeslot Group | Sub-Group |
|---|---|---|---|---|---|---|---|---|---|---|---|---|---|---|---|---|---|---|---|---|---|
| 1 | 91 | 1 | Dave | Linens | 01/08/04 | 12/31/31 | T | F | 01/13/04 | 10:30 | 12:00 | Weekly | 2 | | | | 1 | | TUE | Tuesday | Dining Rm |
| 2 | 95 | 1 | Dave | Mop Floor | 01/08/04 | 12/31/31 | T | T | 01/13/04 | 10:30 | 12:00 | Weekly | 2 | | | | 1 | ... | TUE | Tuesday | Kitchen |
| 3 | 98 | 1 | Dave | Empty Trash | 01/10/04 | 12/31/31 | T | F | 01/14/04 | 9:00 | 10:30 | Weekly | 3 | | | | 1 | | WED | Wednesday | House |
| 4 | 99 | 1 | Dave | Polish Buffet | 01/08/04 | 12/31/31 | T | F | 01/13/04 | 9:00 | 10:30 | Monthly | 2 | | 3 | | 1 | ... | TUE | Week3 | Dining Rm |

FIG. 2

| Item No | Scheduled TaskID | Occurrence Number | User ID | Task | Pattern StartDate | Pattern EndDate | Is Recurring | Has Exceptions | Item Date | Start Time | End Time | Timeslot Type | Day of Week | Day of Month | Week of Month | Month of Year | Interval | ... | Time slot | Timeslot Group | Sub-Group |
|---|---|---|---|---|---|---|---|---|---|---|---|---|---|---|---|---|---|---|---|---|---|
| 1 | 95 | 2 | Dave | Mop Floor | 01/21/04 | 01/21/04 | T | T | 01/21/04 | 9:00 | 10:30 | Weekly | 3 | | | | 1 | | WED | Wednesday | Kitchen |
| 2 | 98 | 2 | Beth | Empty Trash | 01/21/04 | 01/21/04 | T | T | 01/21/04 | 9:00 | 10:30 | Weekly | 3 | | | | 1 | ... | WED | Wednesday | House |

FIG. 3

| Item No | Scheduled TaskID | Occurrence Number | User ID | Task | Pattern StartDate | Pattern EndDate | Is Recurring | Has Exceptions | Item Date | Start Time | End Time | Timeslot Type | Day of Week | Day of Month | Week of Month | Month of Year | Interval | ... | Time slot | Timeslot Group | Sub-Group |
|---|---|---|---|---|---|---|---|---|---|---|---|---|---|---|---|---|---|---|---|---|---|
| 1 | 91 | 1 | Dave | Linens | 01/08/04 | 12/31/31 | T | F | 01/13/04 | 10:30 | 12:00 | Weekly | 2 | | | | 1 | | TUE | Tuesday | Dining Rm |
| 2 | 91 | 2 | Dave | Linens | 01/08/04 | 12/31/31 | T | F | 01/20/04 | 10:30 | 12:00 | Weekly | 2 | | | | 1 | ... | TUE | Tuesday | Dining Rm |
| 3 | 95 | 1 | Dave | Mop Floor | 01/08/04 | 12/31/31 | T | T | 01/13/04 | 10:30 | 12:00 | Weekly | 2 | | | | 1 | | TUE | Tuesday | Kitchen |
| 4 | 95 | 2 | Dave | Mop Floor | 01/21/04 | 01/21/04 | T | T | 01/21/04 | 9:00 | 10:30 | Weekly | 3 | | | | 1 | ... | WED | Wednesday | Kitchen |
| 5 | 98 | 1 | Dave | Empty Trash | 01/10/04 | 12/31/31 | T | T | 01/14/04 | 9:00 | 10:30 | Weekly | 3 | | | | 1 | | WED | Wednesday | House |
| 6 | 98 | 2 | Beth | Empty Trash | 01/21/04 | 01/21/04 | T | T | 01/21/04 | 9:00 | 10:30 | Weekly | 3 | | | | 1 | ... | WED | Wednesday | House |
| 7 | 99 | 1 | Dave | Polish Buffet | 01/08/04 | 12/31/31 | T | F | 01/13/04 | 10:30 | 12:00 | Weekly | 2 | | | | 1 | | TUE | Tuesday | Dining Rm |
| 8 | 99 | 1 | Dave | Polish Buffet | 01/08/04 | 12/31/31 | T | F | 01/20/04 | 10:30 | 12:00 | Weekly | 2 | | | | 1 | ... | TUE | Tuesday | Dining Rm |

FIG. 4

| Item Number | Timeslot | Timeslot Type | Timeslot Group | Default TSGrid | Timeslot StartTime | Timeslot EndTime | Day of Week | Day of Month | Week of Month | Month of Year | Interval | ... |
|---|---|---|---|---|---|---|---|---|---|---|---|---|
| 1 | TUE | Weekly | Tuesday | TUE | 10:30 | 12:00 | 2 | | | | 1 | |
| 2 | WED | Weekly | Wednesday | WED | 9:00 | 10:30 | 3 | | | | 1 | ... |
| 3 | WK3 | Monthly | 3rd WeekofMonth | WK3 | 10:30 | 12:00 | 2 | | 3 | | 1 | |
| . | . | . | . | . | . | . | . | . | . | . | . | |

FIG. 5

| Item Number | Timeslot Group | TSResolutionOption | Default Timeslot | TSGroupList | ... |
|---|---|---|---|---|---|
| 1 | Tuesday | UseDefaultTimeslot | TUE | MON,Monday,TUE,Tuesday,WED,Wednesday,THU,Thursday,FRI,Friday,SAT,Saturday,SUN,Sunday | ... |
| 2 | Wednesday | UseDefaultTimeslot | WED | MON,Monday,TUE,Tuesday,WED,Wednesday,THU,Thursday,FRI,Friday,SAT,Saturday,SUN,Sunday | ... |
| 3 | 3rd WeekofMonth | UseDefaultTimeslot | WK3 | WK1,1st WeekofMonth,WK2,2nd WeekofMonth,WK3,3rd WeekofMonth,WK4,4th WeekofMonth,WK5,5th WeekofMonth | ... |
| . | . | . | . | . | |

FIG. 6

| Item Number | UserID | UserName | ... |
|---|---|---|---|
| 1 | Dave | DSmith | |
| 2 | Beth | BSmith | ... |
| . | . | . | |

FIG. 7

| Item No | Program EntryID | Program ID | User ID | Task | Sub-Group | Time slot | Pattern Start After Days | Pattern Days | No End Date | Minimum Level | Maximum Level | Is Active | Task ID | ... |
|---|---|---|---|---|---|---|---|---|---|---|---|---|---|---|
| 1 | 51 | Program1 | Dave | Linens | Dining Rm | TUE | 0 | | T | 1 | 9 | T | 82 | ... |
| 2 | 52 | Program1 | Dave | Mop Floor | Kitchen | TUE | 0 | | T | 1 | 9 | T | 87 | ... |
| 3 | 53 | Program1 | Dave | Empty Trash | House | WED | 0 | | T | 1 | 9 | T | 88 | |
| 4 | 54 | Program1 | Dave | Polish Buffet | Dining Rm | TUE | 0 | | T | 4 | 9 | T | 89 | ... |
| 5 | 55 | Modified1 | Dave | Mop Floor | Kitchen | WED | 0 | | T | 1 | 9 | T | 87 | |
| 6 | 56 | Modified1 | Dave | Sweep Porch | Kitchen | THU | 0 | | T | 7 | 9 | F | 84 | ... |
| 7 | 57 | Modified1 | Dave | Empty Trash | House | WED | 0 | | T | 1 | 9 | T | 88 | |
| 8 | 58 | Modified1 | Dave | Heavy Clean | Dining Rm | WK3 | 0 | | T | 1 | 9 | T | 85 | ... |
| . | . | . | . | . | . | . | . | . | . | . | . | . | . | |

FIG. 8

| Item No | Scheduled TaskID | Occurrence Number | User ID | Task | Pattern StartDate | Pattern EndDate | Is Recurring | Has Exceptions | Item Date | Start Time | End Time | Timeslot Type | ... | Time slot | Timeslot Group | Sub-Group | ... | Program EntryID | Program ID |
|---|---|---|---|---|---|---|---|---|---|---|---|---|---|---|---|---|---|---|---|
| 1 | 91 | 1 | Dave | Linens | 01/08/04 | 01/18/04 | T | F | 01/13/04 | 10:30 | 12:00 | Weekly | ... | TUE | Tuesday | Dining Rm | ... | 51 | Program1 |
| 2 | 95 | 1 | Dave | Mop Floor | 01/08/04 | 01/18/04 | T | F | 01/13/04 | 10:30 | 12:00 | Weekly | ... | TUE | Tuesday | Kitchen | ... | 52 | Program1 |
| 3 | 98 | 1 | Dave | Empty Trash | 01/10/04 | 01/18/04 | T | F | 01/14/04 | 9:00 | 10:30 | Weekly | | WED | Wednesday | House | | 53 | Program1 |
| 4 | 99 | 1 | Dave | Polish Buffet | 01/08/04 | 01/18/04 | T | F | 01/13/04 | 10:30 | 12:00 | Weekly | ... | TUE | Tuesday | Dining Rm | ... | 54 | Program1 |
| 5 | 100 | 1 | Dave | Mop Floor | 01/19/04 | 12/31/31 | T | F | 01/21/04 | 9:00 | 10:30 | Weekly | | WED | Wednesday | Kitchen | | 56 | Modified1 |
| 6 | 101 | 1 | Dave | Empty Trash | 01/19/04 | 12/31/31 | T | F | 01/21/04 | 9:00 | 10:30 | Weekly | ... | WED | Wednesday | House | ... | 57 | Modified1 |
| 7 | 102 | 1 | Dave | Heavy Clean | 01/19/04 | 12/31/31 | T | F | 02/18/04 | 9:00 | 10:30 | Monthly | | WK3 | 3rd WeekofMonth | Dining Rm | | 58 | Modified1 |
| . | . | . | . | . | . | . | . | . | . | . | . | . | | . | . | . | | . | . |

FIG. 9

| Item No | Event ID | User ID | Event | Pattern StartDate | Pattern EndDate | Is Recurring | Has Exceptions | Start Time | End Time | Timeslot Type | Day of Week | Day of Month | Week of Month | Month of Year | Interval | ... | Has Linked Task |
|---|---|---|---|---|---|---|---|---|---|---|---|---|---|---|---|---|---|
| 1 | 212 | Dave | Tuesday Chores | 01/08/04 | 12/31/31 | T | F | 10:30 | 12:00 | Weekly | 2 | | | | 1 | ... | T |
| 2 | 218 | Dave | Wednesday Chores | 01/10/04 | 12/31/31 | T | F | 10:30 | 12:00 | Weekly | 3 | | | | 1 | ... | T |
| 3 | 232 | Dave | 3rd Week of Month | 01/08/04 | 12/31/31 | T | F | 9:00 | 10:30 | Monthly | 2 | | 3 | | 1 | ... | T |
| . | . | . | . | . | . | . | . | . | . | . | . | . | . | . | . | | . |

FIG. 26

| Item No | Event ID | User ID | Event | Pattern StartDate | Pattern EndDate | Is Recurring | Has Exceptions | Start Time | End Time | Timeslot Type | Day of Week | Day of Month | Week of Month | Month of Year | Interval | ... | Has Linked Task | Scheduled TaskID | Occurrence Number |
|---|---|---|---|---|---|---|---|---|---|---|---|---|---|---|---|---|---|---|---|
| 1 | 212 | Dave | Wednesday Chores | 01/21/04 | 01/21/04 | F | F | 10:30 | 12:00 | Weekly | 3 | | | | 1 | ... | T | 95 | 2 |
| 2 | 218 | Beth | Wednesday Chores | 01/21/04 | 01/21/04 | F | F | 9:00 | 10:30 | Weekly | 3 | | | | 1 | ... | T | 98 | 2 |
| . | . | . | . | . | . | . | . | . | . | . | . | . | . | . | . | | . | . | . |

FIG. 27

| Item No | Scheduled TaskID | User ID | Task | Pattern StartDate | Pattern EndDate | ... | Time slot | Timeslot Group | Sub-Group | ... | Has Linked Event | Event ID | ... | Program EntryID | Program ID |
|---|---|---|---|---|---|---|---|---|---|---|---|---|---|---|---|
| 1 | 91 | Dave | Linens | 01/08/04 | 01/18/04 | | TUE | Tuesday | Dining Rm | | Y | 212 | ... | 51 | Program1 |
| 2 | 95 | Dave | Mop Floor | 01/08/04 | 01/18/04 | ... | TUE | Tuesday | Kitchen | ... | Y | 212 | ... | 52 | Program1 |
| 3 | 98 | Dave | Empty Trash | 01/10/04 | 01/18/04 | | WED | Wednesd | House | | Y | 218 | | 53 | Program1 |
| 4 | 99 | Dave | Polish Buffet | 01/08/04 | 01/18/04 | ... | TUE | Tuesday | Dining Rm | ... | Y | 212 | ... | 54 | Program1 |
| 5 | 100 | Dave | Mop Floor | 01/19/04 | 12/31/31 | | WED | Wednesd | Kitchen | | Y | 218 | | 56 | Modified1 |
| 6 | 101 | Dave | Empty Trash | 01/19/04 | 12/31/31 | ... | WED | Wednesd | House | ... | Y | 218 | ... | 57 | Modified1 |
| 7 | 102 | Dave | Heavy Clean | 01/19/04 | 12/31/31 | | WK3 | 3rd | Dining Rm | | Y | 232 | | 58 | Modified1 |
| . | . | . | . | . | . | | . | . | . | | . | . | | . | . |

FIG. 28

GROUPING AND DISPLAYING MULTIPLE TASKS WITHIN AN EVENT OBJECT OF AN ELECTRONIC CALENDAR

CROSS-REFERENCE TO RELATED APPLICATIONS

This application claims the benefit of U.S. Provisional Application No. 60/560,439, filed Apr. 6, 2004.

BACKGROUND OF THE INVENTION

1. Field of the Invention

The present invention relates to the display, editing, and automated generation of scheduled tasks within an electronic calendaring system.

2. Description of Related Background Art

Electronic calendaring systems have become a common and essential tool for organizing one's personal and business affairs. These systems enable users of all ages and occupations to quickly and easily monitor tasks and appointments, coordinate assignments and meetings with others, and, do so over a variety of computer systems and devices asynchronously and with little to no technical support. The newest of these systems encompass an array of related functions: to-do list functions, phone books, notes, journals, electronic mail, wireless communications, and, recently, integration of these functions into mobile phones and hand-held GPS devices.

Given their wide-spread availability, intuitive interface, and high degree of integration with other applications and services, electronic calendars represent an attractive platform for supporting automated scheduling of programs of timeslots and tasks for small groups of users. Several challenges must be addressed, however.

First, an improved method for displaying tasks in electronic calendars is needed. From a visual perspective, tasks are weakly integrated into the calendar regions of current electronic calendars. The convention is for tasks to be displayed in a separate region of the user interface with little or no reference to a completion date, start date, work period, or timescale. When dates are present, the systems often do not allow the user to specify start and end times, just dates. Users do have the option of inputting task information in the form of an appointment or event object, thereby displaying a particular task as a time-bound graphical object in the user's calendar, but, this work-around is cumbersome to manage for more than a small number of tasks.

Second, new editing methods are needed to efficiently manage the increased volume and levels of detail which are introduced along with the display of multiple timeslots, tasks, and even sub-groups or other intermediate hierarchies.

Finally, a relatively powerful template program item generation method is needed. Set-up costs, maintenance costs, and program change costs are likely to be too high with simple template mechanisms to ensure a viable market for products of this type. What are needed instead are template mechanisms which minimize the number of templates required to support large and diverse user groups, which facilitate the exchange of templates among users, and which allow template designers to anticipate normal changes in a user's circumstances or requirements over the course of following a particular template program.

BRIEF DESCRIPTION OF THE DRAWINGS

FIG. 2 is a diagram showing the structure of long-term scheduled tasks information as it would be maintained in a storage device.

FIG. 3 is a diagram showing the structure of exceptions information as it would be maintained in a storage device.

FIG. 4 is a diagram showing the structure of scheduled tasks information as it would be stored in a temporary storage buffer.

FIG. 5 is a diagram showing the data structure of timeslots information as it would be maintained in a storage device.

FIG. 6 is a diagram showing the data structure of timeslot groups information as it would be maintained in a storage device.

FIG. 7 is a diagram showing the data structure of user information as it would be maintained in a storage device.

FIG. 8 is a diagram showing the data structure of template programs information as it would be maintained in a storage device.

FIG. 9 is a diagram showing additional fields added to the scheduled tasks information for the purpose of cross-referencing with template programs information.

FIG. 26 is a diagram showing the structure of event information as it would be maintained in a storage device under the second embodiment.

FIG. 27 is a diagram showing the structure of exceptions information as it would be maintained in a storage device under the second embodiment.

FIG. 28 is a diagram showing the structure of scheduled tasks information as it would be stored in a storage device under the second embodiment.

DETAILED DESCRIPTION

Figure 1:
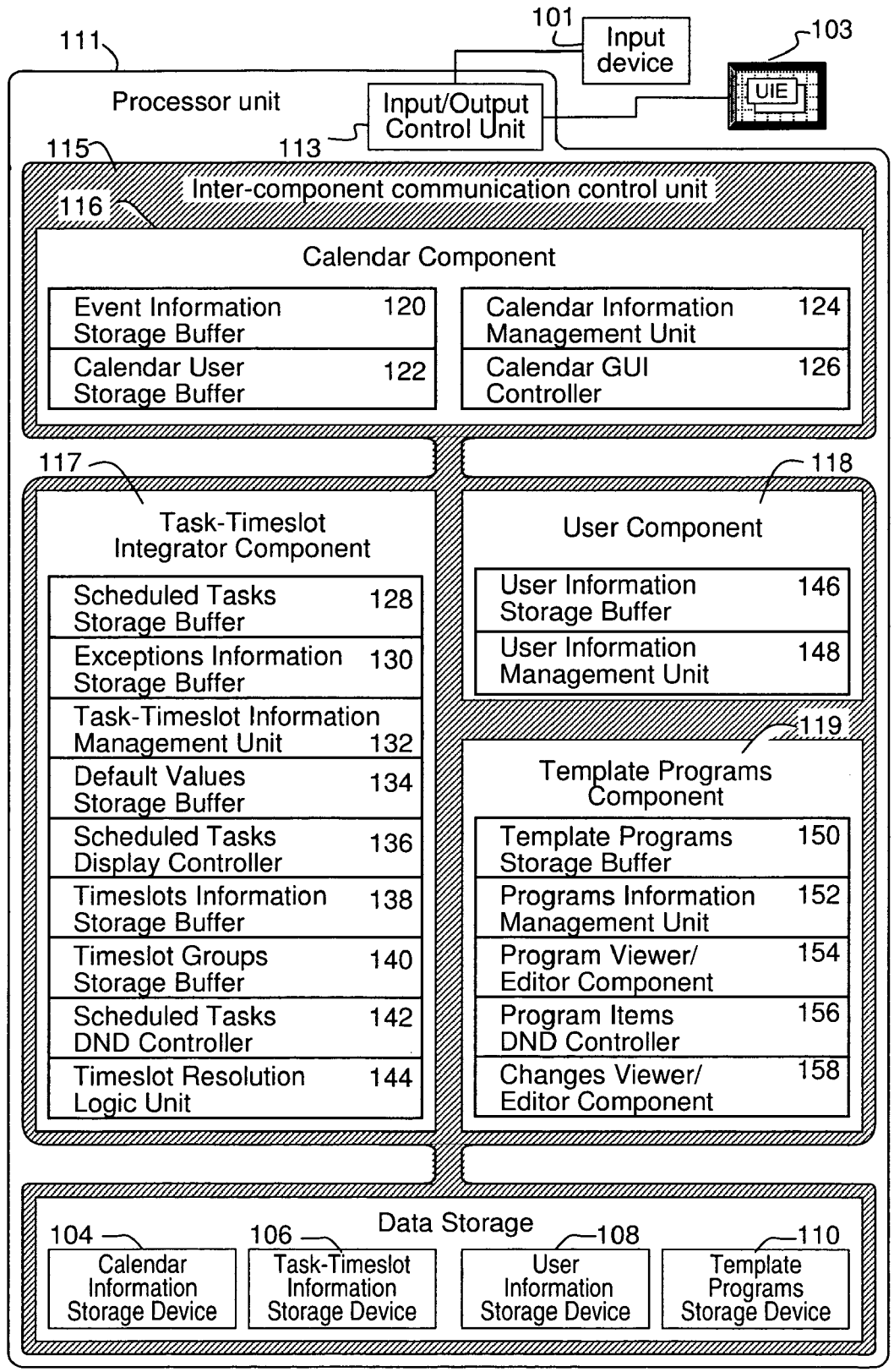
FIG. 1 is a diagram showing the configuration of a schedule management system according to an embodiment of the invention.

The present invention provides a system for the display and editing of scheduled tasks and timeslots represented in the form of user interface elements embedded in the calendar regions of the graphical user interface of electronic calendaring systems. It provides structures and methods for editing schedule data in the form of individual tasks and timeslots, sub-groups of tasks and timeslots, and related collections of scheduled tasks and timeslots. It provides for the automated generation of scheduled tasks and timeslots information using a template structure, thereby reducing the amount of decisions and key strokes required for the user to generate and load a predefined program of recurring tasks and timeslots into their personal calendars. Methods are employed to minimize routine program maintenance requirements. In particular, a structure is provided which allows scheduled tasks information to be defined in such a way that particular tasks may be added or removed from a user's schedule either after predefined intervals of time, or, dynamically in response to changes in a predefined metric such as might be used to measure a user's skill level or efficiency.

In one embodiment, a computer-implemented method for displaying scheduled tasks within a calendar includes providing a plurality of displayable event objects within the calendar, each event object comprising a displayable container object corresponding to a time period not coincident with a day; receiving a user specification of at least two tasks scheduled to be undertaken within a single time period associated with a first event object of the calendar; representing the at least two tasks as at least two separately displayable task objects within the calendar; and displaying the at least two task objects within the first event object.

In certain embodiments, in response to a user selection of and dragging the first event object to a second event object of the calendar, the computer-implemented method includes modifying occurrence information for the at least two task objects within the first event object to conform to occurrence information represented by the second event object. The occurrence information may include, for example, one or more of a starting time, an ending time, a start date, an end date, an occurrence date, a recurrence calculation type identifier, a day of week indicator, a days of week indicator, a week of month indicator, a month of year indicator, a user identifier, a user group identifier, a time interval in which an event repeats, a number of time intervals between occurrences of an event, a non-recurring event indicator, an indicator that exception occurrences exist, a listing of event occurrences, and a listing of any exception occurrences.

In various embodiments, the computer-implemented method may further include providing a plurality of user-related objects within the calendar; and, in response to a user selection of and dragging of a selected one of the at least two task objects within the first event object to a first user-related object of the calendar, modifying user identity information associated with the selected task object to conform to user identity information represented by the first user-related object.

In one or more embodiments, the computer-implemented method also includes providing a plurality of user-related objects within the calendar; and, in response to a user selection of and dragging of a first user-related object to the first event object, finding any task objects associated with a user identity associated with the first user-related object and a current date, and modifying occurrence information of the found task objects to conform to occurrence information represented by the first event object.

In certain embodiments, the computer-implemented method includes providing at least one sub-group object within the calendar; displaying the at least one sub-group object within the first event object; and associating at least one task object in a subordinate relationship with the at least one sub-group object. The computer-implemented method may also include, in response to a user selection of and dragging of the at least one sub-group object to a second event object of the calendar, modifying occurrence information of the at least one task object which is in a subordinate relationship to the at least one sub-group object to conform to occurrence information represented by the second event object.

Reference is now made to the figures in which like reference numerals refer to like elements. In the following description, numerous specific details of programming, software modules, user selections, network transactions, database queries, database structures, etc., are provided for a thorough understanding of the embodiments of the invention. However, those skilled in the art will recognize that the invention can be practiced without one or more of the specific details, or with other methods, components, materials, etc.

In some cases, well-known structures, materials, or operations are not shown or described in detail in order to avoid obscuring aspects of the invention. Furthermore, the described features, structures, or characteristics may be combined in any suitable manner in one or more embodiments.

FIG. 1 is a diagram showing the configuration of a schedule management system according to an embodiment of the invention. The schedule management system includes an input device 101 such as a pointing device for inputting position information, a display unit 103, a calendar information storage device 104, a task-timeslot information storage device 106, a user information storage device 108, a template programs storage device 110, and a processor unit 111.

The calendar information storage device 104 stores calendar information.

The task-timeslot information storage device 106 stores long-term scheduled tasks information, exceptions information, timeslots information, and timeslot groups information as shown in FIGS. 2, 3, 5, and 6 respectively.

The user information storage device 108 stores user information as shown in FIG. 7.

The template programs storage device 110 stores template programs information as shown in FIG. 8.

The processor unit 111 includes an input/output control unit 113, an inter-component communication control unit 115, a calendar component 116, a task-timeslot integrator component 117, a user component 118, and a template programs component 119.

The input/output control unit 113 supplies the processor unit 111 with information entered from the input device 101, and displays data supplied from the processor unit 111 on the display unit 103.

The inter-component communication control unit 115 has a function of exchanging data, and commands between system components. With this function, cooperation between components constituting a GUI screen can be achieved.

The present invention supports a variety of embodiments including (A) as an add-on to a commercially available electronic calendaring system, (B) as a sub-system working in conjunction with a third-party calendar component supplied by a component software vendor, (C) as an element of a web application, and (D) as an integral part of the internal workings of an electronic calendaring system. Accordingly, in the description which follows, certain features and functions of the calendar component 116 are characterized as commonly or optionally provided.

The calendar component 116 includes an event information storage buffer 120, a calendar user storage buffer 122, a calendar information management unit 124, and a calendar GUI controller 126.

The event information storage buffer 120 temporarily stores event information which includes, for each item, an event start date and time, an event end date and time, an event title or subject or description, and, optionally, an event user identifier such as a UserID or username. The event start date and time and event end date and time represent a user specification of a time period, event window, appointment, meeting time, work period, or timeslot. The event information may include event recurrence information and event exceptions information, though such information is not required for the functioning of the present invention. The calendar information management unit 124 acquires event information stored in the calendar information storage device 104, and stores the acquired event information in the event information storage buffer 120. The calendar information management unit 124 also acquires and maintains a reference to a calendar component active date, which, when changed, commonly causes the calendar component 116 to modify the user interface elements ("UIEs") displayed on the GUI screen to highlight event information associated with a new calendar component active date.

The calendar user storage buffer 122, should one be provided, temporarily stores calendar component user information. The calendar information management unit 124 acquires calendar component user information stored in the calendar information storage device 104, and stores the acquired calendar component user information in the calendar user storage buffer 122. The calendar information management unit 124 acquires and maintains a reference to a calendar component current user or users, and, filters displayed event information according to particular calendar component UserIDs or similar, unique identifiers. The calendar user storage buffer 122, calendar component user information, and reference to a calendar component current user are not required for the functioning of the present invention.

The calendar information management unit 124 also provides process control functions accessible by means of the inter-component communication control unit 115 or equivalent means such as a combination of an operating system supported inter-component messaging system and a calendar component API, for system components to add, read, edit, and delete event information, to change the calendar component active date, and, optionally, to add, read, edit, and delete calendar component user information and to change the calendar component current user or users. Optionally, the calendar component 116 may respond to changes in the calendar component current user by filtering the event information to show only items associated with a new calendar component current user or users. By means of the inter-component communication control unit 115 or by equivalent means, the calendar information management unit 124 notifies other system components of calendar component application events as they occur or after they have occurred, including, in particular, changes in the event information, calendar component active date, or, optionally, calendar component current user or users, and, further, supplies other system components with relevant data associated with calendar component application events.

The calendar GUI controller 126 performs a process of displaying event objects or event user interface elements representing the event information stored in the event information storage buffer 120 in a calendar format on the GUI screen by means of the input/output control unit 113 and provides means for input which the user supplies by means of an input device such as the input device 101 to initiate particular process control functions of the calendar component 116. More particularly, the GUI screen generated by the calendar GUI controller 126 is comprised of graphical elements, objects, or user interface elements which represent the various types of information maintained by the calendar component 116 including event information, particular dates, and, optionally, calendar component user information.

The calendar GUI controller 126, in conjunction with an input device such as input device 101 and display device such as display unit 103, provides user functions including functions for: (A) changing the calendar component active date, (B) adding, reading, editing, and deleting event information, (C) dragging and dropping date-related UIEs between arbitrary points in the GUI screen, and, (D) dragging and dropping event-related UIEs between arbitrary points in the GUI screen. The calendar GUI controller 126, in conjunction with an input device such as input device 101 and display device such as display unit 103, may optionally provide additional user functions including functions for: changing the calendar component current user, and, adding, reading, editing, and deleting calendar component user information.

The calendar GUI controller 126 has internal functions, associated with such user accessible functions as it provides, for causing the calendar information management unit 124 to incorporate appropriate changes in the information maintained by the calendar information management unit 124, and, said internal functions also convey data to other system components, by means of the inter-component communication control unit 115 or by equivalent means, which represent notifications that a particular change is occurring or has occurred and, further which represent relevant information associated with the particular change.

The task-timeslot integrator component 117 includes a scheduled tasks storage buffer 128, an exceptions information storage buffer 130, a task-timeslot information management unit 132, a default values storage buffer 134, a scheduled tasks display controller 136, a timeslots information storage buffer 138, a timeslot groups storage buffer 140, a scheduled tasks DND controller 142, and a timeslot resolution logic unit 144.

The scheduled tasks storage buffer 128 temporarily stores scheduled tasks information which includes items acquired by the task-timeslot information management unit 132 from several sources as will now be described. To conserve on storage requirements and communication costs, the embodiment only permanently stores a single item representing a single scheduled task occurrence for each recurring or non-recurring task represented in the long-term scheduled tasks information as shown in FIG. 2. Accordingly, to display all scheduled task occurrences and any associated exception occurrences which are to occur within a particular display period, there is a need to temporarily create and incorporate into the scheduled tasks information additional items to represent additional scheduled task occurrences associated with recurring tasks represented in the long-term scheduled tasks information for the particular display period, and, additional items representing exception occurrences, if any, to particular occurrences of recurring tasks during the particular display period and as are represented in the exceptions information. This is accomplished by means of a process performed by the task-timeslot information management unit 132 as shown in FIG. 16 which may briefly be described as follows.

Figure 16:
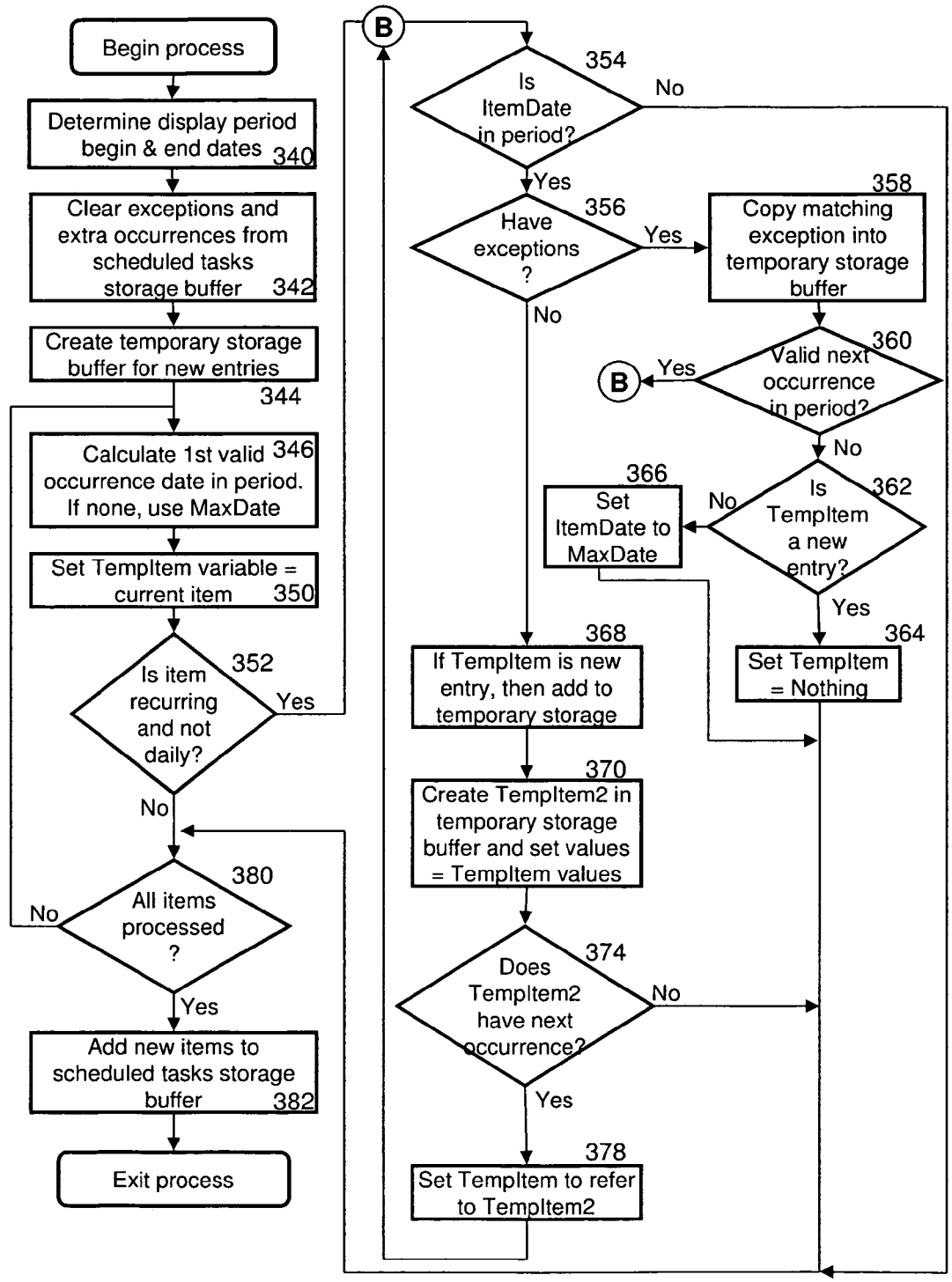
FIG. 16 is a flow chart illustrating a process to be executed by a task-timeslot information management unit for incorporating additional occurrence and exceptions information with the scheduled tasks information.

In the process shown in FIG. 16, the task-timeslot information management unit 132 acquires the long-term scheduled tasks information stored in the task-timeslot information storage device 106, stores said long-term scheduled tasks information in the scheduled tasks storage buffer 128, acquires from the task-timeslot information storage device 106 exceptions information as shown in FIG. 3, temporarily stores the exceptions information in the exceptions information storage buffer 130, and incorporates into the information resident in the scheduled tasks storage buffer 128 newly created, additional items to represent additional scheduled task occurrences associated with recurring tasks represented in the long-term scheduled tasks information, or, alternatively, exception occurrences where there are items in the exceptions information which correspond to particular scheduled task occurrences. FIG. 4 provides an example of the contents of the scheduled tasks storage buffer 128, that is, of the scheduled tasks information, which the process shown in FIG. 16 creates from the information shown in FIGS. 2 and 3. The long-term scheduled tasks information stored in the task-information storage device 106 shown as item 1 in FIG. 2 is associated with items 1 and 2 which are temporarily stored as scheduled tasks information in the scheduled tasks storage buffer 128 such as shown in FIG. 4 and where item 2 in FIG. 4 represents a second scheduled task occurrence associated with the recurring task represented by item 1 in FIG. 2. The exceptions information shown as item 1 in FIG. 3 replaces the second scheduled task occurrence associated with the recurring task represented by item 2 in FIG. 2 and, after the process shown in FIG. 16, is represented as item 4 in the temporarily stored scheduled tasks information in the scheduled tasks storage buffer 128 as shown in FIG. 4. The process shown in FIG. 16 is described in greater detail later in this document.

The default values storage buffer 134 temporarily stores default values information including values for a current user and an active date. When no values are present in the default values storage buffer 134, the task-timeslot information management unit 132 acquires a UserID field value associated with the current system user as defined by the computer processing environment supporting the processor unit 111 or equivalent user identifier and stores said UserID field value or equivalent identifier in the default values storage buffer 134 to represent the current user. The task-timeslot information management unit 132 also acquires a current system date from the computer processing environment and stores the current system date in the default values storage buffer 134 to represent the active date. Accordingly, the task-timeslot integrator component 117 requires access to information which cross-references system users with suitable, unique identifiers such as UserID field values and to information representing a current system date. Current user and current date information is commonly available through functions of the computer processing environment, but may instead be supplied by the user.

Figure 17:
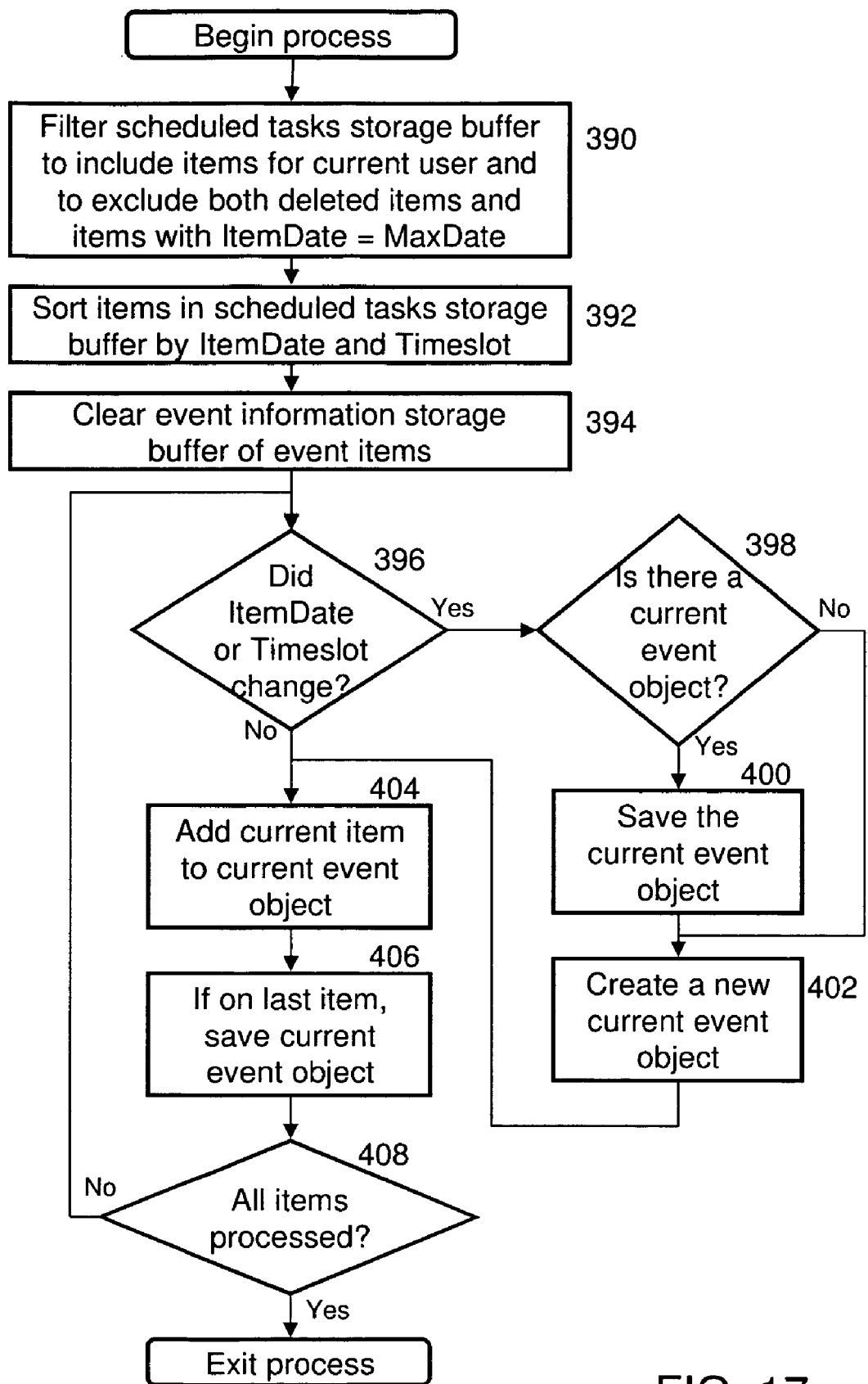
FIG. 17 is a flow chart illustrating a process to be executed by a scheduled tasks display controller for translating data from the scheduled tasks information into event information.

The scheduled tasks display controller 136 performs a process as shown in FIG. 17 for deleting items from the event information associated with any of the scheduled tasks information, grouping items from the scheduled tasks information into groups according to one or more common characteristics such as according to the Timeslot and ItemDate field values of the items or according to the same start date and time and end date and time within which the items in a particular group are presumed to occur, and preparing data and commands to supply to the calendar component 116 by means of the inter-component communication control unit 115, which data and commands cause the calendar component 116 to store a representation of the grouped scheduled tasks information in the event information and to display said representations in the form of event user interface elements on the GUI screen.

The scheduled tasks display controller 136 also monitors data conveyed to it from other system components by means of the inter-component communication control unit 115, and, where the monitored data represents notifications of changes to event information associated with the scheduled tasks information, changes in the active date or the calendar component active date, or, optionally, changes in the current user or the calendar component user, the process shown in FIG. 17 will request the task-timeslot information management unit 132 to perform the process shown in FIG. 16 prior to performing the process as shown in FIG. 17, thereby ensuring that the scheduled tasks information is updated to include a representation of all scheduled task occurrences and any associated exception occurrences for the predetermined display period, and, optionally, for the current user or users.

It is worth observing that the above described structures and functions, without the timeslots information storage buffer 138, timeslot groups storage buffer 140, scheduled tasks DND controller 142, timeslot resolution logic unit 144, user component 118, and template programs component 119, are sufficient for the task-timeslot integrator component 117 to cause the calendar component 116 to represent groups of items from the scheduled tasks information in the form of event user interface elements and to maintain conformity between the scheduled tasks information, corresponding event information, and any associated event user interface elements. Further, as part of the process shown in FIG. 17, the scheduled tasks display controller 136 can cause a field of the event user information such as the event description field or a note field to represent a listing of the particular items from the scheduled tasks information associated with particular items in the event information, thereby providing the user, where the display format permits, with a visual indication of both the time period within which the individual items are scheduled to occur and the identity of each of the listed items.

The timeslots information storage buffer 138 temporarily stores timeslots information. The task-timeslot information management unit 132 acquires timeslots information stored in the task-timeslot information storage device 106 such as shown in FIG. 5, and stores the acquired timeslots information in the timeslots information storage buffer 138. Items in the timeslots information represent a single discrete time period or a recurring pattern of discrete time periods such as "every Tuesday from 10:30AM to 12:00PM" as is represented by item 1 in FIG. 5.

The timeslot groups storage buffer 140 temporarily stores timeslot groups information. The task-timeslot information management unit 132 acquires timeslot groups information stored in the task-timeslot information storage device 106 such as shown in FIG. 6, and stores the acquired timeslot groups information in the timeslot groups storage buffer 140. Items in the timeslot groups information represent an association between a group of timeslot items associated by means of a common value in a TimeslotGroup field of the timeslots information as shown in FIG. 5, a choice of method for associating items from the scheduled tasks information with a specific member of a particular group of timeslot items, a default member in the group for when the association method is to use a default member, and a list of possible members for when the method is to let the user choose a particular timeslot association from amongst a list of similar timeslots.

Figure 18:
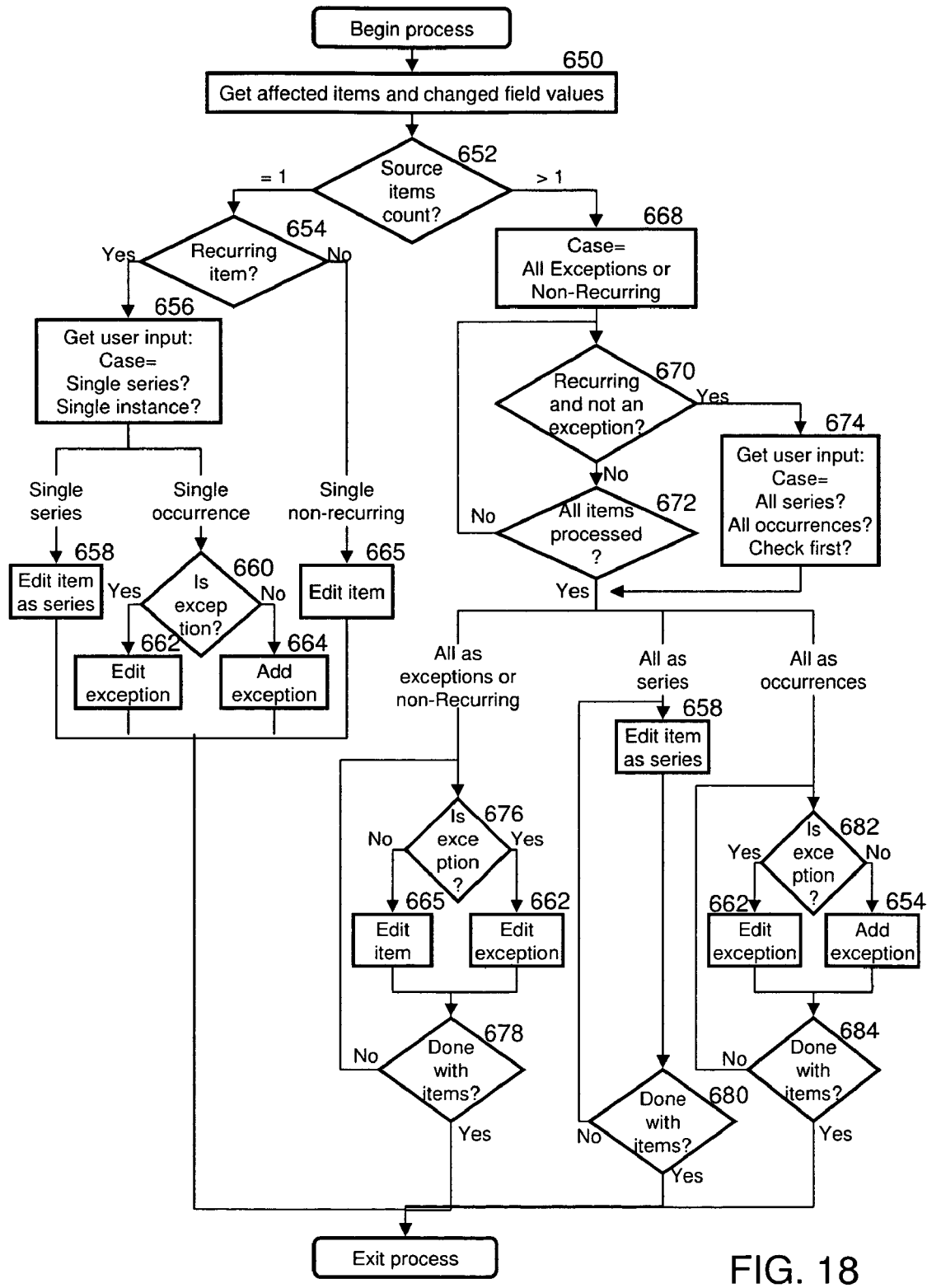
FIG. 18 is a flow chart illustrating a process to be executed by a scheduled tasks DND controller for responding to drag-and-drop actions.

The scheduled items DND controller 142 performs a process as shown in FIG. 18 for changing the scheduled tasks information and the exceptions information in response to data received by means of the inter-component communication control unit 115 from other system components where said data represents notifications of drag-and-drop ("DND") application events occurring or having occurred among user interface elements monitored by scheduled items DND controller 142. When the process shown in FIG. 18 is performed, the scheduled items DND controller 142 causes the scheduled tasks display controller 136 to update system components with any changes made to the scheduled tasks information, exceptions information, active date, calendar component active date, and, optionally, the current user and calendar component current user.

Figure 19:
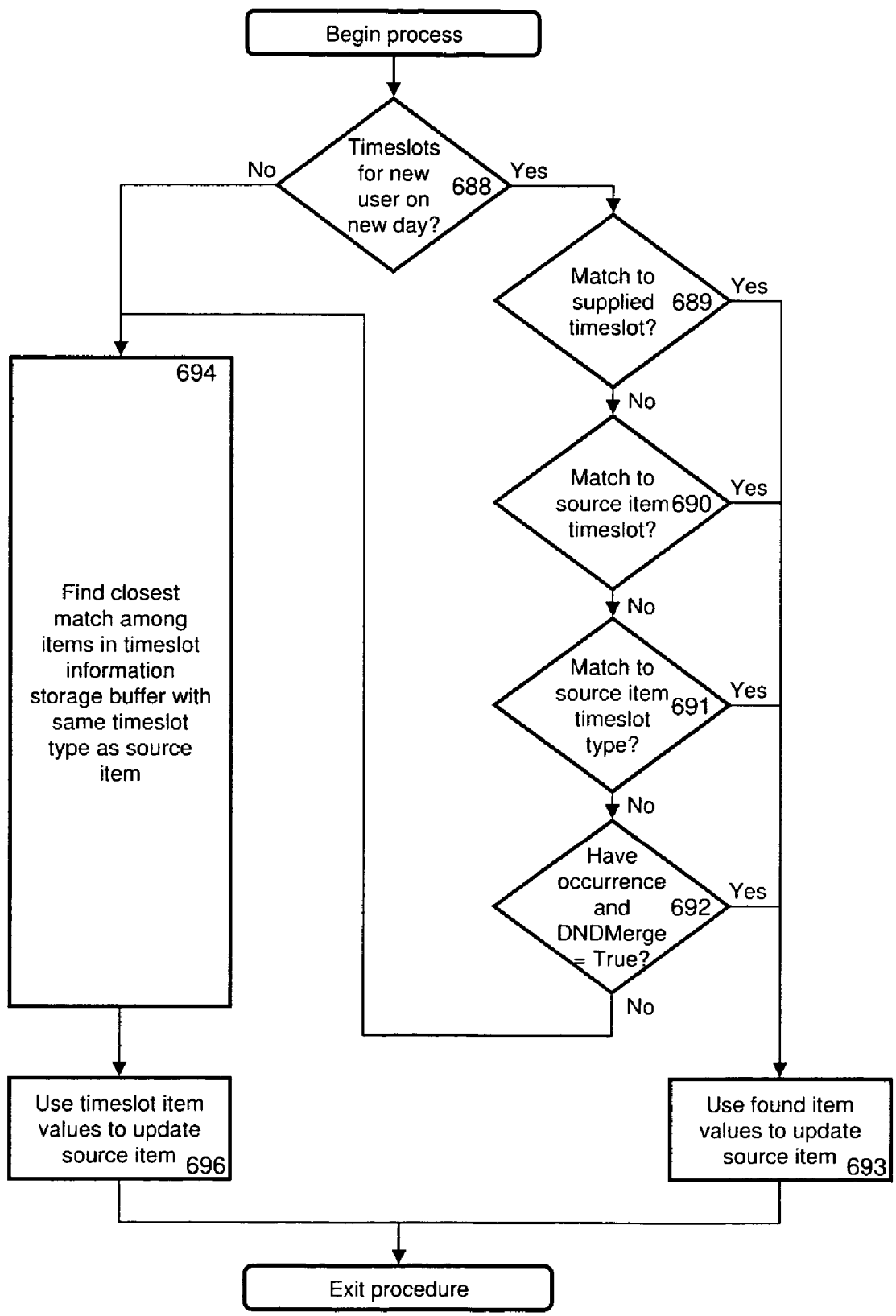
FIG. 19 is a flow chart illustrating a process performed by a timeslot resolution logic unit.

The timeslot resolution logic unit 144 performs a sub-process as shown in FIG. 19 for assigning new timeslot-related field values to scheduled tasks information items involved in drag-and-drop actions. The timeslot resolution logic unit 144 is employed by the scheduled items DND controller 142 in the process shown in FIG. 18 when the logic for grouping scheduled task information items for display purposes is to group items according to their Timeslot field values rather than according to the values in the items' Timeslot, StartTime, and EndTime fields. As is described latter in this document, the timeslot resolution logic unit 144 seeks timeslot-related field values for the new item date which are closely similar to a dragged item's previous timeslot-related field values, thereby eliminating the need for the user to select new timeslot-related field values each time an item is shifted to a new date in the calendar.

The user component 118 includes a user information storage buffer 146 and a user information management unit 148. The user information storage buffer 146 temporarily stores user information. The user information management unit 148 acquires user information stored in the user information storage device 108 such as shown in FIG. 7, and stores the acquired user information in the user information storage buffer 146. When displayed on the GUI screen, the user component 118 provides a list of users in the form of user interface elements. Some form of highlighting or marking may be used to indicate which of these user interface elements is associated with the current user of the system. The current user is determined by examination of the entry for the current user maintained by the task-timeslot integrator component 117 in the default values storage buffer 134.

Figure 10:
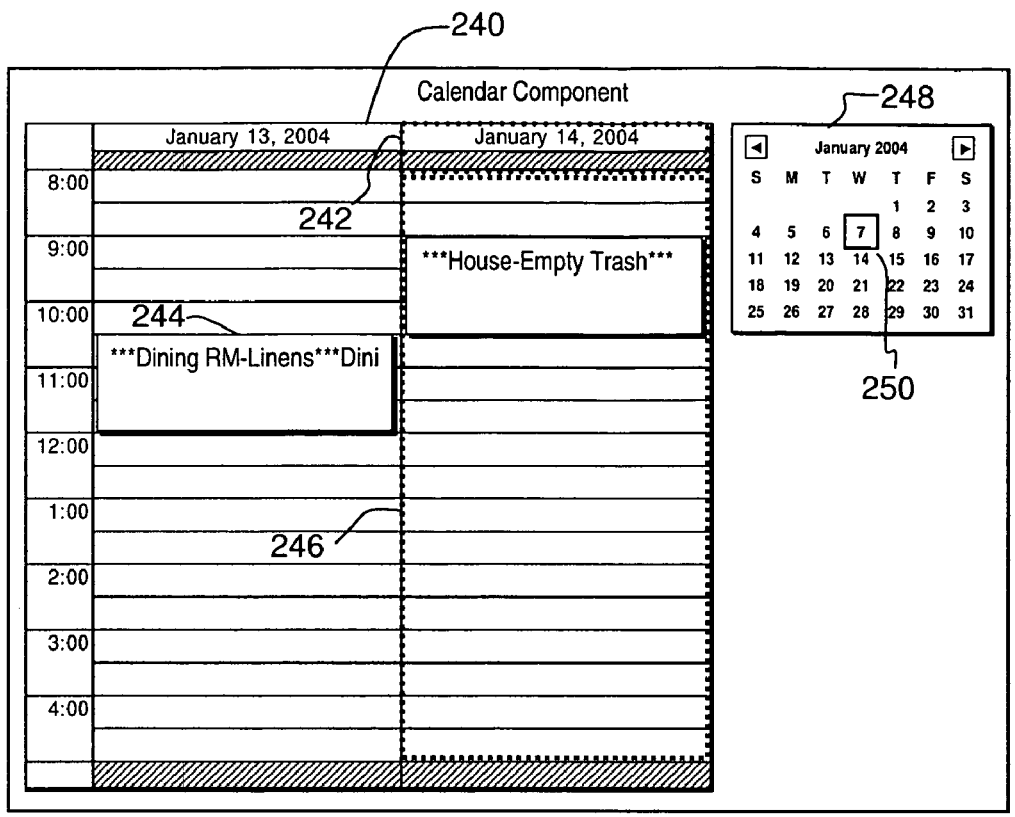
FIG. 10 shows an example of a displayed user calendar in a daily agenda book format.
Figure 11:
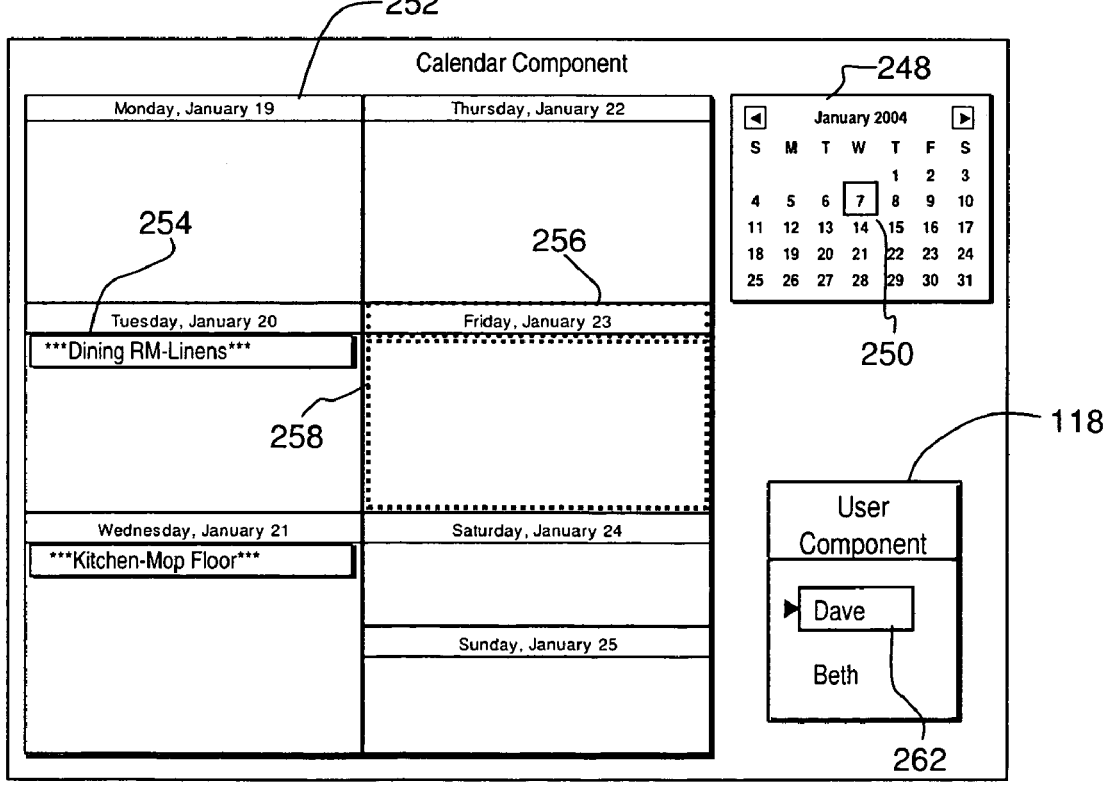
FIG. 11 shows an example of a displayed user calendar in a weekly block calendar format.

FIG. 10 and FIG. 11 show examples of calendar display formats supported by the calendar component 116 and many commercially available electronic calendaring systems. The calendar component 116 supports other calendar display formats, however, as is common with systems of this type, the other formats can be shown to consist of the same or highly similar user interface elements as are exemplified in the two figures. For example, the user interface elements shown with reference numbers 256 and 258 in FIG. 11 may be used to construct either a weekly calendar format as shown in FIG. 11 or the common monthly calendar grid format simply by rearranging the referenced element types of the two-columns weekly format shown in FIG. 11 into the familiar, six-row-by-seven-column monthly calendar grid format. Further, most of the user interface elements used in electronic calendaring system calendar display formats can be classified as either date-related UIEs or event-related UIEs, a characteristic which helps simplify the processes used for responding to drag-and-drop events among the user interface elements of these systems.

The calendar display format shown in FIG. 10 gives the appearance of a daily, paper agenda book with a scale on the left side to represent time of day and one or more columns to hold appointment entries for one or more days of the week, month, or year. Individual columns may also be used to display calendar information for different users. The display format includes a day agenda calendar component 240 and a month small-day calendar component 248.

The day agenda calendar component 240 represents a daily appointment schedule as commonly found in electronic calendaring systems. In this drawing, the day agenda calendar component 240 is split into two sections representing two days following one right after the other. At the top of each of the days in the day agenda calendar component 240 are day agenda header UIEs including day agenda header UIE 242. Events, also known as appointments in some electronic calendaring systems, are displayed in a block form such as day agenda event UIE 244 in FIG. 10. The rectangular display region associated with day agenda event UIE 244 incorporates an area for text to represent the title, description, time, and/or subject of the event. By observation, it may be seen that the text within the day agenda event UIE 244, "*Dining RM-Linens*Dini", corresponds to item 1 and the beginning of item 7 in FIG. 4. In this example of a calendar display format, the information in the Sub-Group and Task fields from the scheduled tasks information have been combined around a hyphen separator and bracketed by three asterisks followed by subsequent items scheduled for the particular event's time period using a similar format. Some of this text may not be visible depending upon the portion of the GUI screen made available to the day agenda calendar component 240 by the processor unit 113. The day agenda event UIE 244 demonstrates one method by which the multiple items from the scheduled tasks information storage buffer 128 may be represented by means of an electronic calendaring system, wherein a representative text entry associated with the multiple items is generated by the task-timeslot integrator component 117 and stored in an event title, subject, or description field of an event item of the particular electronic calendaring system.

The calendar component 116 may provide other structures and methods associated with the day agenda event UIE 244 such as displaying icons indicating that (A) a note is associated with the day agenda event UIE 244, (B) the text of the description has overrun the size of the visible display region occupied by day agenda event UIE 244, or, (C) some portion of the visible display region occupied by day agenda event UIE 244 has scrolled out of view. The size of the visible display region occupied by the day agenda event UIE 244 may also be adjusted by a factor relative to the time scale, thereby indicating the relative duration of the event as well as its sequential position in the daily schedule.

Open areas in the day agenda calendar component 240 such as day agenda body UIE 246 may be either a single contiguous region, a region masked by one or more day agenda event UIEs, or a non-contiguous region sub-divided by one or more event UIEs. The logic is such that open areas in the day agenda body UIE 246 which are not either masked by or occupied by a day agenda event UIE will behave similarly. Where several day agenda event UIEs have overlapping start and end times within the day agenda body UIE 246, the calendar component 116 may create separate columns within a single day agenda body UIE 246 so that each of the overlapping event UIEs may be seen as running partially or wholly in parallel with one another. Accordingly, the space allotted to a particular day agenda event UIE may be squeezed both vertically and horizontally depending on the associated event's duration and the presence of other event items whose start date and time and end date and time overlap with the period of time represented by the particular day agenda event UIE.

The day agenda header UIE 242 and day agenda body UIE 246 may be clicked or selected by means of the input device 101; this clicking or selection action will cause the calendar component 116 to recognize that a user has clicked or selected a particular date from the calendar, and, also notify other system components of an calendar component active date change event or current day change event. Also, when the user input device 101 hovers over these and other UIE regions on the GUI screen, the calendar component 116 may notify other system components of a hovering event corresponding to the associated UIE by means of the inter-component communication control unit 115.

The month small-day calendar component 248 has the structure of a grid comprised of a plurality of rows and columns whose intersections are rectangular regions representing a particular day of a given month. Each of these rectangular regions commonly represents a small-day UIE 250. Selecting or clicking the small-day UIE by means of the input device 101 will commonly cause the calendar component 116 to recognize that a particular day is the subject of a click event or selection event or drag-and-drop event. Also, clicking one of the small arrow icons shown in the upper left and upper right hand corners of the component by means of the input device 101 will commonly cause the calendar GUI controller 126 to scroll the month displayed in the month small-day calendar component 248 backward or forward by one month respectively.

The calendar component 116 may highlight the small-day UIE 250 by use of bolded script, an alternate back-color, surrounding box, some combination from this list, or a similar method to indicate that the day so highlighted is either the current day, the calendar component active date, or a selected day. The selection or clicking of a small-day UIE 250 which is not concurrently recognized by the calendar component 116 as the calendar component active date commonly causes the calendar GUI controller 126 to change the appearance of other regions of the user interface to correspond to the newly selected or clicked small-day UIE 250's corresponding date. For example, the day agenda calendar component 240 may change to display different days than were previously displayed.

The calendar component 116 may allow the user to select more than a single day in a contiguous series or in an interrupted series. If this behavior is supported, the calendar component 116 will commonly maintain a reference to a calendar component active date by programmatically choosing either the first of the selected days or the last of the selected days as the new calendar component active date after a click or selection event.

The calendar display format shown in FIG. 11 gives the appearance of a weekly calendar or appointment book divided into two columns with rectangular regions in the left column representing Monday, Tuesday, and Wednesday and rectangular regions in the right column representing Thursday through Sunday. The display format includes a week large-day calendar component 252, the month small-day calendar component 248, and, optionally, a user component 118.

The week large-day calendar component 252 is broken up into seven blocks comprised of a large-day header UIE 256, a large-day event UIE 254, and a large-day body UIE 258. Clicking or selecting the large-day header UIE 256 or large-day body UIE 258 will cause the calendar component 116 to behave in a fashion similar to that which was described above in the discussion of the day agenda header UIE 242 and day agenda body UIE 246 respectively. Variants of the day agenda header UIE 244 and the large-day event UIE 254 may be employed with the calendar component 116. Examples of these variants include those shown in FIGS. 12A, 12B, and 12C. Where the large-day event UIE 254 uses the format discussed below with respect to FIG. 12B, the large day event UIE 254 behaves in a manner similar to the day agenda event UIE 244 discussed above.

The user component 118 in FIG. 11 shows a list of names representing users of the schedule management system in the form of separate UIEs such as user name UIE 262. The user name UIE 262 will correspond to one or more of the listed calendar component users. The user component 118 is not commonly found in electronic calendaring systems. In the embodiment, it is displayed in a side bar region within the calendar component 116 GUI screen. This display function may be supported with or without programmatic assistance of the electronic calendaring system employed in a particular embodiment of the schedule management system. Clicking, selecting, dragging, hovering over, or dropping another UIE on the user name UIE 262 is supported by the schedule management system in various user interface operations such as in the process shown on FIG. 18 discussed below.

Figure 12A:
FIGS. 12A, 12B, and 12C show examples of event user interface elements commonly found with electronic calendaring systems.
Figure 12B:
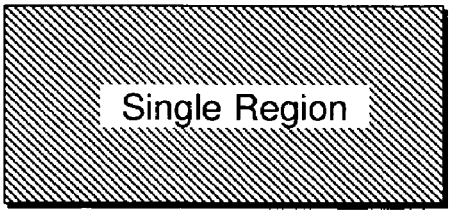
Figure 12C:
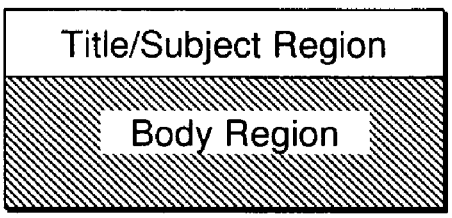

FIGS. 12A, 12B, and 12C show examples of user interface elements commonly used to represent events, appointments, and meetings in electronic calendaring systems such as the day agenda event UIE 244 shown in FIG. 10 and the large-day event UIE 254 shown in FIG. 11. The format in FIG. 12A provides for a single line of text, typically used for display of the title, subject, or description field of the event information item being represented. The format in FIG. 12B includes space for several lines of text and is commonly used in cases where the size of the event UIE is correlated with a time scale to indicate duration of an event. The format in FIG. 12C provides for a title/subject region and a body region, which body region may provide space for displaying a notes field from the electronic calendaring system event information. Where a particular calendar component such as calendar component 116 or electronic calendaring system provides for display of a notes field in the body region of an event user interface element, it becomes possible to display more text information for representing scheduled tasks information maintained by the task-timeslot integrator component 117.

Figure 13A:
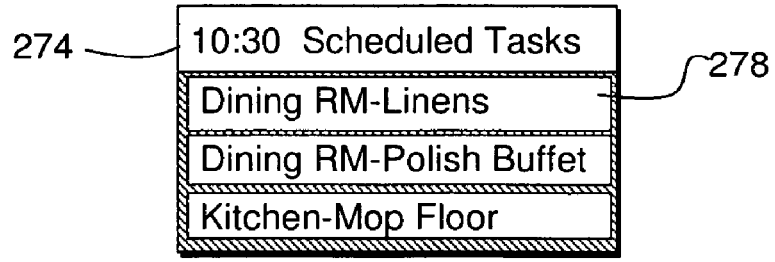
FIGS. 13A and 13B show examples of redesigned event user interface elements with sub-regions for display of task user interface elements and sub-group user interface elements.
Figure 13B:
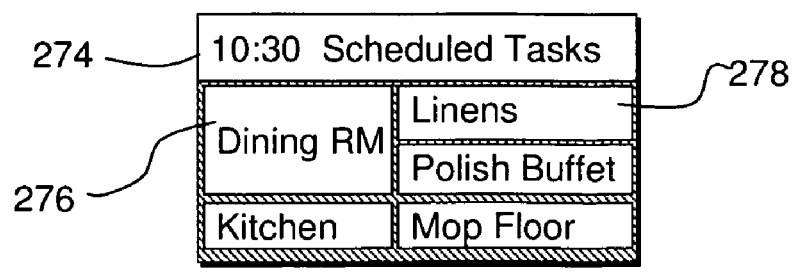

FIGS. 13A and 13B provide two different examples of a redesigned event UIEs supported by the calendar component 116 which enable a highly informative display of scheduled tasks information maintained by the task-timeslot integrator component 117. With the type of event UIE structure exemplified in FIG. 13A, an event header UIE 274 is used to display a representation of the title, subject, or description field from the event information maintained by the calendar component 116 and a plurality of task UIEs such as task UIE 278 are used to display representations of items from the scheduled tasks information. In FIG. 13B, the event UIE body is occupied by a plurality of sub-group header UIEs such as sub-group header UIE 276 which represent and display additional information for groupings of individual scheduled task occurrences with such scheduled task occurrences displayed and represented in the form of task UIEs such as task UIE 278. Where a particular embodiment of the present invention employs redesigned event UIEs such as are shown in FIGS. 13A and 13B, a temporary tree structure or equivalent structure is employed by the task-timeslot integrator component 117 to associate the event header UIEs with sub-group header UIEs and with task UIEs. Where a tree structure is used, the event header UIEs, sub-group header UIEs, and task UIEs may conveniently be represented in the form of a tree user interface element comprised of tree-node user interface elements. Use of the tree structure in the embodiment is not meant to limit the scope of the present invention as other equivalent structures may be substituted to achieve the same result of representing one or more additional levels of detail information by means of an event user interface element. By observation, it may be seen that the sample data shown in FIG. 13A and FIG. 13B corresponds to items 1, 7, and 3 shown in FIG. 4.

Optionally, the redesigned event UIE structures exemplified in FIG. 13A and FIG. 13B will determine whether the region they occupy in the GUI screen is (A) not large enough to display a legible version of an event header UIE such as event header UIE 274 only, (B) large enough to display just a legible version of an event header UIE such as event header UIE 274, (C) large enough to display a legible version of an event header UIE plus a subset of all the sub-group header UIEs and task UIEs associated with the particular event occurrence, or, (D) large enough to display an event header UIE plus all the sub-group header UIEs and task UIEs associated with the particular event UIE. In the first case, a solid colored region or portion of the sub-group header UIE may be displayed. In the second case, just the event header UIE may be displayed in a single line format. In the third case, a scroll bar user interface element may be displayed along the side of the body region occupied by the sub-group header UIEs and task UIEs, thereby enabling the user to access all the UIEs associated with a particular event occurrence. In the last case, all the UIEs of the redesigned event UIE could be displayed.

The structural elements to support the redesigned event UIEs exemplified in FIGS. 13A and 13B will now be discussed. The calendar information management unit 124 shown in FIG. 1 acquires from the calendar GUI controller 126 references to user interface elements which relate to information items such as in the event information or to the software components which are objects of a particular calendar component application events such as a reference to a particular day agenda event UIE in a paint screen application event or drag-and-drop action. Further, the calendar information management unit 124 provides functions, accessible by system components by means of the inter-component communication control unit 115 or equivalent means, for using a reference to a particular calendar component UIE or information item to obtain references to associated information items, software components, and UIEs which have a parent-child, child-parent, or sibling relationship with the initially referenced UIE or item, and, further, for obtaining the information on the type of software component or information represented by a referenced UIE or item. Accordingly, system components which monitor the data conveyed by means of the inter-component communication control unit 115 are able to obtain references to information and UIEs associated with items in the event information, and to UIEs directly or indirectly referenced in notifications of application events. The calendar component 116 also provides means for reviewing in advance, canceling, and modifying the handling of application events associated with user interface elements displayed on the GUI screen, and, for reviewing in advance, canceling, and reformulating screen drawing functions of the GUI screen. With these additional means, the scheduled tasks display controller 136 is able to mask or control and overwrite the area of the GUI screen associated with a particular event UIE, such as the day agenda event UIE 244 shown in FIG. 10, to replace the original event UIE with a new user interface element formed from the combination of an event header UIE, a plurality of task UIEs, and, optionally, a plurality of sub-group header UIEs, collectively such as are shown in FIGS. 13A and 13B, and, further, to identify and maintain information and references which associate particular items in the scheduled tasks information, individually or as members of sub-groups, with UIEs displayed in a structure such as are shown in FIGS. 13A and 13B. For example, by observation it may be seen that the sub-group formed by sub-group header UIE 276, task UIE 278, and the task UIE shown below task UIE 278, corresponds to items 1 and 7 in FIG. 4, with the sub-grouping based upon a common value in the Sub-Group field of each item such as might be used to represent different areas in which a particular task is to be performed. An event UIE structure similar to those which are shown in FIGS. 13A and 13B may be supported by commercially available electronic calendaring systems where such systems are substituted for the calendar component 116 in the scheduled management system and provide access to similar data and functions as have been described here.

The template programs component 119 includes a template programs storage buffer 150, a programs information management unit 152, a program viewer/editor component 154, a program items DND controller 156, and a changes viewer/editor component 158.

The template programs storage buffer 150 temporarily stores template programs information. The programs information management unit 152 acquires the template programs information stored in the template programs storage device 110 such as shown in FIG. 8 and stores the acquired template programs information in the template programs storage buffer 150.

Figure 20:
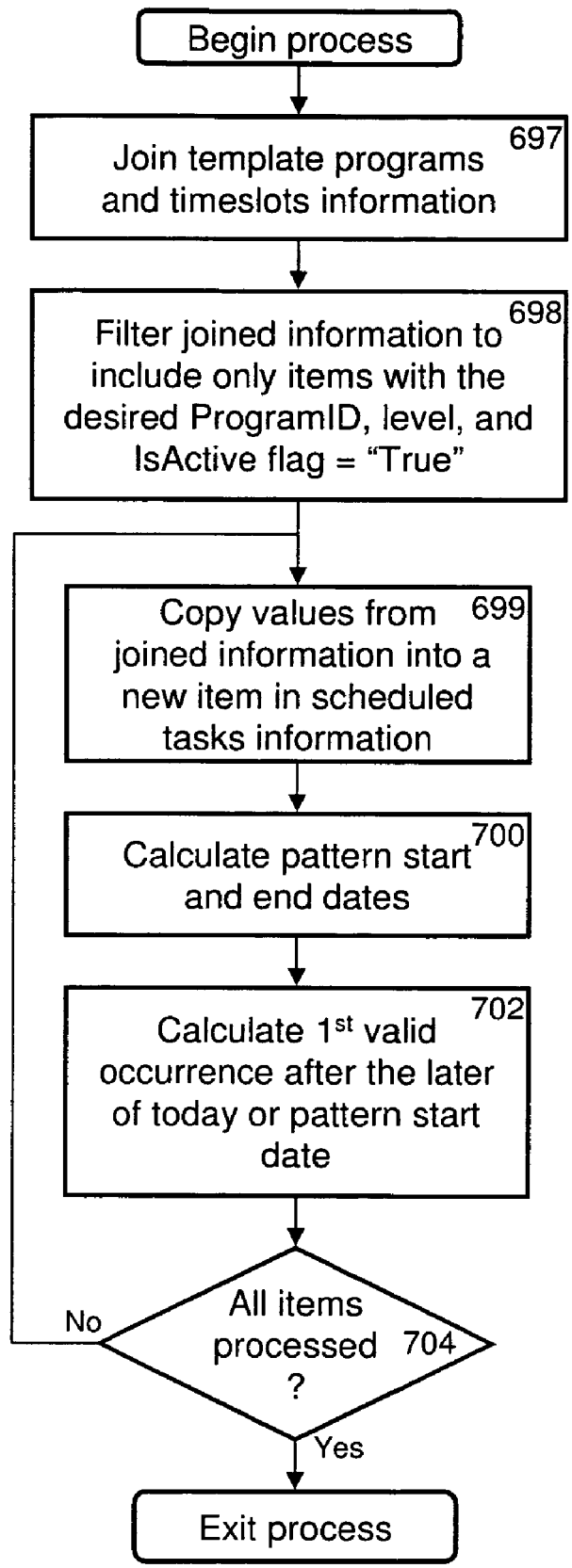
FIG. 20 is a flow chart illustrating a process performed by a programs information management unit.

The programs information management unit 152 uses a process shown in FIG. 20 to translate a particular group of items in the template programs storage buffer 150 into entries suitable for adding to the scheduled tasks storage buffer 128. The fields associated with each item in the template storage buffer 150 will now be discussed.

With reference to FIG. 8, a ProgramEntryID field provides for the assignment of a unique key for each item in the template programs information which may be stored for cross-referencing purposes with items added to the scheduled tasks information. A ProgramID field provides for defining distinct sets of items in the template programs storage buffer 150 by means of a common value in the ProgramID field. In the description below, the expression "template program" refers to a distinct set of items in the template programs information which have the same value in the ProgramID field, and, the expression "program" refers to the representation of a particular template program in the form of scheduled tasks information.

A mechanism is required for assigning UserID field values to the information in the template programs information. One method is to use the current user as defined in the default values storage buffer 134 for all items in the template programs information. Alternatively, UserIDs may be assigned using two predefined matrices which first associate UserIDs with roles and then roles with particular items in a given template program. This alternate method or a similar method is required when scheduled tasks information for multiple users is processed.

Task and Sub-Group fields have the same use as above with the scheduled tasks information. The Timeslot field also has the same meaning as above. A variety of methods may be used to acquire the timeslot-related field values shown in FIG. 4. For one example, the timeslot-related fields may be incorporated into the template programs information. Alternatively, as is exemplified in the process shown in FIG. 20, timeslot information such as is shown in FIG. 5 may be maintained by the system and joined together with the template programs information shown in FIG. 8 prior to generating information to add to the scheduled tasks storage buffer 128. The process shown in FIG. 20 is described in greater detail below. Briefly, the process shown in FIG. 20 finds the item in the timeslots information storage buffer 138 with the same Timeslot field value as that of a given item from the template programs information storage buffer 150 and incorporates the timeslot-related values from said item in the timeslots information storage buffer 138 into the entries which are added to the scheduled tasks information. In this way, when a user has modified the field values of any of their timeslots information, the process in FIG. 20 will apply the modified values in generating new scheduled tasks information. The PatternStartAfter, PatternDays, and NoEndDate fields, either incorporated into the template programs information or the timeslots information, are used to determine the PatternStartDate and PatternEndDate for new items added to the scheduled tasks information. The process shown in FIG. 20 must be supplied with an effective date parameter with a default assumption that the effective date is the current date as stored in the default values storage buffer 134. The PatternStartDate is calculated as the effective date value plus the value in the PatternStartAfter field which is in units of days and may be a positive or negative number. The PatternEndDate is then calculated as either the maximum system date such as Dec. 31, 2031 if the NoEndDate Boolean field value is set to True, or, as the PatternStartDate plus the value in the PatternDays field which is in units of days.

The last four fields in the template programs information as shown in FIG. 8 provide support for several refinements intended to greatly reduce the effort and keystrokes required to (A) initially adapt a template program to the needs and circumstances of a particular user and (B) to evolve the template program over time as the user's needs and circumstances change. Some background is helpful in appreciating the objects and advantages of these four fields.

It is anticipated that users of the system will employ predefined template programs to accomplish a particular mission or on-going program, that the predefined template programs will be crafted by template designers with expertise in the topical area addressed by a particular template program, and that the template programs will generally be provided by the manufacturer of a product embodying the present invention or by third-party template program developers. Template programs may be published, marketed, and distributed in the same fashion as are self-help books, technical manuals, and computer software today. This raises an issue of how close a fit the template designer needs to achieve between a predefined template program and the specific circumstances and needs of a given user. Template designers will likely find themselves in a position where they must define either (A) a relatively small number of generic template programs which are found to be adequate by most users, (B) a relatively large number of highly specific template programs which, assuming the user is able to identify the optimal template program, provide for a relatively precise fit between the selected, pre-defined template program and the user's particular circumstances and needs, or, (C) a relatively small number of template programs which have a built-in means for adapting to a range of user circumstances and needs. The third strategy is the most attractive because it minimizes the number of template programs which the user has to choose among, but, still provides for fine-tuning beyond the initial selection of a template program.

Selecting an initial template program, however, does not fully describe the challenges which template designers are likely to face. After an initial template program is put into action, there will be effects related to the program which tend to invalidate some or all of the structure of the initially selected template program. Such effects include the effects of completing any remedial work, efficiency gains from repeating the same routines over a period of time, human learning, and changes in aspirations as the user becomes more confident in their own performance under a particular program. It would be preferred if the design of a template program provides a means for anticipating the impact of these effects, again through some built-in means. It is believed that the tendency for template programs to become outdated over time is the rule rather than the exception. Consequently, any system which uses template structures to generate a complex program of scheduled tasks needs to address this difficulty, else there will be a chronic need for template program users to adjust items in their personal schedules, which adjustments the user would often be making without an adequate understanding of how their needs may be changing. The solution to this difficulty is for the structure of such a system and, in particular, the template programs to provide a means for the template designer, presumably an expert in a particular topical area, to define in advance a series of steps, stages, or phases through which the user of a particular template program is likely to traverse and to associate these steps, stages, or phases with a calibration method which may be used to determine where within a calibrated scale the user falls given the user's particular needs and circumstances at a given point in time. The option of using a temporal sequencing method, while better than providing no means for evolving the contents of a particular template program, is a less than satisfactory solution. It is anticipated that an a-temporal method is needed which relies not on the calendar, but, rather on predetermined evidence to determine when a particular user's needs and circumstances have evolved to the point where it is time for adjustments to be made to the composition of active items in the template program to reflect a more appropriate structure associated with a different phase of a particular template program.

The MinimumLevel and MaximumLevel fields provide a means for implementing template programs in which the structure of the template programs information has a built-in means for adapting to a range of user circumstances and needs. The MinimumLevel and MaximumLevel fields are used to describe a calibrated range within which a template program item is or is not expected to be required. An example of a calibrated range would be the range of skill levels a user might possess when it comes to performing house keeping duties. An inexperienced user may benefit greatly from a simplified program or an essentially remedial program initially, but, as skills and efficiencies are gained, the need to modify the original program is likely to appear quickly. For example, in FIG. 8, a scale of 1 to 9 is used in the MinimumLevel and MaximumLevel fields with the understanding that values of 1 and 9 respectively indicate that a task will be activated when a current level value is greater than or equal to 1 and less than or equal to 9. Item 4 from FIG. 8 shows an example of a template program item which is not activated until the user's skill level is deemed to have reached a value greater than or equal to 4. Similarly, item 6 is not activated until the user's skill level is deemed to have reached a value greater than or equal to 7. Setting high values in the MinimumLevel field indicates an item that is only activated after the user has developed a higher level of skill or experience or both. Conversely, setting low values for the MaximumLevel field would be used for tasks which might be remedial in nature, to be dropped when the user has gotten certain problems under control or gained in experience or both.

The structure embodied in the MinimumLevel and MaximumLevel fields of the template programs information provides a framework for allowing the composition of a particular template program to be initially calibrated and subsequently to be adjusted over time in response to a change in a particular user's needs and circumstances. A variety of methods may be used to collect appropriate evidence for changes in levels associated with a particular template program. Such methods would include use of a questionnaire or monitoring of the time a user is taking to complete particular items associated with a given template program. Though only one example of possible structures, the embodiment provides template designers considerable flexibility to devise their own scale and calibration method for activating or deactivating items represented in a particular template program.

The IsActive field provides an additional means for a template designer to make available a range of items in a single template program which may be described as a visible options list method. With the IsActive field, a template designer may include items in the design of template program which are either optional or only relevant to users in particular circumstances. As will be seen below, the program viewer/editor 153 allows the user to see both Active and InActive items; this allows a user to quickly scan a list of template program items for InActive items which the user may conclude are useful or necessary, and to scan for Active items which the user might not want or need to add to his schedule. Besides providing for an additional means for the template designer to make available a range of items in a single template program, the IsActive field provides a means for involving the user in the process for fine-tuning a particular template program to better meet their needs. The IsActive field plus a display means such as the program viewer/editor 153 provides users with the ability to see items which are near the boundary between items the template designer intended to include in a particular template program and items which the template designer felt were at least worth considering for inclusion, again, either as options or as items which are only relevant to users in particular circumstances.

It is worth noting that the data structure shown in FIG. 8 does provide a mechanism for sequencing the activation and deactivation of items in a template program based upon the calendar using the PatternStartAfterDays and PatternDays fields as discussed above. Accordingly, the data structure shown in FIG. 8 provides support for any combination of three different methods for conditionally adding and removing items in a particular template program: a temporal sequencing method, an a-temporal, calibration method, and a visible options list method. Given the premium users of electronic calendaring systems place on minimizing keystrokes and maintenance requirements, the availability of these methods is highly advantageous for users and template designers alike. A first advantage of the structure embodied in the template programs information is that it allows the template designer to design programs which can accommodate a wide range of needs and yet give the impression of being tailored to each user's needs and circumstances. A second advantage is that template programs can be designed to embody a structure which anticipates changes in a user's needs and circumstances. A third advantage of the structure is that, when program changes become necessary, adjusting the program contents can be done globally by changing the current level value in the process shown in FIG. 20. This structure is meant only as an example of a fundamental structure which may be labeled as developmental logic, with developmental logic meaning the grading of constituent items in a template program so that said constituent items may be added or removed from the scheduled tasks information dynamically as a user's conditions or needs changed rather than waiting for the user to become frustrated by gaps which develop between the benefits they are getting from a particular template program and the user's ever changing needs and circumstances.

The TaskID field provides a means for identifying items in two different template programs which are the same or closely similar to one another. This is significant as it is likely that many template programs will consist of essentially the same tasks with differences largely limited to the person or role performing the task, when it is performed, and the method employed. Accordingly, it would be highly useful to identify commonalities between task definitions in different programs so that the user can appreciate which task definitions in the old and new programs are truly different and to transfer modifications a user may have applied to a similar scheduled tasks information item under one program to a similar scheduled tasks information item embodied in a new program. The making of an association between similar tasks during changes between template programs is embodied in the processes shown in FIGS. 22 to 24.

Figure 14:
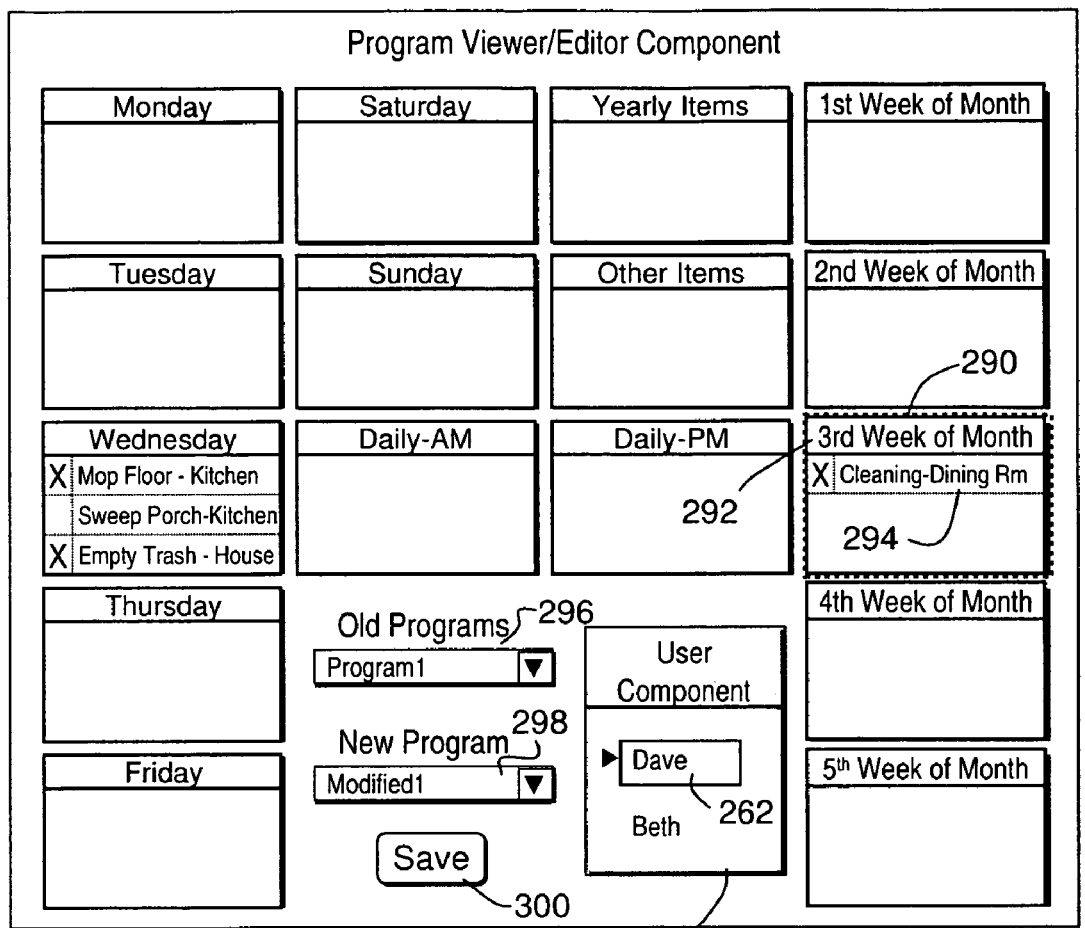
FIG. 14 shows an example of a program viewer/editor.

As exemplified in FIG. 14, the program viewer/editor component 154 displays a representation of items associated with particular template programs. The items are further filtered according to the current user's level assumption and whether the user is interested in viewing active items only, in active items only, or both active and inactive items. Accordingly, the default values storage buffer 134 maintains a value for each user's current level and a menu item or similar mechanism is provided for the user to indicate whether they wish to view active, inactive, or both active and inactive items. The program viewer/editor component 154 provides processes for editing the displayed items in an efficient manner by applying drag-and-drop actions against the user interface elements which make up the GUI screen.

The program viewer/editor component 154 includes several types of user interface elements which will now be discussed. First, a plurality of program item grid UIEs such as program item grid UIE 290 is provided for grouping and representing a plurality of items from the template programs information. Each program item grid UIE 290 includes a program item grid header UIE such as program item grid header UIE 292 for representing a title for a particular program item grid UIE and a plurality of program item UIEs such as program item UIE 294 for representing associated individual items in the template programs information. On the left side of each program item UIE is a check box by means of which a user or template designer may indicate whether a particular program item is considered to be "active" or "inactive". The value of "X" shown on the left side of the program item UIE 294, for example, indicates that the item is considered active. The check box value corresponds to the Boolean IsActive field value of each item in the template programs storage buffer 150 as shown in FIG. 8. On the right side of the program item UIE 294 is text representing a description of the item.

To assign items from the template programs information to a particular program item grid UIE, either (A) an internal cross-reference is used to associate each Timeslot field value shown in FIG. 8 with a particular program item grid UIE, or, preferably, (B) an additional field, such as the DefaultTS-Grid field shown in FIG. 5, is added to the timeslots information to capture and maintain a reference associating each item in the timeslots information with a particular program item grid UIE, and, the assignment process refers to the timeslots information storage buffer 138 to find the program item grid UIE reference associated with a particular Timeslot field value.

An important aspect of the program item grid assignment logic is that it provides a means for viewing all the items belonging to a particular template program in a single GUI screen and also to have those items segregated into groups, among which groups, to the best extent possible, the largest number of groups are associated with specific items in the timeslots information storage buffer 138 and the total number of groups is kept to a minimum. Simply providing groups associated with the seven days of the week, five weeks per month, the morning, the afternoon, yearly tasks, and a catch-all category for other tasks requires the creation of sixteen separate graphical regions in the GUI screen. Though the cost of larger displays is becoming lower all the time, inexperienced users are likely to struggle in comprehending screens with many more than sixteen program item grid UIEs and many devices today, such as personal digital assistants, have exceedingly small displays. The solution to this difficulty is to provide a means for distinguishing between program item grid UIEs which are associated with specific timeslots and other program grid UIEs which are associated with a collection of timeslots such as all the months of the year for yearly tasks.

A structure which provides such a means is present in the timeslots information, timeslot groups information, and template programs information as shown respectively in FIGS. 5, 6, and 8. Each item in the template programs information provides for a Timeslot field which may be used to refer to an associated item in the timeslots information as shown in FIG. 5. Each item in the timeslots information provides a TimeslotGroup field which may be used to refer to an associated item in the timeslot groups information as shown in FIG. 6. The TSResolutionOption field in the timeslot groups information provides a means for indicating whether there is a default timeslot value associated with a particular timeslot group or, alternatively, that the user should be prompted to select from a list of timeslots in, for example, a drag-and-drop action. The DefaultTimeslot field provides a field to capture a default timeslot value to use as a default value to assign to items associated with the particular item in the timeslot groups information. The TSGroupList field provides a means to capture a list which may be shown to the user so that the user may select from the list to indicate which timeslot value to assign to an item from the templates program information. In FIG. 6, the value in the TSGroupList field represents a comma delimited, two field per row, list of timeslot values and descriptions which may be presented to a user in the form of a dialog screen to capture user input by means of the input device 101. Other structures will work so long as the user is able to indicate which timeslot value is to be assigned to the template program item which is the object of the assignment process. As shown in FIG. 14, a catch-all program item grid UIE labeled "Other Items" may be used to accumulate items which do not fall into any of the other categories of items associated with the other program item grid UIEs. To provide support for drag-and-drop actions involving program item grid UIEs, a cross-reference is maintained between each program item grid UIE and the items in the timeslot groups information so that each program item grid UIE is associated with a specific item in the timeslot groups information and the specific item's TSResolutionOption, DefaultTimeslot, and TSGroupList field values.

An old programs list box UIE 296 provides a list of program names or ProgramID values among which list the user may select by means of the input device 101 a plurality of items to indicate which template program or programs represented in the template programs information represent an old template program or old template programs to be affected by the program viewer/editor component 154. The ProgramID field values of said old template program or old template programs defines an associated group of items in the scheduled tasks storage buffer 128. The list of program names or ProgramID values provided by the old programs list box UIE 296 will comprise a single reference for each different ProgramID field value associated with items in the scheduled tasks information. To provide for this association of items in the scheduled tasks information with a ProgramID field value, a ProgramID field is added to the scheduled tasks information as will be discussed below in relation to the changes viewer/editor component 158.

A new programs list box UIE 298 provides a list of program names or ProgramID values among which list the user may select by means of the input device 101 items to indicate which template program or programs represented in the template programs information represents a new template program or new template programs to be affected by the program viewer/editor component 154. The ProgramID field values of said new template program or new template programs defines an associated group of items in the template programs information. The list of program names or ProgramID values provided by the new programs list box UIE 298 will comprise a single reference for each different ProgramID field value in the template programs information. If the user changes the item or items selected in the new programs list box UIE 298, then the program viewer/editor 153 will update the program item grid UIEs in the GUI screen to display the items associated with the newly referenced template program or programs.

Figure 22:
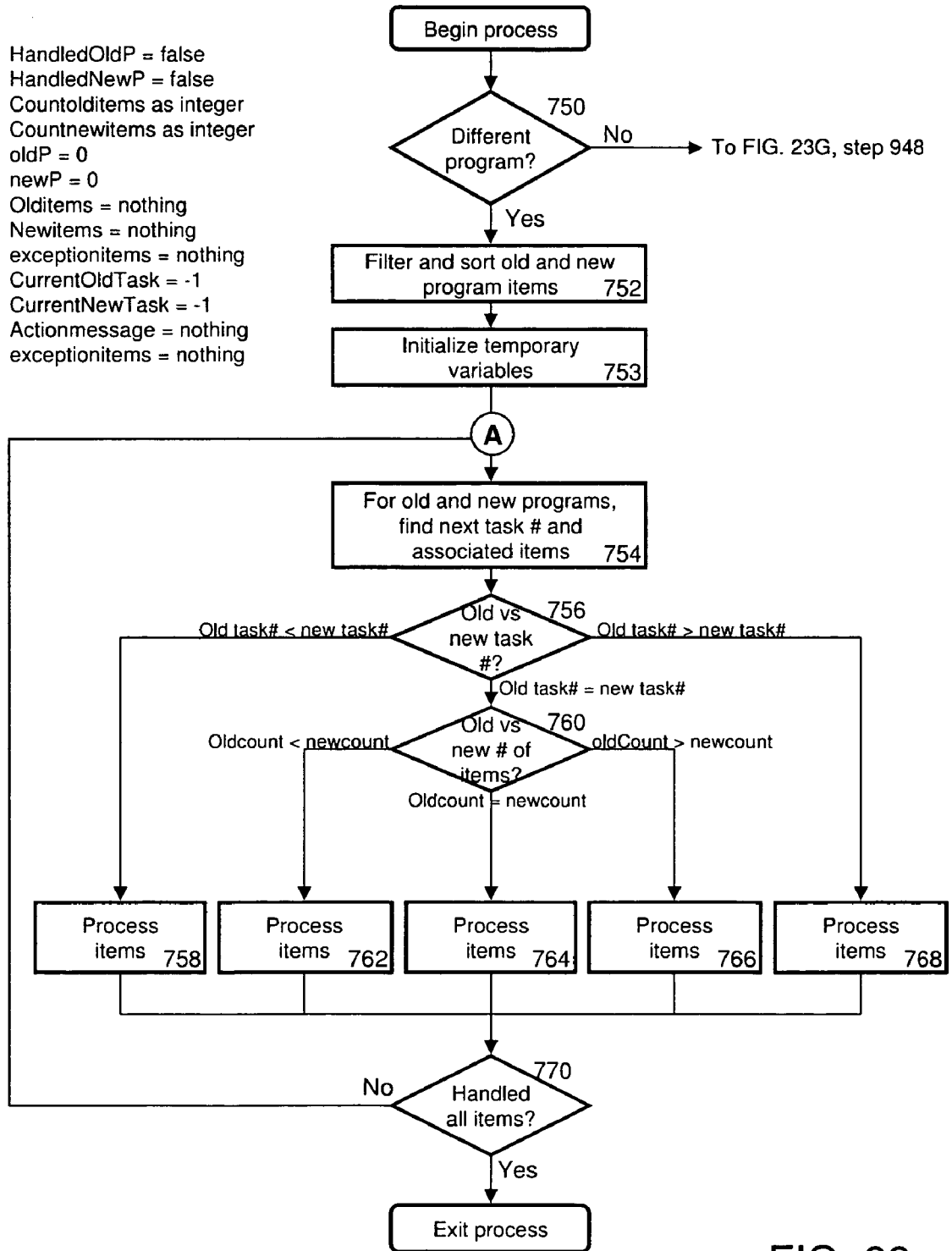
FIG. 22 is a flow chart illustrating a process performed by a program viewer/editor component.

A template program save button UIE 707 provides a user interface element which, when clicked by the user by means of the input device 101, causes the program viewer/editor component 154 to perform the process shown in FIG. 22.

The program viewer/editor component 154 provides an area of the GUI screen for display of the user component 118 which includes user names UIEs such as the user name UIE 262 previously described, which user name UIEs provide support for certain drag-and-drop actions discussed in relation to the program items DND controller 156.

Figure 21:
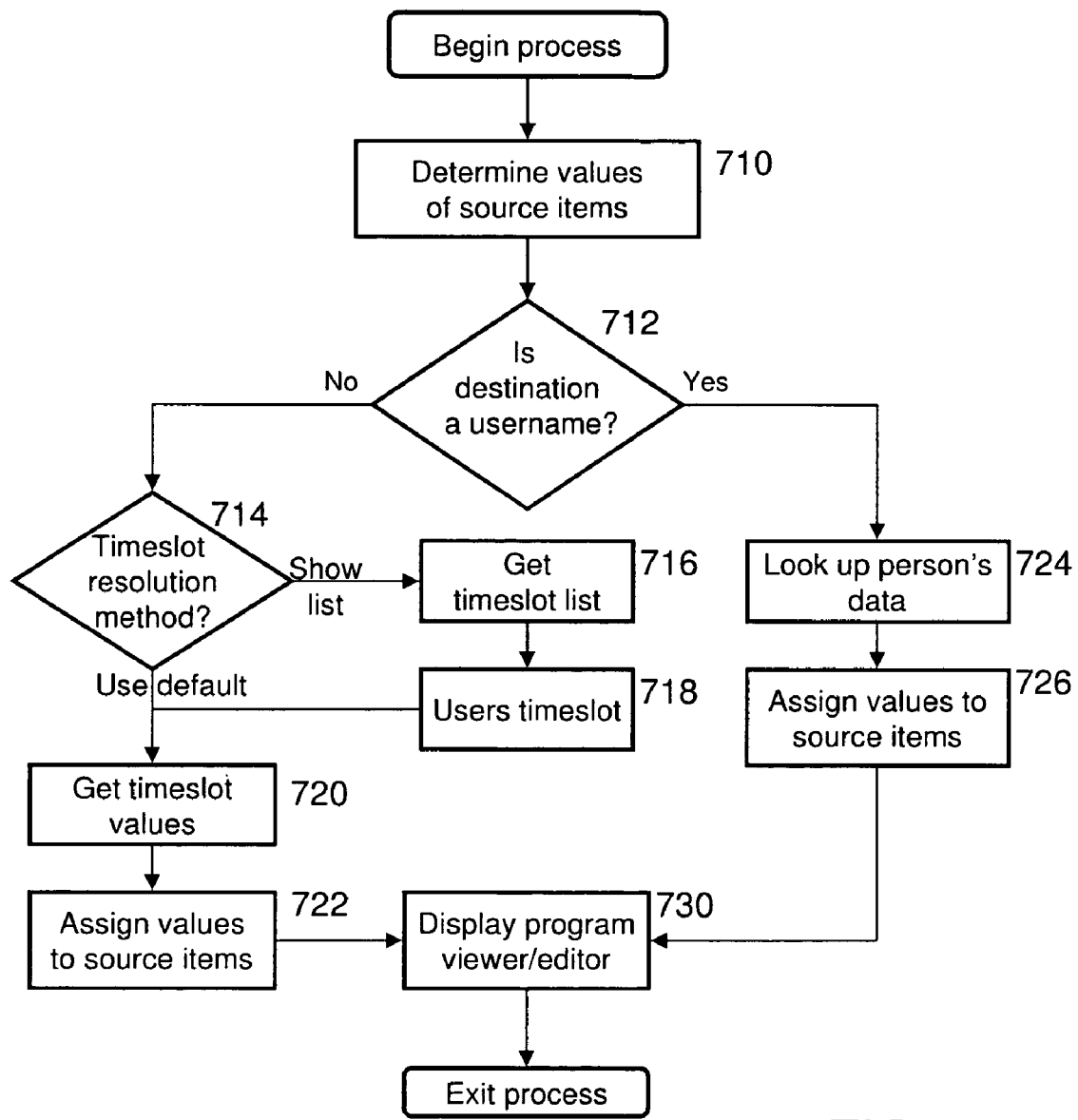
FIG. 21 is a flow chart illustrating a process performed by a program items DND controller.

The program items DND controller 156 performs a process as shown in FIG. 21 for changing the template programs information in response to drag-and-drop event notifications involving user interface elements such as discussed above, with the notifications conveyed from other system components by means of the inter-component communication control unit 115. When the process shown in FIG. 21 is performed, the program items DND controller 156 calls the programs information management unit 152 to update the template programs information stored in the template programs storage buffer 150 and the program viewer/editor component 154 to display the now modified template programs information on the GUI screen. Changes to the template programs information are not reflected in the scheduled tasks information until the user clicks the template program save button UIE 707 and completes the processes shown in FIGS. 22 to 24.

Figure 15:
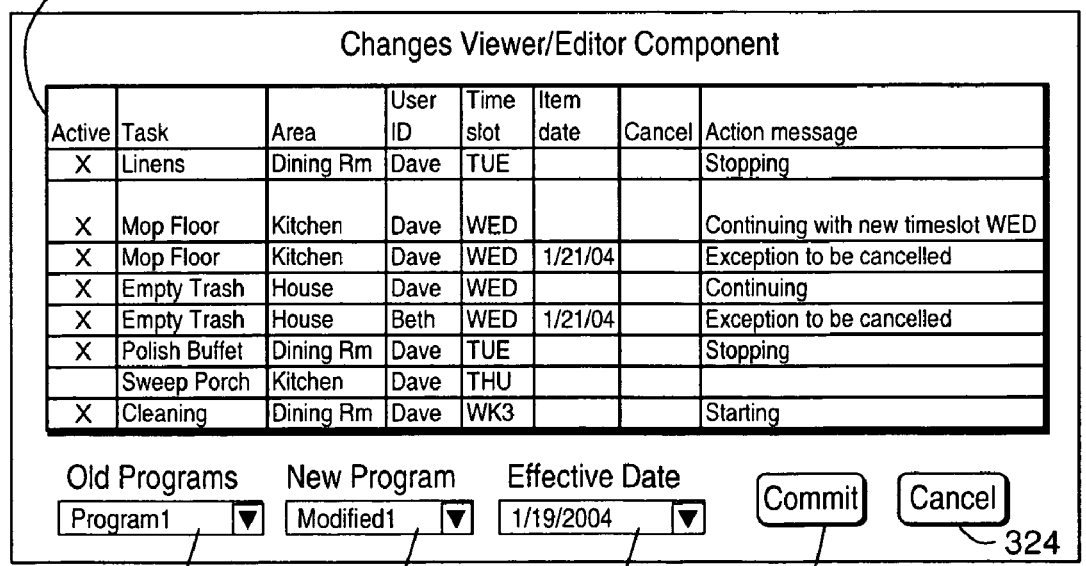
FIG. 15 shows an example of a changes viewer/editor.
Figure 23A:
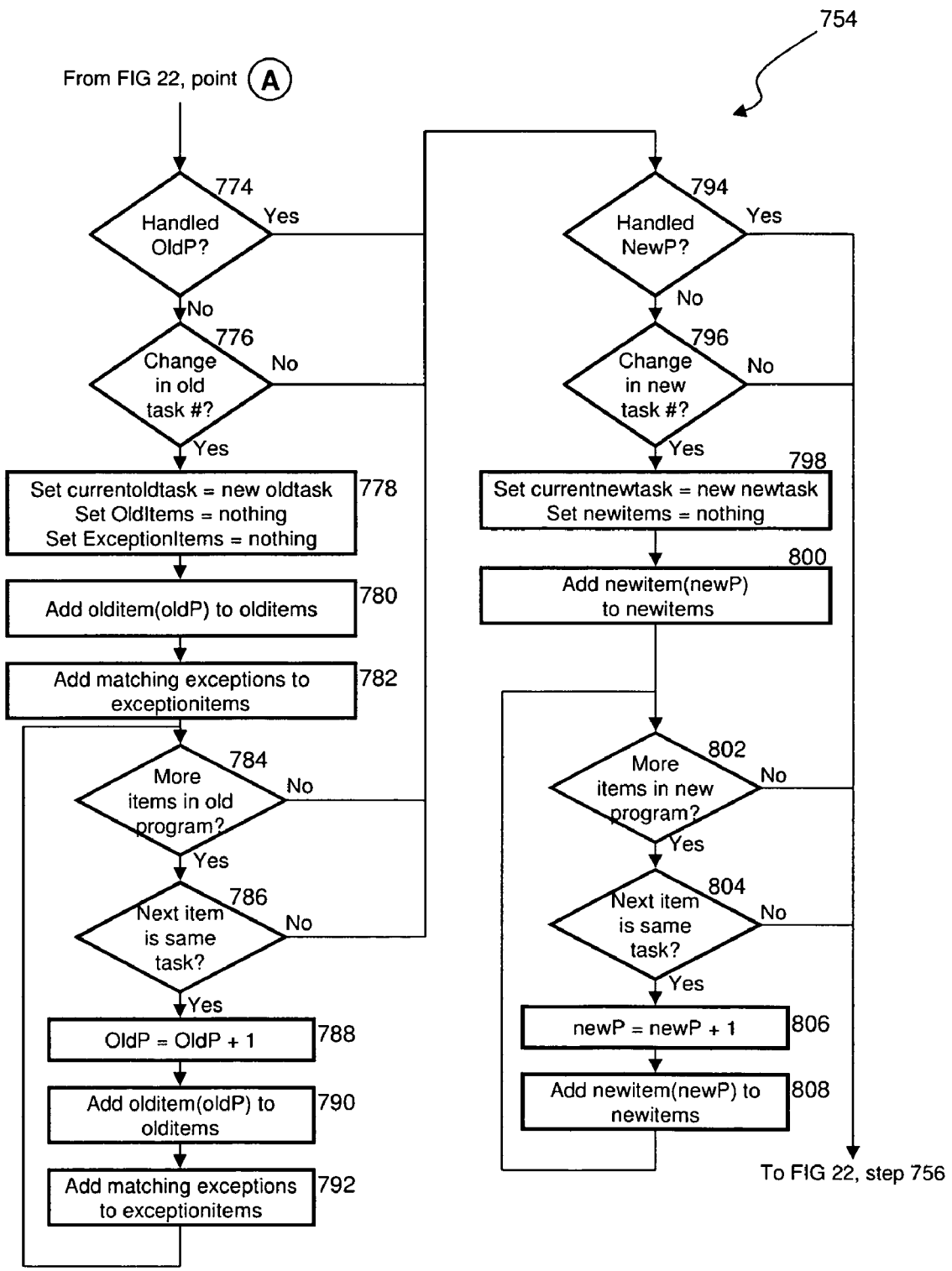
FIGS. 23A-23G are flow charts detailing the workings of particular steps in the process shown in FIG. 22.
Figure 23B:
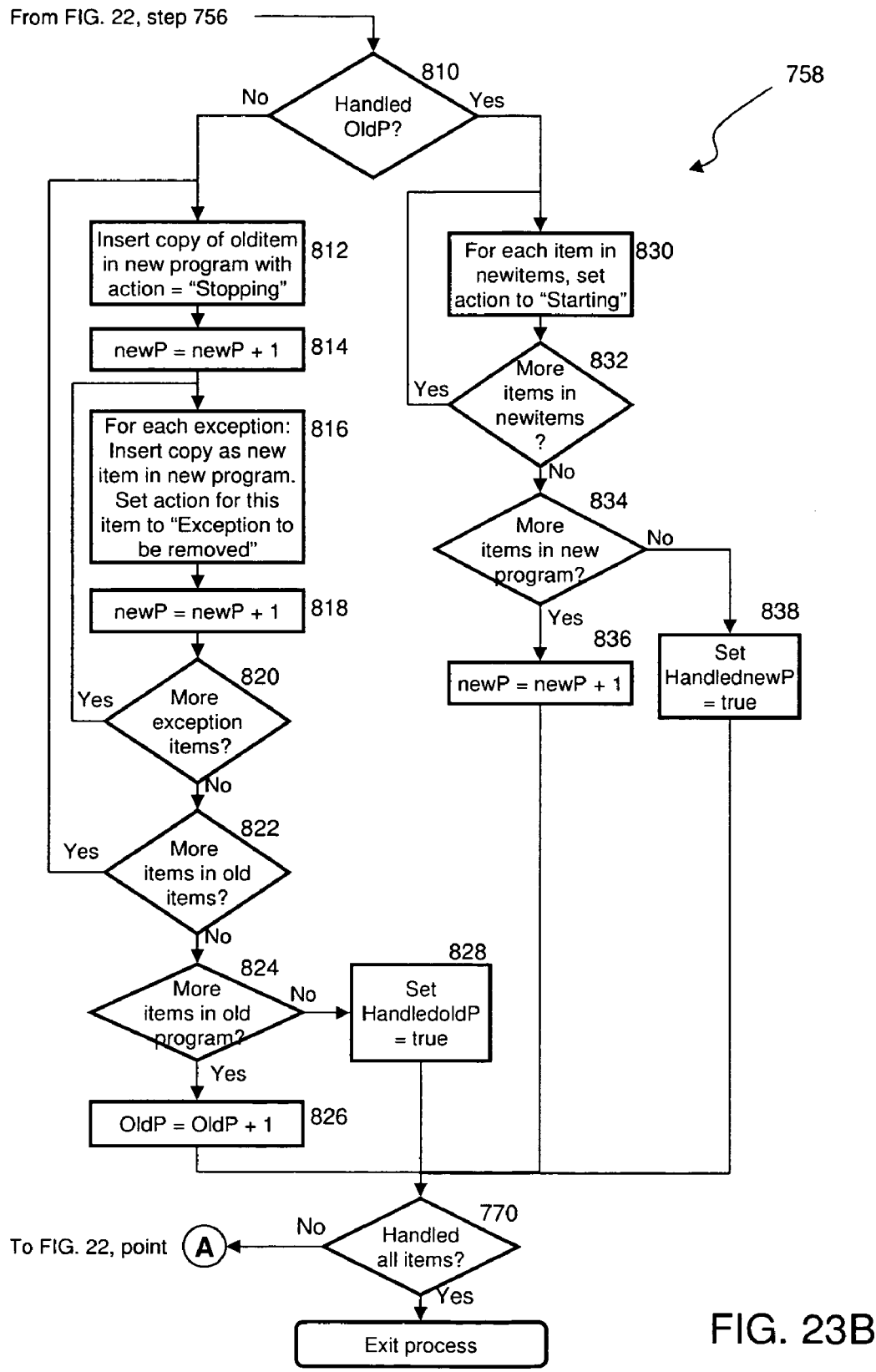
Figure 23C:
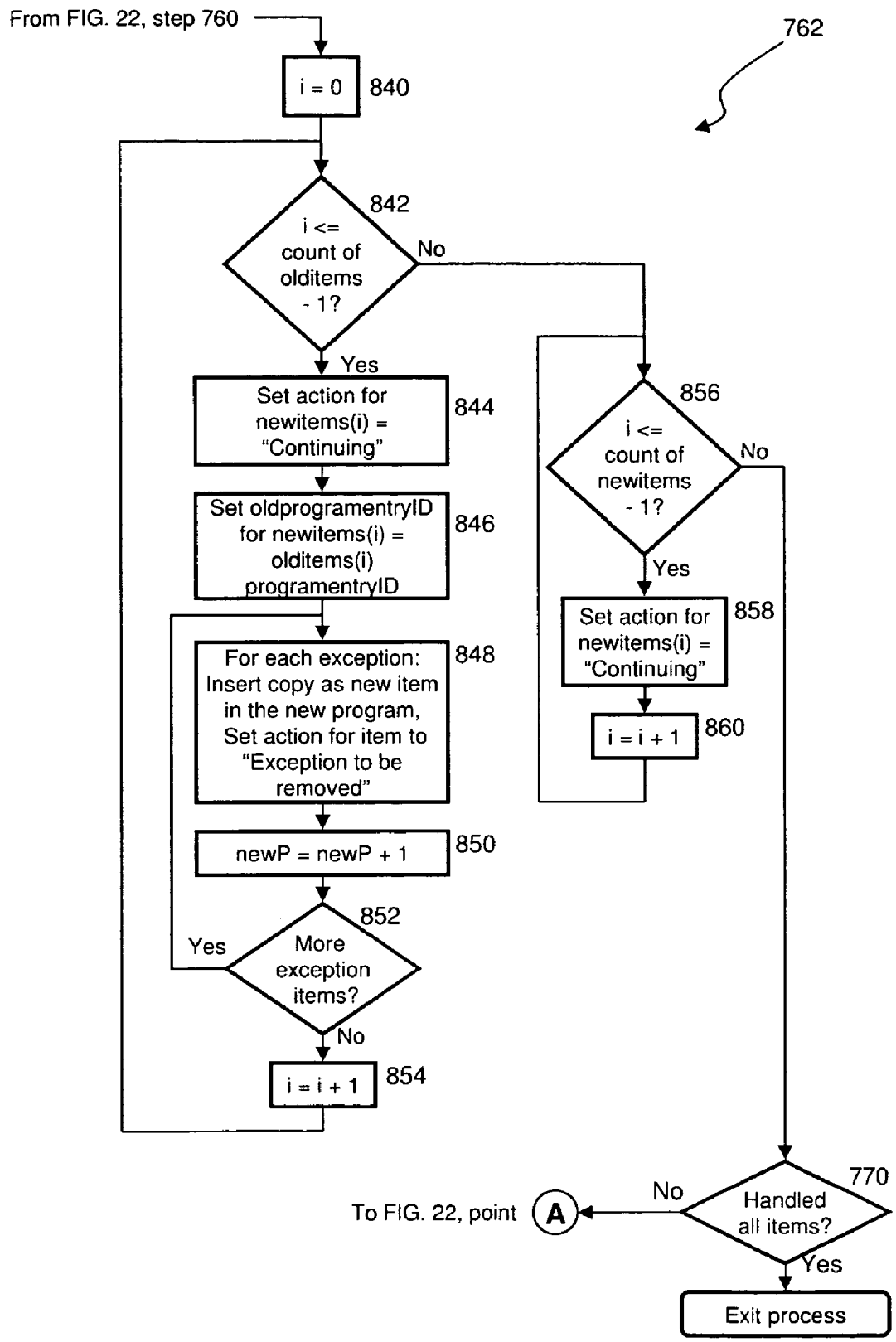
Figure 23D:
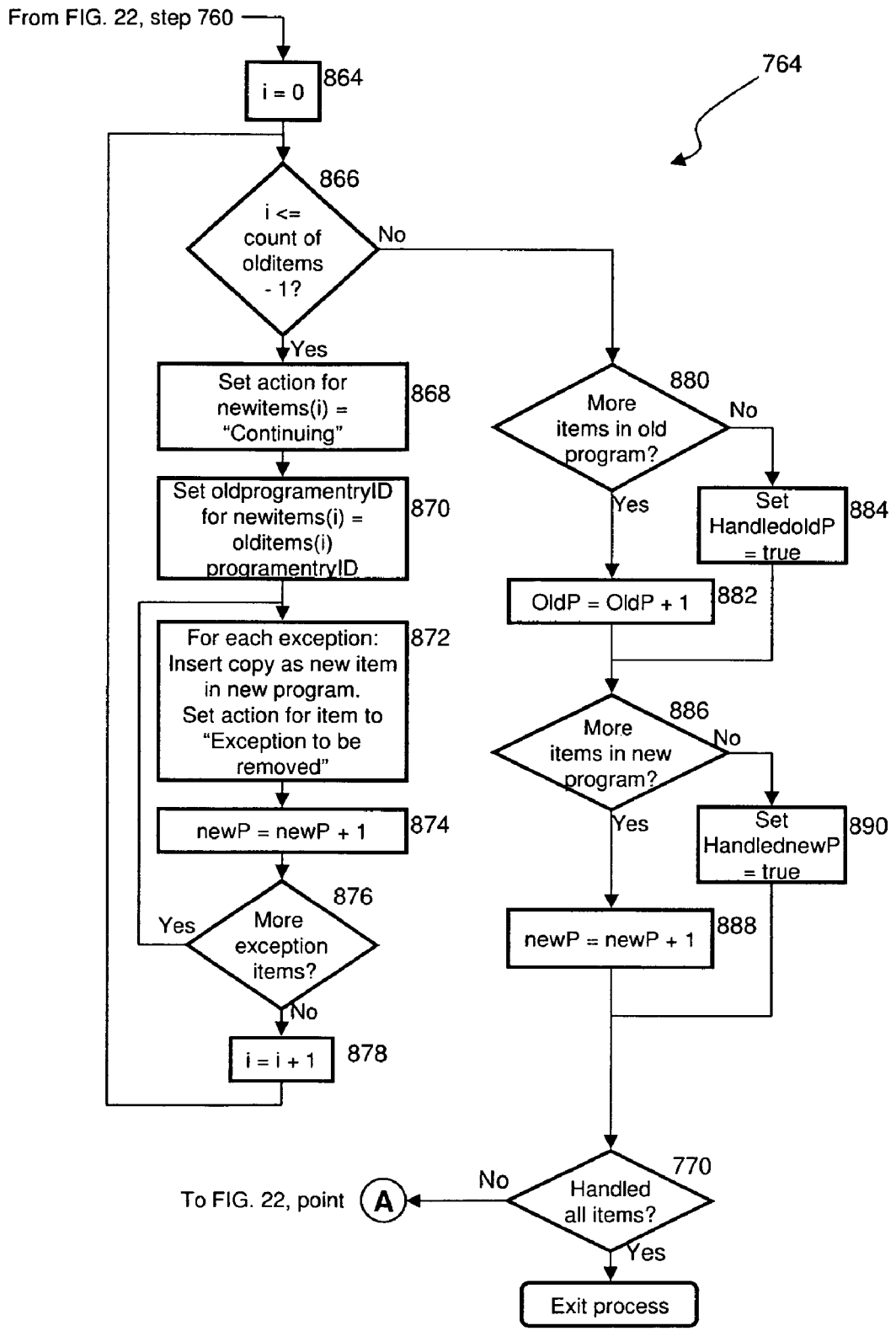
Figure 23E:
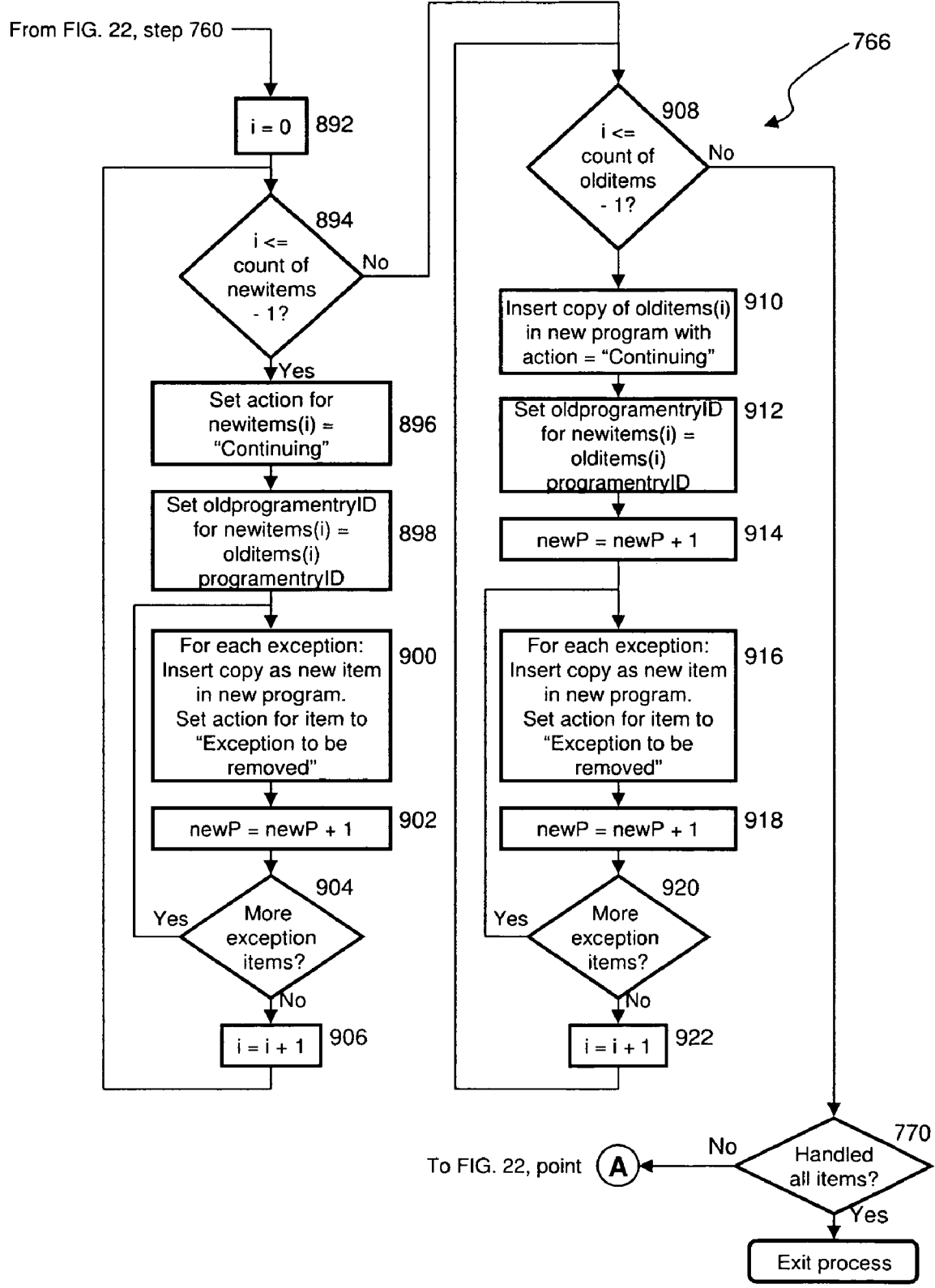
Figure 23F:
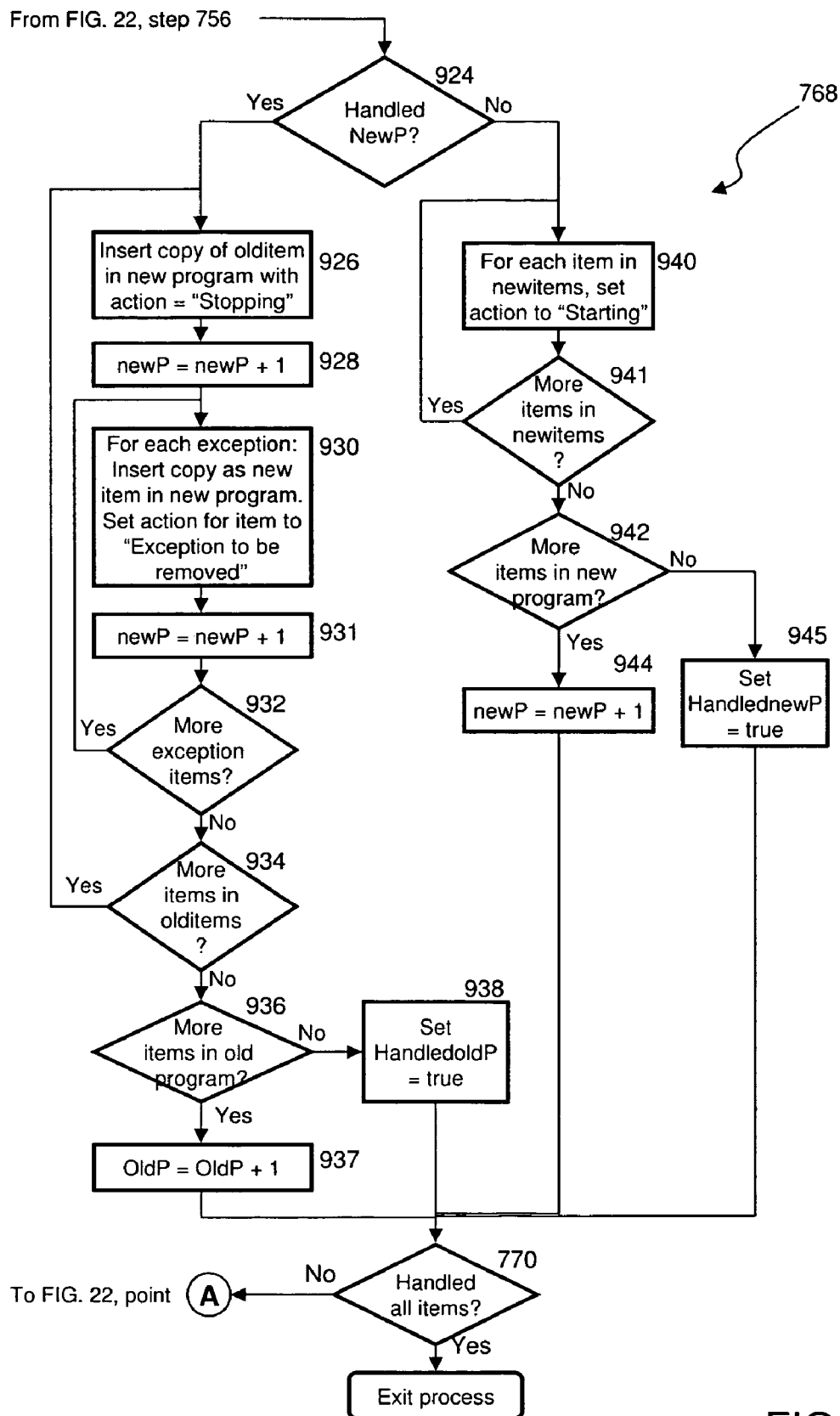
Figure 23G:
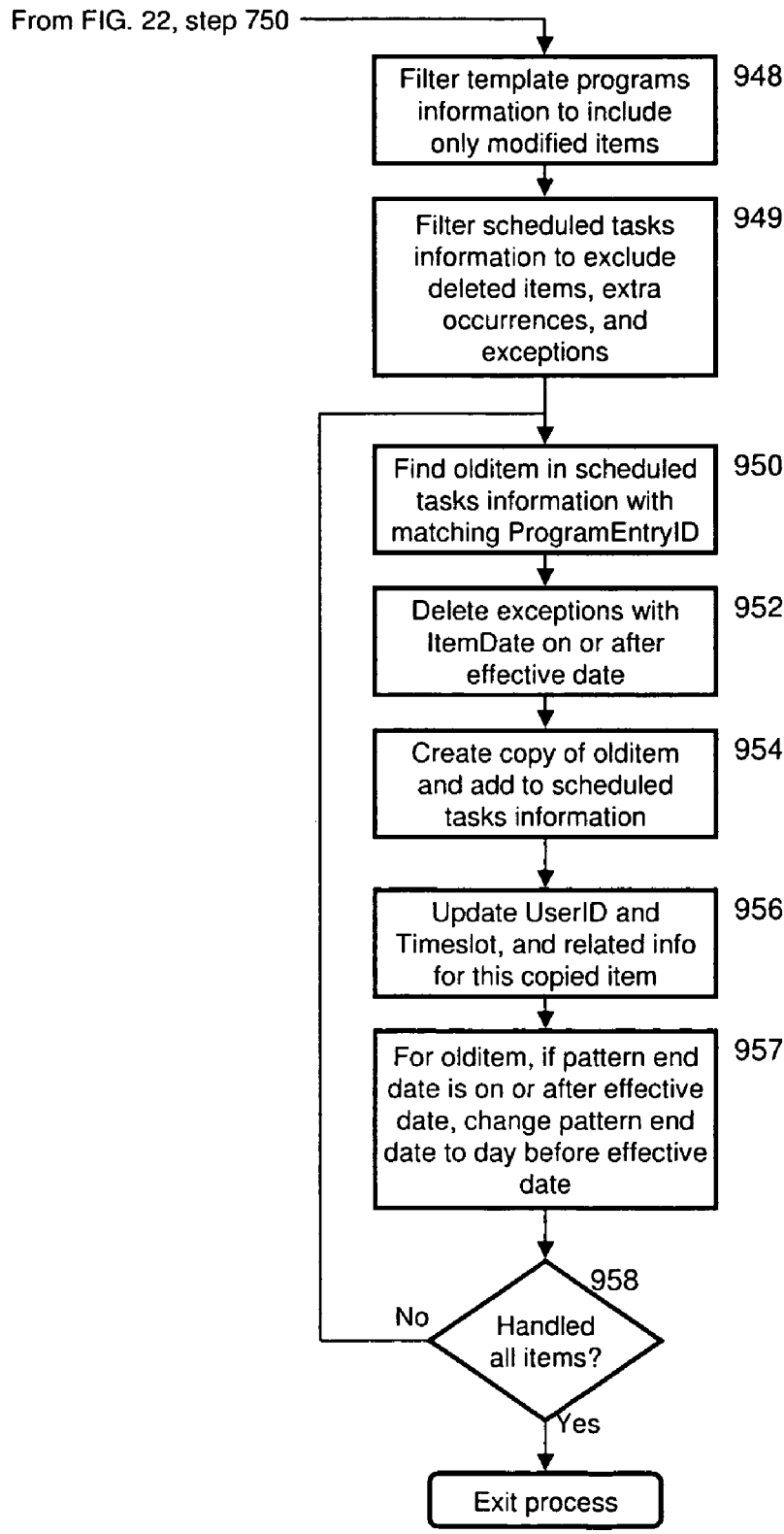
Figure 24:
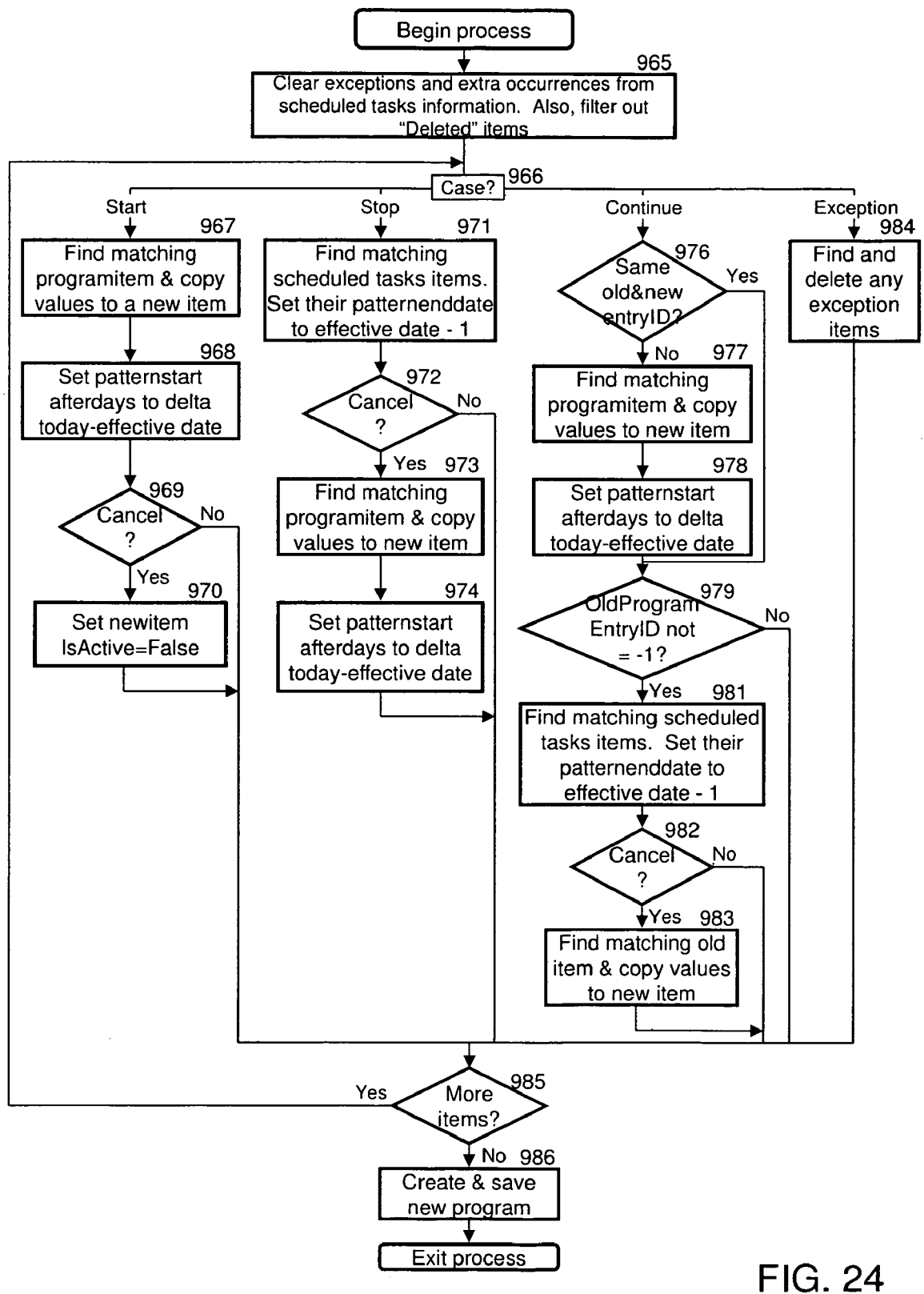
FIG. 24 is a flow chart illustrating a process performed by a changes viewer/editor component.

As exemplified in FIG. 15, the changes viewer/editor component 158 provides a display format on the GUI screen for the user to review and edit changes which are to be applied to the scheduled tasks information as part of processes shown in FIGS. 22 to 24. These processes create new scheduled tasks information associated with a new template program or programs to replace items in the scheduled tasks information which are associated with an old template program or programs. The changes viewer/editor component 158 is presented to the user on the GUI screen after the completion of the process shown in high-level form in FIG. 22. FIGS. 23A to 23G represent a detailed view of the process shown in FIG. 22.

To implement the processes in FIGS. 22 to 24, the structures of the long-term scheduled tasks information as shown in FIG. 2, the exceptions information as shown in FIG. 3, and the scheduled tasks information as shown in FIG. 4 are modified to include three additional fields: a ProgramID field, a ProgramEntryID field, and a TaskID field as shown in FIG. 9. FIG. 9 shows an abbreviated version of the structure shown in FIG. 4 and the addition of the three new fields. The ProgramID field associates items in the scheduled tasks information and exceptions information with a particular template program group of items from the template programs storage buffer 150. The ProgramEntryID field associates items in the scheduled tasks information and exceptions information with a specific item in the template programs storage buffer 150. The TaskID field is used to identify items in the template programs information which involve the same or similar activity, and, optionally, the same or similar sub-group identifier such as representing an area in which the task is performed.

Further, the process shown in FIG. 22 creates a temporary program changes storage buffer to store program changes information comprised of sub-sets of information from (A) items in the template programs storage buffer 150 associated with the old template program or programs; (B) items in the template programs storage buffer 150 associated with the new template program or programs; and, (C) items in the scheduled tasks information and exceptions information associated with the old template program or programs. In the process shown in FIG. 22, information associated with the old template program or programs is related to information associated with the new template program by means of the TaskID field. Accordingly, the information represented in the temporary program changes storage buffer may fall into one of three different cases: information associated with a TaskID only present among items associated with the old template program or programs, which items will be cancelled when the user commits to the changes as represented by means of the changes viewer/editor 160; information associated with a TaskID present in items associated with both the old template program or programs and the new template program and programs, which items will be continued, though possibly with some modifications such as a change in timeslot assignment; and, items associated with a TaskID only present among items from the new template program, which items will be started when the users commits to the changes as represented by means of the changes viewer/editor 160. For information falling into the first case, the process shown in FIG. 22 will store an item in the temporary program changes storage buffer for each recurring task, exceptions occurrence, and non-recurring task associated with the old template program or programs along with a text field indicating that the items will be cancelled. For information falling into the second case, the process shown in FIG. 22 will store a plurality of items for each TaskID with the count of items representing the larger of either the count of items under the old template program or programs with the same TaskID or the count of items under the new template program or programs with the same TaskID along with a text field indicating that some or all of the items associated with the TaskID will be continued in the form of items associated with the same TaskID and new template program or programs. In this manner, it is possible to identify to the user whether the continued tasks will increase, decrease, or remain the same in number and to represent the nature of any changes affecting items with the same TaskID in both the old template program or programs and the new template program or programs. For information falling into the third case, the process shown in FIG. 22 will store an item in the temporary program changes storage buffer for each item in the template programs storage buffer 150 associated with the new template program along with a text field indicating that the items will be started.

The changes viewer/editor component 158 includes several types of user interface elements shown in FIG. 15 which will now be discussed.

The changes grid UIE 302 represents items from the temporary program changes storage buffer in the form of rows in a grid structure. Certain fields in the changes grid UIE 302, referenced by column position, may be altered so as to modify the changes applied to a particular item in the process shown in FIG. 24. Among the columns, there is one with a check box UIE which is associated with a boolean IsActive field for each item in the temporary program changes storage buffer. Only items with a positive field value in the IsActive field will generate new scheduled tasks information in the process shown in FIG. 24. There are also columns for displaying the TaskName, Timeslot, TimeslotGroup, UserName, and ItemDate for any exception items from the old template program which are to be cancelled. The user has the option of altering some or all of these values prior to committing to the changes represented in the changes grid UIE 302. There are two additional columns with fields for indicating by means of a check box UIE whether any changes represented by a particular row in the changes grid UIE 322 are to be cancelled and for displaying an Actionmessage text field value to indicate, for example, that an item from an old template program is to be cancelled.

Two list box UIEs are provided to indicate which old template program or programs and which new template program or programs will be affected in the process shown in FIG. 24. An old programs list box UIE 296 is used to indicate the involved old template program or programs in the same manner as with the old programs list box UIE 296. A new program list UIE 298 is used to indicate the involved new template program or programs in the same manner as with the new programs list box UIE 298. The default values shown in the two list box UIEs will be the old and new programs referenced by means of the program viewer/editor component 154. If the user selects different items in either of the two list box UIEs shown in FIG. 15, then the changes viewer/editor component 158 will re-run the process shown in FIG. 22 to update the information displayed by means of the changes viewer/editor component 158 in accordance with the modified field values for the old and new template program ProgramIDs.

An effective date selection UIE 320 is provided for indicating the effective date to be used in applying operations against the old and new template program items. The default value for the effective date is the current date stored in the default values storage buffer 134.

A commit button UIE 322 may be selected by means of the input device 101 to cause the process shown in FIG. 24 to begin. A cancel button UIE 324 may be selected by means of the input device 101 to cancel any changes which were to be made in the processes shown in FIG. 24.

Next, the operation of the schedule management system of the embodiment will be described in detail with reference to FIGS. 16 to 26.

First, with reference to FIG. 16, a process to be executed by the task-timeslot information management unit 132 will be described. Step 340 in the process calculates values for a DisplayPeriodBeginDate temporary variable and a DisplayPeriodEndDate temporary variable. These date values are used to defined a display period within which the process will generate any extra scheduled task occurrences and match any exception occurrences with corresponding scheduled task occurrences. These date values are calculated with predetermined offsets to the active date. For example, the DisplayPeriodBeginDate may be set as the first of the month prior to the active date and the DisplayPeriodEndDate may be set as the last day of the second month after the month containing the active date.

Step 342 clears any exceptions or extra scheduled task occurrences which may be present in the scheduled tasks storage buffer 128. This step 342 ensures that if any changes have been made to an item in the scheduled tasks information, new scheduled task occurrences and exceptions occurrences will be generated which reflect the effect of these changes. Under alternative embodiments, step 342 may simply clear extra scheduled task occurrences and exceptions for items which have in fact changed since any of the values in the scheduled tasks storage buffer 128 were last changed. This may reduce processing overhead for the system.

In step 344, a temporary storage buffer with the same structure and fields as the scheduled tasks storage buffer 128 is created to temporarily hold items which will be added to the scheduled tasks storage buffer 128 at the completion of the process shown in FIG. 16. Using this temporary storage buffer ensures that the indexing of rows in the scheduled tasks storage buffer 128 is unaffected during the various steps in the loop which is traversed over step 346 to step 380.

Step 346 represents a sub-process which may be called by other steps in the current process. Step 346 calculates the first valid occurrence date on or after the DisplayPeriodBeginDate for the item from the scheduled tasks information which is the current object of the loop spanning steps 346 to 380, and, calculates the occurrence number representing the ordinal position in the series of occurrences associated with a particular recurring task. The first valid occurrence date will occur after the later of the DisplayPeriodBeginDate, the item's PatternStartDate field value, or a date supplied in the call to the sub-process, and, before the earlier of the item's PatternEndDate field value and the DisplayPeriodEndDate. Supplying a date in the call to the sub-process allows a call with the current ItemDate plus 1 day to produce a new ItemDate associated with the next occurrence of an item. Step 346 returns a boolean value to indicate whether or not a valid occurrence date was found. If none is found, then a maximum system date such as Dec. 31, 2031 is used as the ItemDate for the row being processed.

In step 350, a temporary reference variable called TempItem is set to refer to the item in the scheduled tasks storage buffer 128 or in the temporary storage buffer which is the current object of the loop spanning steps 346 to 380.

In step 352, the currently referenced item's IsRecurring field is checked for its boolean value and the TimeslotType field is also checked. Items in the scheduled tasks storage buffer 128 which are both recurring (i.e., IsRecurring=True) and found, by examination of the value in the TimeslotType field, to not be daily recurring items will, by means of an IF . . . Then structure, continue to step 354 to be processed in a loop defined by steps 354 to 378. Accordingly, the system will have to maintain information which associates values in the TimeslotType field with a boolean value indicating whether or not a particular TimeslotType value indicates an item in the scheduled tasks storage buffer 128 is a daily recurring item. This structure limits the display of daily recurring items to a single occurrence in order to reduce screen clutter and to save on storage and processing overhead. This structure is not a necessary element of the system, so, if the filtering out of the daily recurring items in the above manner is not useful in a particular embodiment, then it may be dispensed with. For items which are either daily recurring items or non-recurring items, processing proceeds directly from step 352 to step 380.

In step 354, an IF . . . THEN test is performed to determine whether the currently referenced item's ItemDate falls within the display period. If the test in step 354 produces a value of False or No, the process diverts to step 380. If the test in step 354 produces a value of True or Yes, the process continues on to step 356.

In step 356, a combined IF . . . THEN test is performed which consists of (A) a test whether the currently referenced item has its boolean HasExceptions field set to True and (B) a search of the exceptions information storage buffer 130 for an exceptions item which corresponds to the currently referenced item. The correspondence between a particular referenced item and an exceptions occurrence is established by their sharing the same values in the ScheduledTaskID and OccurrenceNumber fields.

If the combined test in step 356 produces a True value, then in step 358 the procedure copies the corresponding exceptions item from the exceptions information storage buffer 130 and saves it as a new item in the temporary storage buffer.

In step 360, the currently referenced item is submitted by reference to step 346 along with a supplied date representing the item's current ItemDate field value plus one day. Use of step 346, a sub-process accessible by several steps in the current process, will both update the currently referenced item's ItemDate to the date of the next occurrence in its series and will update the OccurrenceNumber field to the value associated with the next occurrence in its series, should there be a valid next occurrence date. It will also return a boolean value indicating whether a valid next occurrence date was found to exist. An IF . . . THEN test is then performed. If the Boolean value returned in the call to the sub-process is True or Yes, then the process diverts to point B leading back into the loop defined by steps 354 to 378. If the test yields a value of False or No, then the process continues on to step 362. It is important to note that the call to step 346 will update the currently referenced item's OccurrenceNumber field to provide each item which is stored in the scheduled tasks storage buffer 128 with a unique key. As exemplified here, the key is a composite key consisting of the item's ScheduledTaskID and OccurrenceNumber field values.

In step 362, an IF . . . THEN test is undertaken to determine whether the currently referenced item represents a new entry. A new entry is either an existing item stored in the temporary storage buffer or a temporary item which has the field structure of items in the temporary storage buffer, but, which has not yet been added to the temporary storage buffer. This test must be undertaken because after the first iteration through step 378, the TempItem reference variable will reference an existing item in the temporary storage buffer or will reference a new item which may be added to the temporary storage buffer, and, should such a referenced item be masked by an item from the exceptions information storage buffer 130, it may need to be deleted or not added to the temporary storage buffer.

If the test in step 362 determines that the currently referenced item is a new entry, then the process continues to step 364 in which the process sets said currently referenced item to a value of nothing. This causes the system to delete said currently referenced item from the temporary storage buffer if it should previously have been added to the storage buffer. After step 362, the process continues to step 380.

If the test in step 362 produces a False or No value, then the referenced item is an item from the scheduled tasks storage buffer 128 which needs to be maintained in the buffer even though there is a corresponding exceptions item already copied into the temporary storage buffer. Such an item will have its ItemDate set to a maximum system date such as Dec. 31, 2031 and its OccurrenceNumber field set to an appropriately large number such that it will not be displayed by the system. After step 364, the process continues on to step 380.

In step 368, an IF . . . Then test is made to determine whether the currently referenced item is a new entry. If it is, then the item will be saved to the temporary storage buffer. The process then continues to step 370.

In step 370, the process creates a new temporary item using the field structure of items in the temporary storage buffer and references this item using a TempItem2 reference variable. The field values of the new temporary item are set equal to the field values of the currently referenced item, that is, to the field values of the item referenced by the TempItem reference variable. The process then continues to step 374.

In step 374, the process uses an IF . . . THEN test to determine whether the currently referenced item has a valid next occurrence date by submitting the TempItem2 referenced item to sub-process 346 along with a date value of its current ItemDate plus 1 day. If the test in step 374 produces a value of False or No, then the process diverts to step 380.

If, the test in step 374 produces a value of True or Yes, then, the process continues on to step 378 in which the TempItem reference variable is set to refer to TempItem2. The new currently referenced item will be a new temporary item created in step 370 which will have as its ItemDate, the date of the next occurrence in the series represented by item originally processed in step 352 prior to entering the loop defined by steps 354 and 378. The process now continues on to step 354. The loop defined by steps 354 to 378 is not exited until all of the scheduled task occurrences during the display period for a particular item from the scheduled tasks storage buffer 128 have been identified and any exceptions items which have matching values for the ScheduledTaskID and OccurrenceNumber fields will have been substituted for the matching scheduled task occurrences.

In step 380, an IF . . . THEN test determines whether there are additional items to process in the scheduled tasks information storage buffer 128. If all items have been processed, then in step 382 all the items from the temporary storage buffer are added to the scheduled tasks information buffer 128. After completion of the process shown in FIG. 16, the scheduled tasks information buffer 128 includes the original items acquired from the task-timeslot information storage device 106 and items representing either additional scheduled task occurrences or exceptions occurrences where the ItemDate of both types of occurrences occur during the display period defined by the DisplayPeriodBeginDate and DisplayPeriodEndDate values.

Now, with reference to FIG. 17, a process to be executed by the scheduled tasks display controller 136 will be described. In step 390, the items in the scheduled tasks storage buffer 128 are filtered to include items for the current user and to exclude any items which have previously been marked for deletion or which have an ItemDate field value set to the maximum system date such as Dec. 31, 2031. From step 390, the process continues on to step 392 in which the filtered items from step 390 are sorted by ItemDate and Timeslot. Processing continues from step 392 on to step 394.

In step 394, any information which may have previously been added by the task-timeslot integrator component 117 to the calendar component 116 is cleared from the calendar component 116. As will be described below, the scheduled tasks display controller 136 maintains references to information and associated user interface elements in the calendar component 116 where said information and associated user interface elements correspond to information maintained by the task-timeslot integrator component 117. These references enable the task-timeslot integrator component 117 to clear specific information maintained by the calendar component 116. Under alternative embodiments, it should be feasible to employ a version of the current process which only clears from the calendar component 116 that portion of the added information which corresponds to information in the task-timeslot integrator component 117 which has been modified since the previous use of the process shown in FIG. 17. Processing continues from step 394 on to step 396.

At step 396, the process enters into a loop defined by steps 396 to 408. In step 396, an IF . . . THEN test is employed to determine whether a current item from the scheduled tasks storage buffer 128 being processed in the loop has a different ItemDate or Timeslot from the previous item processed. This test always produces a result of True or Yes when processing the first item. If a change in either of the fields is detected, then the process continues on to step 398. If no change is detected, then the process continues on to step 404.

In step 398, an IF . . . THEN test determines whether a current event object has yet been created during the current execution of the process shown in FIG. 17. The current event object is a temporary storage buffer for accumulating references to items in the scheduled tasks information buffer 128 which have the same ItemDate and Timeslot field values. If desired, a field associated with the current event object may be used to accumulate a listing of scheduled tasks information items.

If in step 398 the IF . . . THEN test determines that a current event object has already been created, then the process continues on to step 400 in which the process converts the values associated with that current event object into data and commands which the process conveys to the calendar component 116 by means of the inter-component communication control unit 115 in order to cause the calendar component 116 to represent scheduled tasks information and exceptions information associated with a particular ItemDate and Timeslot by means of the calendar component 116 and the GUI screen. Step 400 further collects a reference to the newly created event item stored by the calendar component 116 and stores this reference in a temporary storage buffer in a tree structure which cross-references items from the scheduled tasks storage buffer 128 with event items maintained by the calendar component 116. Step 400 will collect and store in the tree structure references to event header UIEs, sub-group header UIEs, and task UIEs where such UIEs are generated and maintained by a particular embodiment of the system. The cross-reference information enables the scheduled tasks display controller 136 to identify and intercede in screen drawing commands affecting the region of the GUI screen associated by the calendar component 116 with an event, and, thereby, display in said region the complex of user interface elements described above in the discussion of FIGS. 13A and 13B. After step 400, the process continues on to step 402.

If in step 398 the IF . . . THEN test determines that a current event object has not already been created then the process bypasses step 400, continuing directly from step 398 to step 402. This condition will only apply with the first item processed in the loop defined by steps 396 to 408.

In step 402, the process creates a new current event object with associated temporary variables for ItemDate and Timeslot set to the values of the corresponding fields in the current item being processed. The process then continues to step 404.

In step 404, a reference to the current item being processed in the loop defined by steps 396 to 408 is added to the current event object.

In step 406, a test is made to determine whether the current item is the last item to be processed. If in step 406 it is determined that the current item is the last item, then the process embodied in step 400 is applied to save information associated with what is the final current event object to the calendar component 116. Processing continues from step 406 to step 408.

In step 408, an IF . . . THEN test is performed to determine whether any more items remain to be processed. If some items still remain to be processed, then the process diverts back to step 396, the beginning of the loop defined by steps 396 to 408. If at step 408 all the items from the filtered scheduled tasks storage buffer 128 have been processed, then the process is finished.

Now, with reference to FIG. 18, a process to be executed by the scheduled tasks DND controller 142 will be described. The process begins execution in response to any drag-and-drop event involving the user interface elements monitored by the scheduled tasks DND controller 142. In a drag-and-drop event, the inter-component communication control unit 115 conveys to the scheduled tasks DND controller 142 a reference to a source UIE and a destination UIE, meaning respectively the UIE selected by the user to initiate the drag-and-drop operation and the UIE over which the dragged source UIE is released, using the input device 101. Step 650 of the process employs a series of operations which relate the source UIE to a set of items resident in the scheduled tasks storage buffer 128 and which also determine the fields and values of those fields that will be used for updating items affected by the drag-and-drop process shown in FIG. 18.

First of these operations in step 650 comprises a SELECT . . . CASE structure which associates a generic UIE reference with the UIE reference supplied by the calendar component 116 to the scheduled tasks DND controller 142 by means of the inter-component communication control unit 115. The types of UIEs which may be referenced by the generic UIE reference in this first operation include: several types of event-related UIEs such as the day agenda event UIE 244 shown in FIG. 10 and the large day event UIE 254 shown in FIG. 11; several types of date-related UIEs such as the small day UIE 250, the day agenda header UIE 242, the day agenda body UIE 246, the large day header UIE 256, and the large day body UIE 258 as shown in FIG. 10 and FIG. 11; several types of tree-node UIEs associated by task-timeslot integrator component 117 with a particular event header UIE 274, sub-group header UIE 276, or task UIE such as are exemplified in FIG. 13B; and, a list item UIE such as the user name UIE 262 shown in FIG. 11.

Second of these operations in step 650 determines whether the user has moved the source UIE sufficiently far enough away from its selection point for the drag-and-drop operation to be considered valid.

Third of these operations in step 650 is an event handling process which, by means of a SELECT . . . CASE structure, derives from the generic UIE reference a temporary reference to the affected items in the scheduled tasks storage buffer 128, and, by means of a second SELECT . . . CASE structure, uses the destination UIE to determine what date, userID, and/or timeslot values should be applied to the affected items. The first SELECT . . . CASE structure in the third operation in step 650 determines the type of user interface element referenced by the generic object reference. If the type of user interface element is event-related, then the affected items reference is set to include all items from the scheduled tasks storage buffer 128 which were assigned to the same, corresponding current event object created in step 402 shown on FIG. 17. If the type of user interface element is date-related, then the affected items reference is set to include all items from the scheduled tasks storage buffer 128 which were assigned to the same, corresponding current event objects created in step 402 shown on FIG. 17 for the particular date associated with the date-related user interface element reference. If the type of user interface element is a list item, then the affected items reference is set to include all items from the scheduled tasks storage buffer 128 which were assigned to the same, corresponding current event objects created in step 402 shown in FIG. 17 for the active date as stored in the default values storage buffer 134 and for the user as determined by examination of the userID associated with the list item initially selected in the drag-anddrop operation. If the type of user interface element is a tree-node, then a sub-process is used to set the affected items reference to (A) a single item from the scheduled tasks storage buffer 128 if the tree-node corresponds to a task UIE such as task UIE 278, or, (B) a plurality of items if the tree-node corresponds either to a sub-group UIE such as sub-group UIE 276 or to an event header UIE such as event header UIE 274.

The second SELECT . . . CASE structure in the third operation in step 650 determines the new item date, new userID, and/or new timeslot values associated with the destination UIE by using a different sub-process for each type of destination UIE in a similar manner to that which is used above in the first operation in step 650. The destination UIE will correspond to either an event-related user interface element, date-related user interface element, tree-node user interface element, or list item user interface element. If the correspondence is to an event-related user interface element, then the new item date value and timeslot value will be set to the date and timeslot associated with the event-related user interface element and the new userID value will be set to the userID of the current user as maintained in the default values storage buffer 134. If the correspondence is to a date-related user interface element, then the new item date value is set to the date associated with the date-related user interface element and the new userID value is set to the userID for the current user as maintained in the default values storage buffer 134. If the correspondence is to a tree-node user interface element, then the new item date and new timeslot values will be set to the date and timeslot associated with the tree-node user interface element and the new userID is set to the value for the current user as maintained in the default values storage buffer 134. If the correspondence is to a list item user interface element, then the new UserID value is set to the value for userID corresponding to the destination UIE list item user interface element and the new item date value is set to the date value of the calendar component active date as maintained in the default values storage buffer 134.

In step 652 of the process shown in FIG. 18, the process determines the count of items referenced by the affected items reference established in step 650 using an IF . . . THEN structure. If the count is only one item, then the process diverts to step 654, which is another IF . . . THEN structure, to determine whether the single affected item's IsRecurring field value is true or false. If it is true, then in step 656 the user is asked by means of a dialog screen to indicate whether the item should be treated as a series of occurrences or as an individual occurrence. If the user indicates in step 656 that the item should be handled as a series, then the edit_item_as_series sub-process 658 is employed to produce the results of the drag-and-drop operation. If the user indicates in step 656 that the item is to be handled as an individual occurrence, then in step 660 an IF . . . THEN structure is used to determine whether the single affected item represents a scheduled tasks occurrence or an exceptions occurrence. If step 660 determines that the single affected item represents an exceptions occurrence, then the edit_exception sub-process 662 is employed to produce the results of the drag-and-drop operation. If step 660 determines that the single affected item does not represent an exceptions occurrence, then the add_exception sub-process 664 is employed to produce the results of the drag-and-drop operation. In this portion of the process shown in FIG. 18, after the sub-processes are completed, the process is completed.

If the process in step 652 determines that the count of affected items is greater than one, then the process diverts to step 668 in which a temporary value for the case is set to indicate that all the items being handled in the drag-and-drop operation represent a mix of exceptions occurrences and non-recurring scheduled tasks, this being the initial default assumption. The process continues from step 668 onto step 670.

At step 670, a loop is formed spanning steps 670 to step 672 to process each of the affected items. In step 670, each of the affected items is examined in an IF . . . THEN structure to determine whether a particular affected item represents a recurring, scheduled task occurrence. If none of the items examined in step 670 represent recurring, scheduled task occurrences, then the process continues on to step 672 which tests whether there are any more affected items to examine in the loop spanning steps 670 to 672. The process will loop through steps 670 to 672 until either (A) all the affected items have been examined, or, (B) one of the affected items examined is determined to be a recurring, scheduled task occurrence. If a recurring, scheduled task occurrence is found, then the process exits the loop defined as spanning steps 670 and step 672 and continues on to step 674.

In step 674, a dialog screen is presented to the user which allows the user to indicate by means of the user input device 101 whether (A) any recurring items should be treated as a series, (B) any recurring items should be treated as an individual occurrence of an underlying series, or, (C) that the process should ask the user via a second dialog screen for a decision on each recurring item among the affected items. The information gathered in steps 670 and 674 is sufficient for choosing a specific sub-process for further processing of the affected items under one of the following cases: (Case A) the affected items consist of only exception occurrences and non-recurring scheduled task items, (Case B) any recurring, scheduled task occurrences or exception occurrences among the affected items should be processed as representatives of their associated series, (Case C) any recurring, scheduled task occurrences or exception occurrences among the affected items should be processed as individual occurrences, or, (Case D) user input should be obtained to determine the specific processing case for any recurring, scheduled task occurrences or exception occurrences among the affected items. In the interest of brevity, Case D, the treatment of the affected items as requiring user input on each item, is not shown in FIG. 18. The treatment for Case D simply iterates through each of the affected items applying the same logic and operations as have been discussed above with reference to steps 654 through 665.

After exiting steps 672 or step 674, the process continues on to either the loop defined as spanning step 676 to step 678, to the loop defined as spanning step 658 and 680, to the loop defined as spanning step 682 to 684, or to the treatment for Case D discussed above, respectively being the processing for cases A, B, C, and D discussed above.

In case A, a loop is defined spanning step 676 to step 678 which processes each affected item individually. In step 676, the process determines whether a particular affected item represents an exceptions occurrence. If it does represent an exceptions occurrence, then the edit_exception sub-process 662 is employed, else the edit_item sub-process 665 is employed. The process then continues on to step 678 to determine whether any more affected items need to be processed prior to exiting the process shown in FIG. 18.

In case B, a loop is defined spanning a call to the edit_item_as_series sub-process 658 and step 680, with step 680 determining whether any more affected items need to be processed prior to exiting the process shown in FIG. 18.

In case C, a loop is defined spanning steps 682 and 684. In step 682, the process determines whether a particular affected item represents an exceptions occurrence. If it does represent an exceptions occurrence, then the edit_exception sub-process 662 is employed, else the add exception sub-process 664 is employed. It is important to note that, if a particular affected item is non-recurring, then the add_exception sub-process 662 will hand off the processing of the item to the edit_item sub-process 665 for processing as exception occurrences are not created for non-recurring scheduled tasks items. The process then continues to step 684 to determine whether any more affected items need to be processed prior to exiting the process shown in FIG. 18.

Changes to any affected items in the scheduled tasks storage buffer 128 and any corresponding items in the exceptions information storage buffer 130 are handled by the following sub-processes: the edit_item_as_series sub-process 658, edit_exception sub-process 662, add_exception sub-process 664, and edit_item sub-process 665. Assignment of new timeslot values also occurs in these sub-processes.

The edit_item_as_series sub-process 658 begins by finding and deleting any items from the exceptions information which have the same ScheduledTaskID field value as the particular affected item which is the object of sub-process 658. Sub-process 658 then iterates through all the items in the scheduled tasks storage buffer 128 to delete items with the same ScheduledTaskID field value as the affected item but which represent extra entries added to the scheduled tasks storage buffer 128, specifically any extra scheduled task occurrences and exception occurrences. The remaining item with the same ScheduledTaskID field value is then passed by reference to the edit_item sub-process 665 to complete the edit_item_as_series sub-process 658 before returning control to the process step which called the edit_item_as_series sub-process 658.

The edit_item sub-process 665 applies the values for the new ItemDate and new UserID to the corresponding fields of the affected item which is the object of the edit_item sub-process 665. The sub-process then uses a process of the timeslot resolution logic unit 144 shown in FIG. 19 to apply values associated with a particular timeslot to corresponding fields of the affected item. Process control is then passed back from the timeslot resolution logic unit 144 to the edit_item sub-process 665 and then from the edit_item sub-process 665 to the process step which called the edit_item sub-process 665.

The add_exception sub-process 664 begins by creating a new item in the exceptions information storage buffer 130, copying the field values from the affected item into the corresponding fields of the new item, and saving this new item to the exceptions information storage buffer 130. The sub-process uses the process of the timeslot resolution logic unit 144 shown in FIG. 19 in the same manner as described in connection with the discussion above of edit_item sub-process 665. It then finds any items from the scheduled tasks storage buffer 128 which have the same ScheduledTaskID as the affected item which is the object of sub-process 664 and sets the boolean field "HasExceptions" to the value of True. Finally, the add_exception sub-process 664 will return control to the process step which called the add_exception sub-process 664.

The edit_exception sub-process 662 begins by setting the ItemDate and UserID field values of the affected item which is the object of the edit_exception sub-process 662 to the values for the new item date and new UserID determined in the previous steps of the process in FIG. 18. The edit exception sub-process 662 then submits the edited item by reference, along with any new timeslot value, to the process of the timeslot resolution logic unit 144 shown in FIG. 19 for updating timeslot related field values in the same manner as described above in edit_item sub-process 665. Lastly, the edit_exception sub-process 662 finds the corresponding item in the exceptions information storage buffer 130 and updates the field values of said corresponding item to the values now resident in fields of the affected item which has been the object of the edit_exception sub-process 662, and returns control to the process step which called the edit_exception sub-process 662.

Now, with reference to FIG. 19, the process performed by the timeslot resolution logic unit 144 for assigning a timeslot and timeslot-related values to a scheduled tasks item or exceptions item will be described. The call to the process shown in FIG. 19 passes as parameters the following: a reference to the object of the process such as a scheduled tasks item or exceptions item; the values developed during step 650 of the process shown in FIG. 18 for the new item date, new userID, and, optionally, a new timeslot; and, a boolean variable IsSeries indicating whether the item referenced in the call is to be treated as a series or as an individual occurrence of a series. The item reference passed in the parameters will be called the supplied item in the following discussion.

In step 688, an IF . . . THEN structure is used to determine whether any items in the scheduled tasks storage buffer 128 have a UserID field value and ItemDate field value corresponding to the same field values of the supplied item. If the answer is Yes, then a TempItems reference variable is created to reference all the items in the scheduled tasks storage buffer 128 with said UserID field value and ItemDate field value, and, the process then continues on to step 689. If the answer is No, then the process diverts to step 694.

Steps 689, 690, 691, and 692 represent a series of progressively less specific IF . . . THEN tests which have the objective of finding an appropriate timeslot and associated timeslot values to apply to the corresponding fields of the supplied item. The first IF . . . THEN test, step 689, compares the Timeslot field value of each of the items referenced by the TempItems variable with the optionally supplied timeslot value from the call to the process, should a value have been supplied. The second IF . . . THEN test, step 690, compares the timeslot field value of each of the items referenced by the TempItems variable with the timeslot field value of the supplied item. The third IF . . . THEN test, step 691, compares the timeslot type field value of the items referenced by the TempItems variable with the timeslot type field value of the supplied item. If a match is found in any of the steps 689, 690, and 691, then the matching item, which will be a member of the set of items referenced by the TempItems variable, will be used as a source of new timeslot-related values to apply to corresponding fields of the supplied item in step 693. If no match is found in steps 689, 690, or 691, then the process continues on to step 692.

In the fourth IF . . . THEN test, step 692, the process checks whether the supplied item's IsSeries boolean field value is False and also whether a DNDMerge boolean variable maintained by the system is set to the value of True. If the IsSeries field value is False and the DNDMerge field value is True, then, the process uses the first item referenced by the TempItems reference variable as a source for timeslot-related field values to apply to the supplied item and continues on to step 693. If the test in step 692 fails to find an item among the TempItems referenced items, then the process diverts to step 694. This structure provides that, if the new user has an item on the new ItemDate and the system maintained value for the DNDMerge field is set to True, then the system will use the first of the TempItems referenced items as a source of new timeslot-related field values applied in step 693.

Step 693 copies the timeslot related field values from the item which was identified in either step 689, step 690, step 691, or step 692 into the corresponding fields of the supplied item and then returns process control to the process step which called the process shown in FIG. 19.

A supplied item which is processed in step 694 represents a case where the process was unable to discover an item for the supplied new item date and new user in the scheduled tasks storage buffer 128 to use as a source of values for updating the timeslot related field values of the supplied item. Step 694 begins with a SELECT . . . CASE structure which uses the timeslot type of the supplied item to divert the process within step 694 to a set of operations which are specific to each timeslot type. After diverting to a type-specific set of operations, the process continues on from step 694 to step 696. Each of the type-specific operations is structured as a series of increasingly more general IF . . . THEN tests attempting to match values of an item in the timeslots information storage buffer 138 with timeslot-related values of the supplied item. When the first match is found, the process continues on to step 696. In all cases, if no match is found during the type-specific set of operations, then step 694 will simply use the first timeslots item with the same TimeslotType field value as that of the supplied item. The timeslot types and associated specific sets of operations include the following:

Weekly type: The operations specific to this timeslot type will attempt to identify the first item from the timeslots information storage buffer 138 which has the same values in its TimeslotType and DayofWeek fields as the corresponding fields of the supplied item.

WeekOfMonth-MonthlyInterval type: The operations specific to this timeslot type will attempt to identify the first timeslots item from the timeslots information storage buffer 138 which has the same values in its TimeslotType, Weekof-Month, and DayofWeek fields as the corresponding fields of the supplied item. Next, it will attempt to identify the first timeslots item from the timeslots information storage buffer 138 which has the same values in its TimeslotType and WeekofMonth fields as the corresponding fields of the supplied item.

WeekOfMonth-YearlyInterval type: The operations specific to this timeslot type will attempt to find the first timeslots item from the timeslots information storage buffer 138 which has the same values in its TimeslotType, MonthofYear, WeekofMonth, and DayofWeek fields as the corresponding fields of the supplied item. Next, it will attempt to find the first timeslots item from the timeslots information storage buffer 138 which has the same values in its TimeslotType, MonthofYear, and WeekofMonth fields as the corresponding fields of the supplied item. Next, it will attempt to find the first timeslots item from the timeslots information storage buffer 138 which has the same values in its TimeslotType and MonthofYear fields as the corresponding fields of the supplied item.

DateofMonth-Monthly type: The operations specific to this timeslot type will attempt to find the first timeslots item from the timeslots information storage buffer 138 which has the same values in its TimeslotType, Interval (i.e., number of months between occurences), and DayofMonth fields as the corresponding fields of the supplied item. Next, it will attempt to find the first timeslots item from the timeslots information storage buffer 138 which has the same values in its TimeslotType and Interval fields as the corresponding fields of the supplied item.

DateofMonth-Yearly type: The operations specific to this timeslot type will attempt to find the first timeslots item from the timeslots information storage buffer 138 which has the same values in its TimeslotType, MonthofYear, Interval, and DayofMonth fields as the corresponding fields of the supplied item. Next, it will attempt to find the first timeslots item from the timeslots information storage buffer 138 which has the same values in its TimeslotType, Monthof-Year, and Interval fields as the corresponding fields of the supplied item. Next, it will attempt to find the first timeslots item from the timeslots information storage buffer 138 which has the same values in its TimeslotType, Monthof-Year, and DayofMonth fields as the corresponding fields of the supplied item. Next, it will attempt to find the first timeslots item from the timeslots information storage buffer 138 which has the same values in its TimeslotType and MonthOfYear fields as the corresponding fields of the supplied item.

The result of step 694 will be the identification of a particular timeslots item which is deemed to be the closest fit to the timeslot of the supplied item. The process continues from steps 694 to step 696. In step 696, the process copies the timeslot related field values from the identified timeslots item into the corresponding fields of the supplied item and then exits the sub-process, returning control to the process step which called the process shown in FIG. 19.

Now, with reference to FIG. 20, the process performed by the programs information management unit 152 for translating a particular group of items in the template programs storage buffer 150 into entries suitable for adding to the scheduled tasks storage buffer 128 will be discussed. In step 697, the process joins together the template programs information as shown in FIG. 8 with the timeslots information as shown in FIG. 5 by means of common values in the Timeslot fields so as to associate timeslot-related fields such as StartTime and EndTime with the items in the template programs information. Other methods may be used to accomplish the same result as step 697 such as including timeslot-related fields in the template programs information itself, thereby eliminating the need to join information from the timeslots information with the template programs information to accomplish the purpose of step 697. The advantage of using separate timeslot information is that changes made to that information for a specific user may be applied to any subsequent template program items which are associated by means of the value in the Timeslot field in the current process.

In step 698, the now joined information is filtered to include only items from the template programs information which have the desired ProgramID, MinimumLevel, MaximumLevel, and IsActive field values. For example, if the template programs information is filtered for the ProgramID field value of "Modified 1" in step 694, then item 5 in FIG. 8 will be joined with item 2 in FIG. 6 and, in step 698, will be included in the filtered information for a current level value of a minimum of 1 and a maximum of 9. Further, in step 698, the filtered template programs information will include only items where the IsActive field as shown in FIG. 8 is set to a value of True. The process now continues on to step 699.

Steps 699 to 704 form a loop used to process each item in the joined, filtered information produced in steps 697 and 698.

In step 699, the field values of each from the joined, filtered tables are copied into corresponding fields of a new item suitable for adding to the scheduled tasks storage buffer 128.

In step 700, the process calculates new item's PatternStartDate value by taking an effective date value, here assumed to be the current date, and adding the number of days represented in PatternStartAfterDays field of the associated item from the joined, filtered information to said effective date value. The process then calculates the new item's PatternEndDate by either adding the PatternDays field value of the associated item from the joined, filtered information to the value in the new item's PatternStartDate field, or, setting the new item's PatternEndDate field value to the maximum system date such as Dec. 31, 2031 if the NoEndDate field of the associated item from the joined, filtered information has a boolean value of True.

In step 702, the sub-process in step 346, discussed above, is used to find the first valid occurrence date after the later of the current date or the PatternStartDate for each new item by including in the call to the sub-process in step 346 a reference to the new item and the effective date referenced in step 700. The sub-process in step 346 sets the new item's ItemDate field value to the first valid occurrence date and the new item's OccurrenceNumber field to the corresponding ordinal position associated with said ItemDate for the series of occurrences represented by the new item. The IsRecurring field of each new item will be set to True if the PatternStartDate and PatternEndDate represent different dates, else the IsRecurring field of each new item will be set to False. The new item is now added to the scheduled tasks information before proceeding to step 704.

In step 704, an IF . . . THEN test is performed to determine whether there are any remaining items from the joined, filtered table to be processed in the loop formed by steps 699 to 704. When all items have been processed, the IF . . . THEN test will yield a value of True and the process will be exited.

Now, with reference to FIG. 21, the process performed by the program items DND controller 156 for changing the template programs information in response to drag-and-drop event notifications involving user interface elements represented by means of the display shown in FIG. 14 will be discussed. The process commences in response to notification that a user interface element associated with an item in the template programs information such as program item UIE 294 or, a user interface element associated with an item from the user information such as user name UIE 262 has been superposed over either a program item grid UIE 290, a program item UIE, or a user name UIE, and it is also true that the program viewer/editor component 154 is the focus object of the GUI screen. In step 710, a mouse_down GUI event handler process creates a source items reference to the item or items in the template programs information which correspond to the superposed user interface element. If the superposed user interface element is a program item UIE such as program item UIE 294, then, the program item UIE will have been previously associated with a particular item in the template programs information during the process used to represent the program viewer/editor component 154 on the GUI screen, and, accordingly, the program item UIE may be used to derive a direct reference to said particular item and assign said direct reference to the source items reference. If the superposed user interface element is a user name UIE, then, if the user name UIE is associated with a different UserID than that of the current user, the process associates the source items reference with all items in the template programs information which are (A) associated with the template program or programs which are currently being displayed by means of the program viewer/editor component 154, and, (B) which have the same UserID field value as that UserID field value which is associated with the superposed user name UIE.

In step 712, an IF . . . THEN structure determines whether the type of user interface element over which the drag-and-drop action drop occurs, hereinafter described as the destination UIE, is the same type of user interface element as the program item grid UIE such as program item grid UIE 290, the program item UIE such as program item UIE 294, or, the user name UIE such as user name UIE 581. If the type is determined to be that of a program item grid UIE or program item UIE, then the process continues on to step 714. If the type is determined to be a user name UIE, then the process continues on to step 724.

In step 714, the process examines the item from the timeslot groups information associated with destination UIE, either a program item grid UIE or program item UIE, to obtain a TSResolutionOption value. An IF . . . THEN structure is then used which routes the process either to step 716 in the case of a TSResolutionOption field value of "ShowList" or to step 720 in the case of a TSResolutionOption field value of "UseDefaultTimeslot".

In step 716, the process presents the user with a dialog screen with a list of timeslot options as represented in the associated TSGroupList field to obtain by means of the input device 101 an indication of the Timeslot field value the user wishes to be applied to the source items referenced in step 710. In step 718, the user selects an item represented in the dialog screen and continues on to step 720. Accordingly, prior to entering step 720, the process will have identified a timeslot field value to apply to the source items.

In step 720, the process updates the Timeslot field value of the source items to the timeslot value identified either in step 714 or step 718. In step 722, any additional timeslot-related fields associated with the source items are updated to the values in the timeslots information associated with the Timeslot field value identified in step 714 or step 718. The process then continues from step 722 on to step 730.

In step 724, the process uses the UserID associated with the destination UIE, in this case a user name UIE, to find the item in the user information associated with the destination UIE and obtain associated fields in the user information to update corresponding fields in the source items in step 726. This will only occur when the UserID associated with the source items is different from the UserID associated with the destination UIE. The process continues from step 724 on to step 730.

In step 730, the process causes the program viewer/editor component 152 to display a representation of the template programs information on the GUI screen in the manner described above during the consideration of the program viewer/editor component 154, thereby reflecting any changes made in the course of the process shown in FIG. 21. As noted above, changes applied to the template programs information will not be reflected in the schedules tasks information until the user has clicked the template program save button UIE 707 and completed the processes shown in FIGS. 22 to 24.

Under an alternative embodiment, the program item UIEs such as program item UIE 294 in FIG. 16 incorporates an additional field to display the timeslot value of the associated item in the template programs information in addition to the checkbox and text as shown in FIG. 14. For example, a value of "JAN" could represent an annually recurring event occurring every year in January. With this alternative embodiment where the Timeslot field value of each template program item is made visible to the user, it becomes possible to add drag-and-drop logic such that the dragging and releasing of an item over a particular program item UIE may be interpreted as a desire on the part of the user to change the timeslot-related values of a source item or items to the values associated with the program item UIE under the mouse at the end of the drag-and-drop operation. This could be used for all program item UIEs or for only those program item UIEs displayed in program item grid UIEs which are associated with an item in the timeslot groups information with a TSResolutionOption field value of "ShowList".

Now, with reference to FIG. 22 and FIGS. 23A to 23G, the process performed by the program editor/viewer component 154 after the user clicks the template program save button UIE 707 will be described. As noted above, FIGS. 23A to 23G represent detailed flowcharts corresponding to steps in the high-level flowchart shown in FIG. 22. Accordingly, FIG. 22 and FIGS. 23A to 23G represent the same process. The process embodies what is referred to above as task persistence logic in program changes.

In step 750, the process employs an IF . . . THEN structure to compare the ProgramID values referenced by means of the old programs list box UIE 296 and the ProgramID values referenced by means of the new programs list box UIE 298 with a value of True if they are the different and a value of False if they are the same. The process continues on to step 948 shown in FIG. 23G if the result is False or No. The process continues on to step 752 if the result is True or Yes.

In step 752, the process creates a temporary program changes storage buffer to store program changes information comprised of sub-sets of information from (A) items in the template programs storage buffer 150 associated with the old template program or programs; (B) items in the template programs storage buffer 150 associated with the new template program or programs; and, (C) items in the scheduled tasks information and exceptions information associated with the old template program or programs. The temporary program changes storage buffer will include fields for an OldProgramEntryID value and NewProgramEntryID which are used in processing the information stored in the temporary program changes storage buffer. Next, the template programs storage buffer 150 is filtered to include only rows which are associated with the new template program ProgramIDs identified by means of the new programs list box UIE 298, which have an IsActive field value of True, and which have MinimumLevel and MaximumLevel field values consistent with the user level assumption maintained in the default values storage buffer 134. The items in the template programs storage buffer 150 are also sorted by TaskID and UserID field values. And, the filtered and sorted items are then copied into the temporary program changes storage buffer in the sorted order. Next, the template programs storage buffer 150 is refilled and filtered to include only items associated with the old template program ProgramIDs as identified by means of the old programs list box UIE 296. And, the items in the template programs storage buffer 150 are also sorted by TaskID and UserID field values. Items in the filtered and sorted template programs storage buffer 150 and items in the temporary program changes storage buffer now represent respectively the old template program or programs and the new template program or programs, and, since both storage buffers been sorted by TaskID and UserID, items in both tables are grouped first by TaskID and then by UserID within the TaskID sorted groups.

In step 753, a number of temporary variables are initialized including the variables listed in the upper left corner of FIG. 22. The meaning of these temporary variables is the following:

The two variables HandledOldP and HandledNewP are boolean variables which indicate whether all of the items in the filtered, sorted template programs storage buffer 150 and the temporary program changes storage buffer respectively have been processed. In the interest of clarifying the discussion, we will refer to the filtered, sorted information in the template programs storage buffer 150 as the "old program" and the information in the temporary program changes storage buffer as the "new program".

The two variables CountOldItems and CountNewItems are integer variables which represent a count of items with the same TaskID field value in the old program and a count of items with the same TaskID field value in the new program respectively. A particular TaskID may be associated with multiple items in the old program, new program, or both the old and new program. This might occur, for example, where the same item is accomplished using two items associated with different timeslot values.

The two variables OldP and NewP are integer variables which represent indexes associated with the items in the old program and items in the new program respectively. The total number of items in the new program is likely to grow during the process shown in FIG. 22. Accordingly, the same value for NewP may reference different items in the new program at different points during the process.

The two variables OldItems and NewItems are item collection reference variables which reference at any given point in the process, respectively, the set of items in the old program which are associated with a particular TaskID field value, and to the set of items in the new program which are associated with a particular TaskID field value.

The CurrentOldTask and CurrentNewTask integer variables are used to temporarily store TaskID field values. At a given point in the process, the CurrentOldTask variable will refer to a set of items in the old program and the CurrentNewTask will refer to a set of items in the new program. At each point in the process, the CurrentOldTask field value may be less than, equal to, or greater than the CurrentNewTask field value.

The Actionmessage variable is a text variable used to store a text message associated with a particular change that will be applied to particular items when the user clicks the commit button UIE 322.

The ExceptionItems variable is an item collection reference variable which references items in the exceptions information which are associated with the old program. More particularly, the ExceptionItems variable references items in the exceptions information which are associated, by means of the sharing the same ScheduledTaskID and OccurrenceNumber field values, or similar unique occurrence identifier, with particular items in the scheduled tasks information, and, said particular items in the scheduled tasks information are associated, by means of the sharing the same ProgramEntryID field value, with particular items in the old program. Optionally, the exceptions information may be sorted by ProgramEntryID prior to entering the loop defined in FIG. 22 between step 754 and step 770 to improve the speed of finding items in the exceptions information with particular ProgramEntryID field values.

Step 754 in the process is shown in greater detail in FIG. 23A. With reference to FIG. 23A, step 754 is comprised of steps 774 through step 808. The objectives of step 754 are (A) to assign a set of items associated with the TaskID field value maintained in the CurrentOldTask variable to the OldItems item collection reference variable, (B) to assign a set of items associated with the TaskID field value maintained in the CurrentNewTask variable to the NewItems item collection reference variable, (C) to assign a set of items, if any, from the exceptions information associated with items referenced by the OldItems item collection reference variable, (D) to increment the index variables OldP and NewP as each item in the old program and new program is processed, and, (E) to assign new values to the CurrentOldTask and CurrentNewTask integer variables when there is cause to process the next higher TaskID field values associated respectively with items in the old program or items in the new program. The system and method for accomplishing these objectives will now be discussed.

In step 774, the process checks using an IF . . . THEN structure whether the HandledOldP boolean field has a value of Yes or No. As is shown in the upper left hand corner of FIG. 22, the initial value for the HandledOldP variable is False or No. If the value in the HandledOldP variable is No, then the process continues on to step 776. If the value is Yes, then the process diverts to step 794.

In step 776, the process checks using an IF . . . THEN structure whether the item in the old program referenced by the index variable OldP is associated with a TaskID field value which is different than the TaskID field value of the previous item in the old program. If the test shows a change in the TaskID field values, then the process continues on to step 778. If there is not a change in the TaskID field value, then the process diverts to step 794.

In step 778, the CurrentOldTask integer variable is set to the TaskID field value of the item in the old program associated with the current value of the OldP variable. The OldItems item collection reference variable is set to refer to no items (i.e., to refer to nothing), the CountOldItems variable is set to zero, and the ExceptionItems item collection reference variable is set to refer to no items.

In step 780, the item in the old program associated with the index value of OldP is assigned to the OldItems item collection reference variable. As each new item reference is added to the OldItems item collection reference variable, the count of items represented by the CountOldItems variable is incremented by one.

In step 782, the process finds items in the exceptions information which have the same ScheduledTaskID field value as that associated with the item in the old program associated with the index value of OldP and assigns these items to the ExceptionItems item collection reference variable. The process then continues on to step 784.

Steps 784 to 792 define a loop. In step 784, the process checks using an IF . . . THEN structure whether there are any more items left to process in the old program. If the test produces an answer of No, then the process exits the loop defined by steps 784 to 492 and diverts to step 794. If the answer is Yes, then the process continues on to step 786.

In step 786, the process checks using an IF . . . THEN structure whether the next item in the old program has the same TaskID as the item in the old program associated with the index value of OldP. If the answer is No, then the process leaves the current loop and diverts to step 794. If the answer is Yes, then the process proceeds to step 788.

In step 788, the OldP index variable is incremented by adding one to its current value.

In step 790, the item in the old program associated with the incremented index value of OldP is associated with the OldItems item collection reference variable.

In step 792, the process finds items in the exceptions information which have the same ScheduledTaskID as that associated with the item in the old program associated with the incremented index value of OldP, and then assigns a reference to these items to the ExceptionItems item collection reference variable. The process then returns to the beginning of the current loop at step 784.

The loop defined by steps 784 to step 792 will be exited when either (A) there are no more items in the old program to process or (B) the next item in the old program has a different TaskID as the current item referenced by the index variable OldP. Upon exiting the loop, the OldItems variable will reference the set of items in the old program with the same TaskID value as the CurrentOldTask and the ExceptionItems variable will reference the set of items from the exceptions information with the same ScheduledTaskID field values as the field values of each of the items referenced by the old items reference variable.

Steps 794 through 808 perform the analogous operations as steps 774 to 792 for the new program and related variables NewP, CurrentNewTask, and NewItems. The only difference is that the analogous operations do not include the search for and assignment of items from the exceptions information to the ExceptionItems item collection reference variable, as in steps 782 and 792, as no exception items associated with the new program will have been created. As may be seen by observation, from the section bounded by steps 794 through 808, the process may exit at either steps 794, 796, 802, or 804 to continue on to step 756 shown in FIG. 22.

In step 756, the process compares the CurrentOldTask and CurrentNewTask variable values to determine whether one of the values is greater than, less than, or the same as the other. If the CurrentOldTask value is less than the CurrentNewTask, then process flows diverts to step 758. If the CurrentOldTask value is greater than the CurrentNewTask, then process flow diverts to step 768. These outcomes represent situations where there are items in the old program or new program which have a particular TaskID field value not present in the other program. If the CurrentOldTask value is the same as the CurrentNewTask value, then the outcome represents a situation where the particular TaskID is present in the TaskID fields of certain items in both the old and new programs. Where this is the case, the process continues on to step 760.

In step 760, the process compares the CountOldItems and CountNewItems variable and branches either (A) to step 762, if the value of the CountNewItems variable is greater than the value of the CountOldItems variable, (B) to step 764, if the values of the CountNewItems and CountOldItems variables are the same, or, (C) to step 766, if the value of the CountOldItems variable is greater than the value of the CountNewItems variable.

With reference to FIG. 23B, in step 810 the process performs an IF . . . THEN test to examine the HandledOldP Boolean value. If the HandledOldP value is False or No, then there are still items in the old program to process and the process continues on to step 812. If the HandledOldP value is True or Yes, then there are no more items left in the old program to process and the process diverts to step 830. This second condition would occur, for example, in a case where the new program includes items with a TaskID field value greater than the highest TaskID field value represented in the old program.

Steps 812 to 822 form a loop used to process all the items referenced by the OldItems item collection reference variable.

At step 812, the assumption is that the reason the value in the CurrentOldTask is less than the value in the CurrentNewTask variable, the condition detected in step 756, is that the OldItems represent tasks which will be stopped upon changing from the old program to the new program. In step 812, the process creates a copy of the an old program item referenced by OldItems and inserts the copied item into the temporary program changes storage buffer, that is, inserts the copied item among the items associated with the new program. The ActionMessage variable associated with the newly inserted item is set to the value of "Stop". In step 814, since the newly inserted item increases the number of items in the temporary program changes storage buffer, the value of the index variable NewP must be incremented by one so that it will refer to the same item in the new program.

At step 816, a second loop is formed which spans steps 816 to 820. This loop is for processing the exception items associated with the ExceptionItems item collection reference variable. In step 816, the process first inserts a new item in the temporary program changes storage buffer and copies a subset of the values of the current item referenced by the ExceptionItems item collection reference variable which is being processed in the second loop into the corresponding fields of the newly created item. The ActionMessage variable associated with the newly inserted item will be set to "Exception to be Removed". As seen in step 814, the insertion of a new item in the programs table for the exception item requires that the process in step 818 increment the value of NewP by one. Step 820 is a test of whether there are more items to process within the second loop. If there are more exception items referenced by the ExceptionItems item collection reference variable left to process, then the process is diverted back to step 816 to process the next referenced exception item. If there are no more exception items referenced by the ExceptionItems item collection reference variable left to process, then the process continues to step 822.

In step 822 the process tests whether there are any more items referenced by the OldItems item collection reference variable to be processed in the loop spanning steps 812 to 822. If there are more items, the process is diverted back to step 812. If there are no more items, then the process continues on to step 824.

In step 824, the process uses an IF . . . THEN structure to determine whether there are any more items to process in the old program. If there are more items, then in step 826 the index variable OldP is incremented by one and the process continues to step 770. If there are no more items to process in the old program, then the process diverts to step 828.

In step 828, the boolean variable HandledOldP is set to the value of True, indicating that all the items in the old program have been processed. The process continues from step 828 to step 770.

At step 830, a loop spanning steps 830 to 832 is defined for processing the items currently referenced by the NewItems variable. When the process proceeds through step 830, it indicates a case where all the items in the old program have been processed, and, accordingly, any remaining items referenced by the NewItems variable will represent new tasks to be added to the scheduled tasks information. Accordingly, the ActionMessage for the remaining items referenced by the NewItems variable will be set to equal "Start". In step 832, an IF . . . THEN test determines whether there are more items referenced by the NewItems variable left to be processed in the loop defined by step 830 to step 832. If there are items left to process, then the process diverts back to step 830. If there are no items left, then the process continues on to step 834.

In step 834, an IF . . . THEN structure is used to check whether there are any more items to process in the new program. If there are, then in step 836 the index variable NewP is incremented by one and the process continues on to step 770. If there are no more items to process in the new program, then the process flow at step 834 diverts to step 838. In step 838, the boolean variable HandledNewP is set to True and the process continues on to step 770.

With reference to FIG. 23C, in step 840, the process initializes an index variable "i" and sets the index variable equal to zero. Note that the index in this example is zero based and the expressions OldItems(i) and NewItems(i) will refer to indexed members of the item sets referenced by variables OldItems and NewItems respectively. The process continues from step 840 to step 842.

At step 842, a loop spanning steps 842 to 854 is defined for processing some of or all the items from the old and new programs referenced by the OldItems and NewItems item collection reference variables.

In step 842, the process performs an IF . . . THEN test whether the index variable "i" is less than or equal to the value of the count of items referenced by the OldItems item collection reference variable less one (i.e., the value of the CountOldItems variable which is recalculated on each pass through step 754). If the test yields a value of True or Yes, then there are more items referenced by the OldItems variable to process and the process continues on to step 844. If the test yields a value of False or No, then all the items referenced by the OldItems variable have been processed and the process diverts to step 856.

On the first pass through step 844 for the current set of tasks referenced by the OldItems and NewItems variables, the value of "i" will be zero and, accordingly, the ActionMessage for the first item in the NewItems set will be set equal to a value of "Continue".

In step 846, the OldProgramEntryID for the item referenced by the indexed item collection reference variable NewItems(i) is set to the value of the ProgramEntryID of the item referenced by the indexed item collection reference variable OldItems(i). Values placed in the OldProgramEntryID and NewProgramEntryID fields of items in the temporary program changes storage buffer cause certain actions to take place when the user commits to save changes. These actions will be discussed in connection with FIG. 24.

Steps 848 to 852 define a second loop within the loop defined by steps 842 to 854. The second loop is used for processing exception items associated with the OldItems processed in the loop defined by steps 842 to 854. Steps 848 to 852 are constructed in a similar manner as steps 816 to 820 shown in FIG. 23B.

After any exception items have been processed in the loop defined by steps 848 to 852, the process continues to step 854 in which step the index variable "i" is incremented by one. After step 854, the process diverts back to step 842.

As discussed above, step 842 checks whether the value of "i" is less than or equal to the CountOldItems variable less one. The index for the OldItems and NewItems variables is zero based, so when the test yields a result of False or No, it indicates that all of the items referenced by the OldItems variable have been processed and any remaining items referenced by the NewItems variable remain to be processed when the process diverts to step 856.

Steps 856 to 860 define a loop which processes the remaining items referenced by the NewItems variable. Each of these items will have its ActionMessage set to "Continue" in step 858 and then the index variable "i" will be incremented by one in step 860 before diverting back to step 856. The default value for the OldProgramEntryID field for items processed in steps 856 to 860 will be set to a value of negative one. The value of negative one acts as a switch when the new program is processed in the process shown in FIG. 24. When the value of "i" exceeds the count of items referenced by the NewItems variable, the process exits the current loop to proceed from step 856 to step 770.

With reference to FIG. 23D, steps 864 to 878 in FIG. 23D are constructed in a similar manner as steps 840 to 854 shown in FIG. 23C. The case handled by the process shown in FIG. 23D is one where the value of the CurrentOldTask variable is the same as the value of the CurrentNewTask variable and the values of the CountOldItems and CountNewItems variables are also equal. Since the item counts are the same for the OldItems and NewItems item collection reference variables, the loop defined by steps 866 to 878 will be exited when all the items referenced by both the OldItems and NewItems are processed even though in step 866 the index variable "i" is only tested for exceeding the item count associated with the OldItems reference variable. The process after exiting the loop defined by steps 866 to 878 proceeds to step 880. By inspection it may be seen that steps 880 to 884 in FIG. 23D are constructed in a similar manner as steps 824 to 828 in FIG. 23B. It may also be seen that steps 886 to 890 in FIG. 23D are constructed in a similar manner as steps 834 to 838 in FIG. 23B. After steps 888 or 890, the process continues on to step 770.

With reference to FIG. 23E, steps 892 to 906 in FIG. 23E are constructed in a similar manner as steps 840 to 854 shown in FIG. 23C, excepting that at the beginning of the loop structure defined by steps 894 to 906 in the test in step 894, the test terminates when the index variable "i" exceeds the count of items referenced by the NewItems variable rather than the count of items referenced by the OldItems as in step 842 in FIG. 23C. After all of the items referenced by the NewItems item collection reference variable have been processed, the process will exit at step 894 and continue on to step 908. Steps 908 to 922 in FIG. 23E define a loop for handling the remaining items associated with the OldItems reference variable. These items have the same TaskID as one or more items in the new program. Since the number of OldItems exceeds the number of NewItems and the information in the temporary program changes storage buffer is used exclusively for determining actions to take in changing between programs, extra items need to be added to the temporary program changes storage buffer to track the excess number of OldItems versus NewItems. In step 910, a new item is created in the temporary program changes storage buffer and the values of the item referenced by OldItems(i) are copied into the corresponding fields of this new item. In step 912, the OldProgramEntryID field of the new item is set to equal the ProgramEntryID field value of the item referenced by OldItems(i). In step 914, the index variable NewP is incremented by one to compensate for the addition of an extra item to the temporary program changes storage buffer.

As may be seen by inspection, steps 916 to 920 in FIG. 23E are constructed in a similar manner as steps 816 to 820 in FIG. 23B. After processing all the exception items in the loop defined by steps 916 to 920, the process continues on to step 922.

In step 922, the value of the index variable "i" is incremented by one and program flow diverts back to step 908. At step 908, when all the items referenced by the OldItems reference variable have been processed, the process exits the loop defined by steps 908 to 922 and continues on to step 770.

With reference to FIG. 23F, in step 924, the process performs an IF . . . THEN test to determine whether all the items in the new program have been processed, that is whether the value of the HandledNewP variable is True or Yes. If there are still items in the new program to process, the IF . . . THEN test produces a value of False or No and the process continues on to step 940. If there are no items left to process in the new program, then the IF . . . THEN test produces a value of True or Yes and the process diverts to step 926. This would occur, for example, in a case where the old program includes items with a TaskID field value greater than the highest TaskID field value for any item in the new program. As may be seen by inspection, the steps 926 to 938 in FIG. 23F are identical to steps 812 to 828 shown in FIG. 23B and the steps 940 to 945 in FIG. 23F are identical to steps 830 to 838 shown in FIG. 23B. After either step 937, 938, 944, or 945, the process shown in FIG. 23F continues on to step 770.

The detailed processes shown in FIGS. 23B to 23F all conclude by continuing on to step 770. In step 770, the process shown in high-level in FIG. 22 and in detail in FIG. 23A to 23G checks whether there are any more items in the old program and new program left to process in the loop defined between steps 754 to 770. If all the items in the old and new programs have not been processed, then the process diverts back to step 754 to process the next item or items from either the old program, the new program, or, both the old and new programs. If all the items in the old and new programs have been processed then the process causes the changes viewer/editor component 158 to be displayed on the GUI screen and the process is exited.

With reference to FIG. 23G, in step 948 the process filters the template programs information to include only those items which have been modified by means of the program viewer/editor component 154 and which have the same ProgramID field values as are found in the items in the scheduled tasks storage buffer 128 where the items in the scheduled tasks storage buffer 128 have a pattern end date on or after the current date as represented in the default values storage buffer 134. The result of this step is to have in programs information storage buffer 152 only those items which (A) have been modified, and (B) are associated with active items among the scheduled tasks information.

In step 949, the scheduled tasks information is filtered to exclude deleted items, items representing additional recurring task occurrences, and items representing exception occurrences.

Steps 950 to 958 define a loop used for processing each item in the scheduled tasks information and exceptions information associated with a modified item in the template programs information which was identified in the filtering step 948. That is, the loop iterates through each of the modified items identified in step 948 and finds any items from the scheduled tasks information and exceptions information associated with the particular modified item during a given iteration through the loop.

In step 950, the process finds all the items in the filtered scheduled tasks information which have the same ProgramEntryID field value as the modified item from the template programs information which is being processed in the loop defined by steps 950 to 958.

In step 952, the process examines the items in the exceptions information to identify all the items in the exceptions information which have a ScheduledTaskID field value associated with one of the items from the scheduled tasks information identified in step 950. Further, in step 952 ItemDate field value of each associated exceptions information item is checked. The process deletes from the exceptions information those items which are associated with the items from the scheduled tasks information identified in step 950 and which have an ItemDate field value equal to or greater than the current date.

In step 954, a copy of each of the items from the scheduled tasks information which was identified in step 950 and which have an ItemDate field value equal to or greater than the current date is copied into a new item created in the scheduled tasks storage buffer 128.

In step 956, the personal data and timeslot related values of the newly created item are updated to reflect the values from the modified item from the template programs information which is being processed in the loop defined by steps 950 to 958.

In step 957, the items from the scheduled tasks information identified in step 950 and which have an ItemDate field value greater than or equal to the current date have the value in their PatternEndDate fields set to the day before the current date. The result of steps 954, 956, and 957 is to terminate items in the scheduled tasks information associated with modified items in the template programs information effective the day before the current date, and, to start a new item reflecting the information represented by the modified items in the template programs information on the current date. The result of step 952 was to delete any items in the exceptions information associated with terminated items in the scheduled tasks information where the ItemDate field value of the deleted items is equal to or greater than the current date. Accordingly, the scheduled tasks information will still contain items representing the older version of the modified items in the template programs information, which avoids the disconcerting affect of a change deleting items which had been or were to have been performed in the past.

Step 958 checks whether there are any more modified items from the template programs information left to be processed in the loop defined by steps 950 to 958. If all such items have not been processed, the process diverts back to step 950 to begin processing the next modified item. If all such items have been processed, the process is exited. Upon returning to viewing the calendar component 116, the system will update the GUI screen to reflect changes made to the template programs information, scheduled tasks information and exceptions information.

With the process shown in FIG. 22 and FIGS. 23A-23F, the system and method is able to prepare and display the changes viewer/editor component 158 which represents associations established by means such as a common TaskID field value between items in the old program and items in the new program with text comments characterizing the type of changes that will be applied when the user commits to making those changes by clicking the commit button UIE 322.

FIG. 24 shows the process which is performed when the user clicks the commit button UIE 322 for translating the information developed in the temporary program changes storage buffer into changes to the scheduled tasks information and exceptions information.

With reference to the process shown in FIG. 24, in step 965 the process deletes from the scheduled tasks storage buffer 128 scheduled tasks information items which represent additional recurring task occurrences and exception occurrences. The scheduled tasks information is also filtered to exclude deleted items representing recurring and non-recurring tasks. Also, in step 965, the process generates a new ProgramID. The new ProgramID is provided so that the process shown in FIG. 24 can create a new copy of the items associated with the new program and so that, after reversing changes made to the original version of the items in the template programs information, both an unmodified version of the new program and a modified version of the new program may be stored in the template programs information.

Steps 966 to 985 form a loop to process the items in the temporary program changes storage buffer. In step 966, the process employs a SELECT . . . CASE structure that diverts the process to specific sub-processes, beginning respectively at steps 967, 971, 976 and 984, with each sub-process defined to handle a particular case as expressed in a item's ActionMessage field. The types of cases and their respective sub-process treatments will now be discussed.

"Starting" Case: An item with an ActionMessage field value beginning with the word "Starting" will be handled in steps 967 to 970. In step 967, the process creates a new item in the template programs storage buffer 150. It then finds the item from the template programs storage buffer 150 which has the same ProgramEntryID as the item from the temporary program changes storage buffer which is being processed in the loop and copies field values from this item into the corresponding fields of the new item. The ProgramID field of the new item is set to the value of the new ProgramID generated in step 965. In step 968, the PatternStartAfterDays field of the new item is set to equal the difference in days between the effective date value supplied by means of the date selection UIE 320 and the current date maintained in the default values storage buffer 134. Step 969 uses an IF . . . THEN structure to handle cases where the Cancel field for a particular item in the temporary program changes storage buffer is set to True. If the value of the Cancel field is set to True, then the process diverts to step 970 in which the IsActive field of the new item is set to False. The process then continues from either step 969 or step 970 on to step 985 which tests whether all items from the temporary program changes storage buffer have been processed. If more items remain to be processed, the process loops back to step 966 and begins processing the next item.

"Stopping" Case: An item with an ActionMessage field value beginning with the word "Stopping" will be handled in steps 971 to 974. In step 971, the process finds all items from the scheduled tasks information which have the same ProgramEntryID as the item being processed in the loop. The PatternEndDate field of each of these found items is set to the date of the day before the effective date. Step 972 uses an IF . . . THEN structure to handle items from the temporary program changes storage buffer whose Cancel field is set to the value of True. If the field value is True, then the process diverts to steps 973 and 974 which performs a similar set of operations as those found in steps 967 and 968 for creating a new item in the template programs storage buffer 150 corresponding to the item which was to be cancelled in the process shown in FIG. 24 and then proceeds to step 985. If the Cancel field value is False, then the process also continues on to step 985. The result of a True value in the Cancel field is to create a copy of the item which will have had its PatternEndDate set to the day before the effective date in step 971 and have the copied item start on the effective date with the new ProgramID value in the copied item's ProgramID field.

"Continuing" Case: An item with an ActionMessage field value beginning with the word "Continuing", which represents an item where the TaskID is persisted between the old and new programs, will be handled in steps 976 to 983. The logic in FIG. 23C, FIG. 23D, and FIG. 23E will cause one or more of the following sets of operations to be performed in Steps 976 to 983: (A) The termination of the old program item on the day before the effective date as in step 981, (B) the copying of the old program item field values into a new item which is added to the template programs information and given a ProgramID field value of the new ProgramID and a PatternStartAfterDays field value which causes any scheduled tasks information associated with the new item to commence on or after the effective date as in steps 977 and 978, or, (C) the combination of the two previously described sets of operations. The operations applied to items associated with a given item from the temporary program changes storage buffer will be a function of the counts of items associated with the old and new programs and the values found in the OldProgramEntryID and ProgramEntryID fields of each item from the temporary program changes storage buffer processed in the current loop. Where the count of items associated with the old program exceeds the count of items associated with the new program (the condition which occurs in the process shown in FIG. 23C), the matching number of item from both the old and new programs will be reflected in the item from the temporary program changes storage buffer by having different values in the OldProgramEntryID and ProgramEntryID fields of the item in the temporary program changes storage buffer and processed in step 977, 978, 981, and 982, and, the excess items in the temporary program changes storage buffer will have the value of negative one (−1) placed in their OldProgramEntryID field and so will bypass steps 981, 982, and 983 and proceed directly to step 985. Where equal counts of items are involved (as is occurs in the process shown in FIG. 23D), all items from the temporary program changes storage buffer will be processed in steps 977, 978, 981, and 982. Where the count of items associated with the old program exceeds the count of items associated with the new program, the matching number of items in the temporary program changes storage buffer will have different values in their OldProgramEntryID and ProgramEntryID fields and will be processed in steps 977, 978, and 981, and 982. The excess items in the temporary program changes storage buffer and which are associated with the old program will have the same values in both the OldProgramEntryID field and ProgramEntryID field and be processed in step 981, but, not steps 977 and 978. For items which are processed in step 981, the process continues on to step 982 which examines the item's Cancel field. If the Cancel field value is True, then, in step 983, the process searches the template programs information for the item corresponding to the item being processed in the loop, creates a new item to add to the template programs storage buffer 150, sets the field values of the new item equal to those of the item being processed in the loop, updates the ProgramID field value of the new item to the new ProgramID value and updates the new item's PatternStartAfterDays field to the difference in days between the effective date and the current date. From step 983, the process continues on to step 985. If at step 982 the Cancel field value is False, then the process continues directly from step 982 to step 985. The effect of step 983 is, if a particular change is cancelled, to make a new item equivalent to the item which was set to end on the day before the effective date and have it saved with the new ProgramID and a PatternStartAfterDays field value which would cause associated items in the scheduled tasks information to start on the effective date.

"Exception" Case: An item with the ActionMessage field value beginning with the word "Exception" will be handled in step 984. In step 984, the process finds the items from the exceptions information which have the same ProgramEntryID field value as that of an item from the old program which is being stopped or continued and which also have an ItemDate which occurs on or after the effective date and deletes the found items from the exceptions information. The process then continues from step 984 on to step 985.

In step 985, the process checks to determine whether any more items in the temporary program changes storage buffer remain to be processed. When all of the items from the temporary program changes storage buffer have been processed, the process exits the loop defined as spanning steps 966 to 985 and continues on to step 986.

In step 986, the items from the template programs information which are associated with the new ProgramID value or values are processed using the process shown in FIG. 20. As discussed above, the process shown in FIG. 20 translates the template program information into items suitable for adding to the scheduled tasks information and adds the items to the scheduled tasks information storage buffer 128. After step 986, the current process is exited.

With reference to FIGS. 22 to 24, it bears noting that, if the user accepts the proposed changes generated by the process shown in FIG. 22 and an effective date of today, it is possible for the user to terminate some or all of a plurality of tasks associated with an old template program and initiate a plurality of tasks associated with a new template program in four or five clicks of the input device 101, easily one or two orders of magnitude faster than modifying each old scheduled task and creating each new scheduled task as would be required with existing types of electronic calendaring systems.

Description of Second Embodiment

Figure 25:
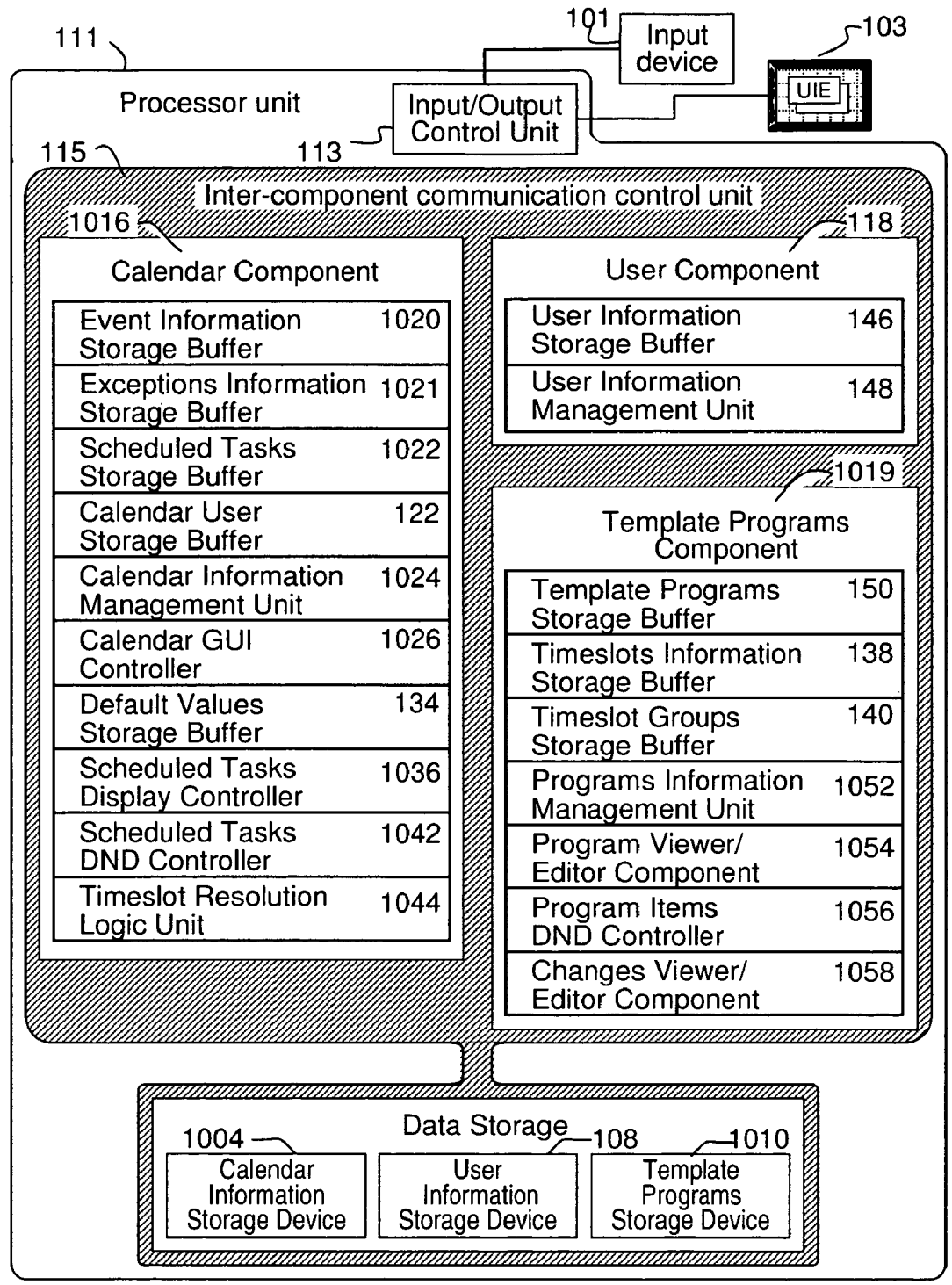
FIG. 25 is a diagram showing the configuration of a schedule management system according to a second embodiment of the invention.

FIG. 25 is a diagram showing the configuration of a schedule management system according to a second embodiment of the invention wherein many of the structures represented in the preferred embodiment are integrated with structural elements of an electronic calendaring system. Under the second embodiment, the schedule management system includes the input device 101 such as a pointing device for inputting position information, the display unit 103, a calendar information storage device 1004, the user information storage device 108, a template programs storage device 1010, and the processor unit 111.

The calendar information storage device 1004 stores event information, exceptions information, and scheduled tasks information as shown in FIGS. 26, 27 and 28 respectively. From the event information, exceptions information, and scheduled tasks information as shown in FIGS. 26 to 28 it is possible to develop information equivalent to the scheduled tasks information under the first embodiment as shown in FIG. 9. The event information as shown in FIG. 26 provides a definition of a particular recurrence pattern for a period defined by the PatternStartDate and PatternEndDate fields. The values in the PatternStartDate and PatternEndDate fields of the event information as shown in FIG. 26 will be calculated as the earliest PatternStartDate value and the latest PatternEndDate value respectively among associated scheduled tasks information items. When the Boolean HasLinkedTask field holds a value of "True", it indicates that the particular item of event information as shown in FIG. 26 is associated with an item or items in the scheduled tasks information as shown in FIG. 28 where the associated items have in a scheduled tasks information EventID field a corresponding EventID field value. For example, item 1 in the event information as shown in FIG. 26 has an EventID field value of "212" which indicates that it should be joined with items 1, 2, and 4 in the scheduled tasks information, which have the value of "212" in their EventID fields, to thereby produce similar scheduled tasks information items in a temporary storage buffer to that which is shown as items 1, 2, and 4 in the scheduled tasks information as shown in FIG. 9. The scheduled tasks information as shown in FIG. 28 has an additional boolean HasLinkedEvent field which indicates that a particular scheduled tasks information item as shown in FIG. 28 is associated with a particular recurrence pattern as expressed by the related item in the event information as shown in FIG. 26. This allows for associating a particular scheduled tasks information item task with a particular event information item and any other associated scheduled tasks information items and exception information items. The exceptions information items have an EventID field, a boolean HasLinkedTask field, a ScheduledTaskID field, and an OccurrenceNumber field which collectively may be used to determine which event information item the exception information items is associated with, that it is associated with a particular occurrence of a recurring task as represented in the scheduled tasks information, and, with the OccurrenceNumber, the ability to identify the particular occurrence of an associated scheduled tasks information item. For example, item 1 in the exceptions information as shown in FIG. 27 is associated with the $2^{nd}$ occurrence of the recurrence pattern defined by item 1 in the event information and the PatternStartDate and PatternEndDate of an item in the scheduled tasks information, similar to item 4 in FIG. 4. The particular scheduled task information items associated with a particular event information item may change over time. Accordingly, when a scheduled tasks information item is associated with or disassociated with a particular event information item, a judgment process will be performed to determine whether a change should be made to the PatternStartDate and PatternEndDate fields of the event information item and whether, if no scheduled tasks information items will be associated with the event information item after removing an association with the event information item, the event information item and any associated exception information items should be deleted.

The user information storage device 108 stores user information as was described above in connection with the preferred embodiment.

The template programs storage device 1010 stores template programs information, timeslots information, and timeslot groups information as shown in FIGS. 8, 5, and 6 respectively.

The processor unit 111 includes the input/output control unit 113, the inter-component communication control unit 115, a calendar component 1016, the user component 118, and a template programs component 1019.

As in the preferred embodiment, the input/output control unit 113 supplies the processor unit 111 with information entered from the input device 101, and displays data supplied from the processor unit 111 on the display unit 103. And, also as in the preferred embodiment, the inter-component communication control unit 115 has a function of exchanging data, and commands between system components. With this function, cooperation between components constituting a GUI screen can be achieved.

The calendar component 1016 includes an event information storage buffer 1020, an exceptions information storage buffer 1021, a scheduled tasks storage buffer 1022, the calendar user storage buffer 122, a calendar information management unit 1024, a calendar GUI controller 1026, the default values storage buffer 134, a scheduled tasks display controller 1036, a scheduled tasks DND controller 1042, and a timeslot resolution logic unit 1044.

The event information storage buffer 1020 temporarily stores event information. The calendar information management unit 1024 acquires event information stored in the calendar information storage device 1004, such as shown in FIG. 26, and stores the acquired event information in the event information storage buffer 1020.

The exceptions information storage buffer 1021 temporarily stores exceptions information. The calendar information management unit 1024 acquires exceptions information stored in the calendar information storage device 1004, such as shown in FIG. 27, and stores the acquired exceptions information in the exceptions information storage buffer 1021.

The scheduled tasks storage buffer 1022 temporarily stores scheduled tasks information. The calendar information management unit 1024 acquires scheduled tasks information stored in the calendar information storage device 1004, such as shown in FIG. 28, and stores the acquired scheduled tasks information in the scheduled tasks storage buffer 1022.

The calendar user storage buffer 122, should one be provided, functions as described above in connection with the preferred embodiment.

The calendar information management unit 1024 also provides process control functions accessible by means of the inter-component communication control unit 115, for system components to add, read, edit, and delete event information including the linking of event information items with exceptions information items and scheduled task information items, to add read, edit, and delete exceptions information including the linking of exception information items with event information items and scheduled tasks information items, to change the calendar component active date, and, optionally, to add, read, edit, and delete calendar component user information and to change the calendar component current user. Further, the calendar information management unit 1024 acquires and stores in the default values storage buffer 134 a reference to a calendar component active date, which, when changed, causes the calendar component 1016 to modify the user interface elements displayed on the GUI screen to highlight event information associated with a new calendar component active date. By means of the inter-component communication control unit 115, the calendar information management unit 1024 notifies other system components of calendar component application events as they occur or after they have occurred, including, in particular, changes in the event information, exceptions information, scheduled tasks information, calendar component active date, or, should a calendar user storage buffer 122 be provided, in the calendar component current user, and, further, supplies other system components with relevant data associated with calendar component application events.

The calendar GUI controller 1026 performs a process of displaying event user interface elements representing the event information stored in the event information storage buffer 1020, associated exceptions information stored in the exceptions information storage buffer 1021, and, associated scheduled tasks information stored in the scheduled tasks storage buffer 1022, in a calendar format on the GUI screen by means of the input/output control unit 113 and provides means for associating input which the user supplies by means of an input device such as the input device 101 with particular process control functions of the calendar component. More particularly, the GUI screen generated by the calendar GUI controller 1026 is comprised of user interface elements which represent the various types of information maintained by the calendar component 116 including event information, exceptions information, scheduled tasks information, particular dates, and, should a calendar user storage buffer 122 be provided, calendar component user information. The calendar GUI controller 1026 will incorporate a judgment process to determine whether a particular event item it has cause to represent on the GUI screen has its HasLinkedTask field value set to "TRUE", and, if it does, will invoke the scheduled tasks display controller 1036 to display an event user interface element and, space permitting, task-related user interface elements associated with the particular event item in a format such as shown in FIGS. 13A and 13B.

The calendar GUI controller 1026, in conjunction with an input device such as input device 101 and display device such as display unit 103, provides user functions including functions for: (A) changing the calendar component active date, (B) adding, reading, editing, and deleting event information including linking and de-linking of particular event information items with particular exception information items and particular scheduled task information items, (C) adding, reading, editing, and deleting exceptions information including linking and de-linking of particular exception information items with particular event information items and particular scheduled task information items, (D) adding, reading, editing, and deleting scheduled tasks information including linking and de-linking of particular scheduled task information items with particular event information items and particular exception information items, (E) dragging and dropping date-related UIEs between arbitrary points in the GUI screen, (F) dragging and dropping event-related UIEs between arbitrary points in the GUI screen, and (G) dragging and dropping task-related UIEs between arbitrary points in the GUI screen. The calendar GUI controller 1026 will incorporate a judgment process to determine with respect to drag-and-drop actions whether the system components involved in a particular drag-and-drop action are associated with event information in which the HasLinkedTask field holds a value of "TRUE", are associated with exceptions information in which the HasLinkedTask field holds a value of "TRUE", or are associated with scheduled tasks information HasLinkedEvent field holds a value of "TRUE". If the judgment process determines that any of the three conditions referenced in the previous sentence apply, then the judgment process will invoke the scheduled tasks DND controller 1042 to process the drag-and-drop action. The calendar GUI controller 1026, in conjunction with an input device such as input device 101 and display device such as display unit 103, may also provide additional user functions including functions for: changing the calendar component current user, and, adding, reading, editing, and deleting calendar component user information.

The calendar GUI controller 1026 has internal functions, associated with such user accessible functions as it provides, for causing the calendar information management unit 1024 to incorporate appropriate changes in the information maintained by the calendar information management unit 1024, and, said internal functions also convey data to other system components, by means of the inter-component communication control unit 115, which represent notifications that a particular application event is occurring or has occurred and, further which represent relevant information associated with the particular application event.

The default values storage buffer 134 functions in a similar manner as was described above in connection with the preferred embodiment.

The scheduled tasks display controller 1036 performs a process for representing scheduled tasks information associated with a particular event information item and occurrence on the GUI screen using a redesigned event user interface element such as those which are exemplified in FIGS. 13A and 13B. Briefly, for each event item being displayed by the calendar GUI controller 1026 and which has a HasLinkedTask field value of "True", the process will search the scheduled tasks information for any items which have an EventID field value corresponding to the EventID field value of the particular event information item, prepare temporary, extra event occurrence items for the lesser of a predetermined display period or the overlapping period defined by each scheduled tasks information item's PatternStartDate and PatternEndDate field values, search the exceptions information for any items which have an EventID, ScheduledTaskID, and OccurrenceNumber field value corresponding to the particular occurrence of a given event information item, conduct a judgment process for determining the number and type of task-related user interface elements, such as are exemplified by the event header UIE 274, the sub-group header UIE 276, and task UIE 278 shown in FIGS. 13A and 13B, which may be displayed in the region of the GUI screen to be occupied by the redesigned event user interface element, and paint the GUI screen with the number and type of user interface elements so determined by the judgment process. A temporary tree structure or other suitable information structure will be created and maintained by the scheduled tasks display controller 1036 to provide for storing information which cross-references event header UIEs with particular event information items, task UIEs with particular scheduled tasks information items and exception information items, and, where provided, sub-group task UIEs with particular sub-groups of scheduled tasks information items and exception information items.

The scheduled tasks DND controller 1042 performs a process similar to that which is shown in FIG. 18 for changing the event information, exceptions information, and scheduled tasks information in response to data received by means of the inter-component communication control unit 115 from other system components where said data represents notifications of drag-and-drop application events occurring or having occurred among user interface elements monitored by scheduled items DND controller 1042. As with the scheduled tasks DND controller 142 described in connection with the preferred embodiment, the scheduled tasks DND controller 1042 will employ a process similar to that which is shown in FIG. 19 for identifying a suitable timeslot field value to assign to an item from the scheduled tasks information or exceptions information in a drag-and-drop action. When the scheduled tasks DND controller 1042 performs the process similar to that which is shown in FIG. 18, the scheduled items DND controller 1042 causes the calendar information management unit 1024 to update system components with any changes made to the event information, scheduled tasks information, exceptions information, calendar component active date, and calendar component current user. The scheduled tasks DND controller 1042 differs from the scheduled tasks DND controller 142 in that, under the second embodiment, the scheduled tasks DND controller must refer to the scheduled tasks storage buffer 1022 and the exceptions information storage buffer 1021 to find the particular scheduled tasks information items and exceptions items associated width the given event-related or date-related user interface elements involved in a drag-and-drop operation rather than, as with the first embodiment, just referring to a single, scheduled tasks storage buffer 128 to find the similar information.

The user component 118 behaves in a similar manner as was described above in connection with the preferred embodiment.

The template programs component 1019 includes the template programs storage buffer 150, the timeslots information storage buffer 138, the timeslot groups storage buffer 140, a programs information management unit 1052, the program viewer/editor component 1054, the program items DND controller 1056, and the changes viewer/editor component 1058.

The data structures of the template programs storage buffer 150, the timeslot information storage buffer 138, and the timeslot groups storage buffer 140 were described above in connection with the preferred embodiment. The programs information management unit 1052 acquires the template programs information, timeslots information, and timeslot groups information stored in the template programs storage device 1010 in a format such as was described above and shown in FIGS. 8, 5, and 6 respectively, and stores the acquired template programs information in the template programs storage buffer 150, the timeslot information storage buffer 138, and the timeslot groups storage buffer 140 respectively.

The programs information management unit 1052 uses a process similar that which is shown in FIG. 20 to translate a particular group of items in the template programs storage buffer 150 into entries suitable for adding to the event information storage buffer 1020 and the scheduled tasks storage buffer 1022. Briefly, the process creates a temporary new program items storage buffer with the same structure as is shown in FIG. 9, applies a similar process to the template programs information and timeslots information, such as was described above and as is shown in FIG. 20, to create and add new items to the temporary new program items storage buffer, translates the information in the temporary new program items storage buffer into equivalent, linked event information items and scheduled tasks information items which represent the items associated with a particular ProgramID field value in the template programs information, and stores the translated items in the event information storage buffer 1022 and the scheduled tasks information storage buffer 1022 as shown in FIGS. 26 and 28 respectively.

The descriptions of the processes shown in FIGS. 21 to 24 in connection with the preferred embodiment may be used with minor modifications in the second embodiment. The modifications include changing the references to the scheduled tasks storage buffer 128 and the exceptions information 130 used in the preferred embodiment to the scheduled tasks storage buffer 1022 and the exceptions information storage buffer 1021 used in the second embodiment respectively, and changing references to the program information management unit 152, the program viewer/editor component 154, and the program items DND controller 156 used in the preferred embodiment to the program information management unit 1052, the program viewer/editor component 1054, and the program items DND controller 1056 used in the second embodiment respectively. With these modifications, the program viewer/editor component 1054, the program items DND controller 1056, and the changes viewer/editor component 1058 used in the second embodiment may be constructed similarly to the program viewer/editor component 154, the program items DND controller 156, and the changes viewer/editor component 158 as these elements were described above in connection with the preferred embodiment.

The operation of the schedule management system of the second embodiment is substantially similar to that of the first embodiment excepting minor modifications associated with the handling of the modified structure of the event information, exceptions information, and scheduled tasks information.

The reader will see that the scheduling management system of the invention provides a system which integrates representations of scheduled tasks directly into the calendar regions proper of the graphical user interface of electronic calendaring systems, thereby allowing users to more easily appreciate the sequence of work periods in their daily schedules and the mix of tasks planned for a particular work period without having to mentally calculate where in a daily schedule particular tasks should be undertaken. The scheduling management system provides for easy editing of the scheduled tasks information in simple drag-and-drop actions. Template programs may be used to schedule a complete program of tasks in a single operation, a significant time savings over currently available electronic calendaring systems. And, the data structure of the template programs information provides for template designers to incorporate a behavior which dynamically adjusts the composition of tasks in a particular program in response to whatever scaling method a template designer chooses to use as an adjustment framework, thereby saving on the number of discrete programs template designers require to serve potentially large and diverse customer bases, anticipates normal changes over the course of the user's application of a particular program, thereby reducing system maintenance requirements, and accomplishes phase-related changes to a program in a single operation, substantially saving on key strokes and decision making in changes to the potentially large number of scheduled tasks associated with the particular new and old template programs.

While the above description contains many specificities, these should not be construed as limitations on the scope of the invention, but rather as exemplifications of one preferred embodiment thereof. Many other variations are possible. For example, the preferred embodiment uses recurrence patterns to define a recurring series of scheduled tasks and any associated exceptions in an economical manner. With the cost of computer storage dropping all the time, it may be more efficient and simpler, from a programming standpoint, to represent scheduled tasks information using only occurrence items for a period of time such as the next twelve months with the particular occurrence date and times calculated as each of the occurrences was added to the scheduled tasks information. Accordingly, the scope of the invention should be determined not by the embodiment illustrated, but by the appended claims and their legal equivalents.

I claim:

1. A computer-implemented method for displaying scheduled tasks within a calendar having a day agenda view, the day agenda view graphically depicting, for each of one or more days, a time scale of less than or equal to a day, the method comprising:

displaying at least two event objects within the day agenda view of the calendar, each event object graphically depicting a time period less than the time scale of the day agenda view, wherein the at least two event objects are independently movable by a user relative to the time scale of the day agenda view to change a start time for each of the event objects; and displaying at least two task objects within a first event object, each task object representing a task scheduled to be performed within the time period graphically depicted by the first event object, each task object being defined by a separate data structure, each task object being independently moveable, using a drag and drop operation, from the first event object to a second event object, such that a task object so moved is displayed within the second event object, and the task represented by the task object is scheduled to be performed within the time period graphically depicted by the second event object.

2. The method of claim 1 wherein the task objects are independently manipulable within the calendar.

3. The method of claim 1, wherein at least one event object comprises a displayable container object representing a time period, and wherein the container object is independently manipulable within the day agenda view to change a duration of the event object.

4. The method of claim 1, wherein a spatial relationship between the first event object and the time scale of the day agenda view indicates the at least one time period within which the at least two tasks are scheduled to be undertaken.

5. The method of claim 1, further comprising:
in response to a user selection of and dragging the first event object to a second event object of the calendar, modifying occurrence information for the at least two task objects within the first event object to conform to occurrence information represented by the second event object.

6. The method of claim 5, wherein the occurrence information comprises at least one of a starting time, an ending time, a start date, an end date, an occurrence date, a recurrence calculation type identifier, a day of week indicator, a days of week indicator, a week of month indicator, a month of year indicator, a user identifier, a user group identifier, a time interval in which an event repeats, a number of time intervals between occurrences of an event, a non-recurring event indicator, an indicator that exception occurrences exist, a listing of event occurrences, and a listing of any exception occurrences.

7. The method of claim 1, further comprising:
in response to a user selection of and dragging of a selected one of the at least two task objects within the first event object to a second event object of the calendar, modifying occurrence information of the selected task object to conform to occurrence information represented by the second event object.

8. The method of claim 1, further comprising:
providing a plurality of date-related objects within the calendar; and
in response to a user selection of and dragging of the first event object to a first date-related object of the calendar, modifying occurrence date information of the at least two task objects within the first event object to conform to a date represented by the first date-related object.

9. The method of claim 1, further comprising:
providing a plurality of date-related objects within the calendar; and
in response to a user selection of and dragging of a selected one of the at least two task objects within the first event object to a first date-related object of the calendar, modifying occurrence date information of the selected task object to conform to a date represented by the first date-related object.

10. The method of claim 1, further comprising:
providing a plurality of user-related objects within the calendar; and
in response to a user selection of and dragging of the first event object to a first user-related object of the calendar, modifying user identity information associated with the at least two task objects within the first event object to conform to user identity information represented by the first user-related object.

11. The method of claim 1, further comprising:
providing a plurality of user-related objects within the calendar; and
in response to a user selection of and dragging of a selected one of the least two task objects within the first event object to a first user-related object of the calendar, modifying user identity information associated with the selected task object to conform to user identity information represented by the first user-related object.

12. The method of claim 1, further comprising:
providing a plurality of date-related objects within the calendar; and
in response to a user selection of and dragging of a first date-related object to the first event object, finding any task objects associated with a current user identity and a date associated with the date-related object, and modifying occurrence information of the found task objects to conform to occurrence information represented by the first event object.

13. The method of claim 1, further comprising:
providing a plurality of date-related objects within the calendar; and
in response to a user selection of and dragging of a first date-related object to a second date-related object of the calendar, finding any task objects associated with a current user identity and a date associated with the first date-related object, and modifying occurrence date information of the found task objects to conform to a date represented by the second date-related object.

14. The method of claim 1, further comprising:
providing a plurality of date-related objects within the calendar;
providing a plurality of user-related objects within the calendar; and
in response to a user selection of and dragging of a first date-related object to a first user-related object of the calendar, finding any task objects associated with a current user identity and a date associated with the first date-related object, and modifying user identity information associated with the found task objects to conform to a user identity represented by the first user-related object.

15. The method of claim 1, further comprising:
providing a plurality of user-related objects within the calendar; and
in response to a user selection of and dragging of a first user-related object to the first event object, finding any task objects associated with a user identity associated with the first user-related object and a current date, and modifying occurrence information of the found task objects to conform to occurrence information represented by the first event object.

16. The method of claim 1, further comprising:
providing a plurality of date-related objects within the calendar;

providing a plurality of user-related objects within the calendar; and in response to a user selection of and dragging of a first user-related object to a first date-related object of the calendar, finding any task objects associated with a user identity associated with the first user-related object and a current date, and modifying occurrence date information of the found tasks objects to conform to a date represented by the first date-related object.

17. The method of claim 1, further comprising:

providing a plurality of user-related objects within the calendar; and in response to a user selection of and dragging of a first user-related object to a second user-related object of the calendar, finding any task objects associated with a user identity associated with the first user-related object and a current date, and modifying user identity information associated with the found task objects to conform to a user identity represented by the second user-related object.

18. The method of claim 1, further comprising:

providing a third task object within a second event object; and in response to a user selection of and dragging of the first event object to the third task object, modifying occurrence information of the at least two task objects within the first event object to conform to occurrence information represented by the second event object.

19. The method of claim 1, further comprising:

providing a third task object within a second event object; and in response to a user selection of and dragging of a selected one of the at least two task objects within the first event object to the third task object, modifying occurrence information of the selected task object to conform to occurrence information represented by the second event object.

20. The method of claim 1, further comprising:

providing a plurality of date-related objects within the calendar; and in response to a user selection of and dragging of a first date-related object to the first task object, finding any task objects associated with a current user identity and a date associated with the first date-related object, and modifying occurrence information of the found task objects to conform to occurrence information represented by the first event object.

21. The method of claim 1, further comprising:

providing a plurality of user-related objects within the calendar; and in response to a user selection of and dragging of a first user-related object to the first task object, finding any task objects associated with a user identity associated with the first user-related object and a current date, and modifying occurrence information of the found task objects to conform to occurrence information represented by the first event object.

22. The method of claim 1, further comprising:

providing at least one sub-group object within the calendar;

displaying the at least one sub-group object within the first event object; and associating at least one task object in a subordinate graphical relationship with the at least one sub-group object.

23. The method of claim 22, further comprising:

in response to a user selection of and dragging of the at least one sub-group object to a second event object of the calendar, modifying occurrence information of the at least one task object which is in a subordinate graphical relationship to the at least one sub-group object to conform to occurrence information represented by the second event object.

24. The method of claim 22, further comprising:

providing a plurality of user-related objects within the calendar; and in response to a user selection of and dragging of the at least one sub-group object to a first user-related object of the calendar, modifying user identity information associated with the at least one task object which is in a subordinate graphical relationship to the at least one sub-group object to conform to user identity information represented by the first user-related object.

25. The method of claim 22, further comprising:

providing a second sub-group object within a second event object; and in response to a user selection of and dragging of the first event object to the second sub-group object, modifying occurrence information of the at least two task objects to conform to occurrence information represented by the second event object.

26. The method of claim 22, further comprising:

providing a second sub-group object within a second event object; and in response to a user selection of and dragging of a selected one of the at least two task objects within the first event object to the second sub-group object, modifying occurrence information of the selected task object to conform to occurrence information represented by the second event object.

27. The method of claim 22, further comprising:

providing a second sub-group object within a second event object; and in response to a user selection of and dragging of a first task object to the second sub-group object, modifying occurrence information of the first task object to conform to occurrence information represented by the second event object.

28. The method of claim 22, further comprising:

representing a second sub-group object within a second event object; and in response to a user selection of and dragging of the first sub-group object to the second sub-group object, modifying occurrence information of the at least one task object to conform to occurrence information represented by the second event object.

29. A system for displaying scheduled tasks within a calendar having a day agenda view, the day agenda view graphically depicting, for each of one or more days, a time scale of less than or equal to a day, comprising:

means for displaying at least two event objects within the day agenda view of the calendar, each event object graphically depicting a time period less than the time scale of the day agenda view, wherein the at least two event objects are independently movable by a user relative to the time scale of the day agenda view to change a start time for each of the event objects;

means for displaying at least two task objects within a first event object, each task object representing a task scheduled to be undertaken within a time period graphically depicted by the first event object, each task object being defined by a separate data structure, the first event object associating the at least two task objects with a single header; and means for moving a selected task object from the first event object to a second event object in response to a drag and drop operation, wherein the moved task object is displayed within the second event object, and the task represented by the moved task object is scheduled to be performed within the time period graphically depicted by the second event object.

30. A method comprising:

providing at least two displayable event objects within a day agenda view of a calendar, the day agenda view graphically depicting, for each of one or more days, a time scale of less than or equal to a day, each event object graphically depicting a time period less than a day;

displaying a sub-group object within the first event object in the day agenda view of the calendar;

displaying at least two task objects within the first event object, in a subordinate graphical relationship with the sub-group object, each task object representing a task scheduled to be performed within the time period graphically depicted by the first event object, each task object being defined by a separate data structure, each task being independently movable to a second event object in response to a drag and drop operation, such that a task object so moved is displayed within the second event object. and the task represented by the task object is scheduled to be performed within the time period graphically depicted by the second event object.

31. The method of claim 30, wherein the sub-group object corresponds to a room in a house.

* * * * *